(12) United States Patent
Liu et al.

(10) Patent No.: US 12,240,051 B2
(45) Date of Patent: Mar. 4, 2025

(54) ULTRASONIC RESISTANCE WELDING PROCESS AND APPARATUS

(71) Applicant: Ohio State Innovation Foundation, Columbus, OH (US)

(72) Inventors: Xun Liu, Columbus, OH (US); Avraham Benatar, Upper Arlington, OH (US); Menachem Kimchi, Westerville, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 929 days.

(21) Appl. No.: 17/290,603

(22) PCT Filed: Oct. 31, 2019

(86) PCT No.: PCT/US2019/059169
§ 371 (c)(1),
(2) Date: Apr. 30, 2021

(87) PCT Pub. No.: WO2020/092772
PCT Pub. Date: May 7, 2020

(65) Prior Publication Data
US 2022/0001483 A1   Jan. 6, 2022

Related U.S. Application Data

(60) Provisional application No. 62/753,220, filed on Oct. 31, 2018.

(51) Int. Cl.
*B23K 20/10*     (2006.01)
*B23K 11/11*     (2006.01)
*B23K 11/12*     (2006.01)

(52) U.S. Cl.
CPC .......... *B23K 20/106* (2013.01); *B23K 11/115* (2013.01); *B23K 11/12* (2013.01)

(58) Field of Classification Search
CPC ..... B23K 20/106; B23K 11/12; B23K 11/115; B23K 20/10
See application file for complete search history.

(56) References Cited

U.S. PATENT DOCUMENTS

| | | | |
|---|---|---|---|
| 4,496,095 A | 1/1985 | Renshaw et al. | |
| 2013/0112665 A1* | 5/2013 | Jin | B23K 20/10 228/1.1 |

(Continued)

FOREIGN PATENT DOCUMENTS

| | | | | |
|---|---|---|---|---|
| CN | 104708216 A | * | 6/2015 | ............. B23K 28/02 |
| CN | 107378221 A | * | 11/2017 | ........... B23K 11/255 |

(Continued)

OTHER PUBLICATIONS

Machine translation of CN-104708216-A, Jul. 2024 (Year: 2024).*

(Continued)

*Primary Examiner* — Geoffrey S Evans
(74) *Attorney, Agent, or Firm* — Wood Herron & Evans LLP

(57) ABSTRACT

An ultrasonic resistance welding apparatus 10 contains a resistance spot welding apparatus 15, a first electrode 16 and a vibrable second electrode 18, the vibrable second electrode 18 in operable communication with an ultrasonic transducer 12, whereby the ultrasonic transducer 12 selectively imparts vibratory energy to the vibrable second electrode 18 based on signals from a controller 32. The vibrable second electrode 18 may be tuned or designed to resonate within 2.5% of an operating frequency of the ultrasonic transducer 12. During operation of the welding apparatus 10, a tip 19 of the second vibrable electrode 18 may be positioned at an anti-nodal point 38 of the vibratory energy and the vibrable second electrode 18 may be attached to the resistance spot welding apparatus 15 at a nodal plane 36 of the vibratory (Continued)

energy. A process for employing the apparatus 10 is also presented.

17 Claims, 44 Drawing Sheets

(56) References Cited

U.S. PATENT DOCUMENTS

| | | | | |
|---|---|---|---|---|
| 2015/0210003 A1* | 7/2015 | Short | ............... | B29C 66/73921 |
| | | | | 156/580.2 |
| 2018/0161914 A1* | 6/2018 | Hauck | .................. | B23K 31/125 |
| 2019/0105732 A1* | 4/2019 | Haddadi | ................ | B23K 28/02 |
| 2020/0108468 A1* | 4/2020 | Matheny | ................ | B23K 28/02 |

FOREIGN PATENT DOCUMENTS

| | | | | |
|---|---|---|---|---|
| DE | 745139 C | | 2/1944 | |
| DE | 4444461 A1 * | | 5/1996 | ........... B23K 20/106 |
| EP | 2657006 A1 * | | 10/2013 | .............. B06B 3/00 |
| FR | 2696116 A1 | | 4/1994 | |
| JP | H06114565 A | | 4/1994 | |
| KR | 20180120910 A * | | 11/2018 | |

OTHER PUBLICATIONS

Machine translation of CN-107378221-A, Jul. 2024 (Year: 2024).*
Machine translation of DE-4444461-A1, Jul. 2024, (Year: 2024).*
Machine translation of KR-20180120910-A (Year: 2024).*
U.H. Shah, X. Liu, Journal of Materials Processing Tech., Ultrasonic resistance welding of TRIP-780 steel, 274 (2019) 116287, Jul. 2, 2019, (9 pages).
European Patent Office, Examination Report, Application No. 19813698.8, dated Oct. 23, 2023 (6 pages).
European Patent Office; Search Report and Written Opinion in Related International Patent Application No. PCT/US2019/059169 dated Jan. 27, 2020; 12 pages.

* cited by examiner

ULTRASONIC RESISTANCE WELDING PROCESS AND APPARATUS

CROSS-REFERENCE TO RELATED APPLICATIONS

This application claims priority to and the benefit of the filing date of U.S. Patent Application Ser. No. 62/753,220, entitled "Ultrasonic Resistance Welding Process and Apparatus," filed on Oct. 31, 2018, the disclosure of which is incorporated by reference herein in its entirety.

STATEMENT REGARDING FEDERALLY SPONSORED RESEARCH OR DEVELOPMENT

This invention was made with government support under grant/contract number 1853632 awarded by the National Science Foundation. The government has certain rights in the invention.

FIELD OF THE INVENTION

The present invention relates generally to an improved fusion and/or solid-state welding process, including improved ultrasonic resistance spot welding, and more specifically, to novel methods and components for an improved fusion and/or solid-state welding process incorporating vibratory energy in the resistance welding process.

BACKGROUND

With the continuous attention to improving fuel economy and reducing carbon emissions, lightweight structures are highly desirable in automotive, aerospace, and other transportation platforms. Lightweight structures are typically made of materials with high specific strength, such as advanced high strength steels (AHSS), aluminum alloys, and metal matrix nanocomposites. Moreover, multi-material structures are a further key lightweight enabler. Accordingly, for final assembly of these desired structures, reliable, efficient, and economical joining techniques are imperative.

As one of the principal fusion welding technologies, resistance spot welding (RSW) has been extensively used in automobile industries based on its high level of productivity and degree of automation. There are typically more than three thousand RSW welds per vehicle. During RSW, a large amount of electrical current flows through the material and generates resistance heating, particularly at the contact interface, to melt the substrates. Under the simultaneously applied pressure from the electrodes, a joint is formed after solidification. However, adapting the existing RSW to join advanced lightweight materials and especially dissimilar materials faces several challenges. The prominent mechanical properties of the newer generations of AHSS, whose yield strength can easily exceed 1000 MPa, depend on a considerable amount of alloying elements and delicate heat treatment procedures. These elements increase the carbon equivalent value and expand solidification temperature interval, which generates more weld defects. Moreover, the thermal history in RSW deviates significantly from the originally desired heat treatment for AHSS. Finally, a surface coating is generally applied to AHSS sheets, which introduces another uncertainty for the contact resistance that degrades the RSW weld properties. For aluminum alloys, due to their inherently high electrical and thermal conductivities, the required welding current is typically two to three times of those for steel and the energy efficiency is low. Aluminum RSW welds are more susceptible to expulsion and defects like shrinkage voids, gas porosities, and microcracks. In addition, the presence of a tenacious oxide layer on the aluminum alloys surface may result in a large scatter in weld quality and rapid degradation of electrodes. Using RSW to join aluminum alloys to advanced high strength steel is even more challenging because of their distinctly different physical and mechanical properties, such as melting point, thermal and electrical conductivity, thermal expansion, and yield strength. In particular, a large amount of brittle intermetallics (IMCs) may be formed because of the poor metallurgical compatibility and limited Al—Fe mutual solubility.

Compared with RSW, ultrasonic spot welding (USW) has several advantages as a solid-state process. The heat input is low and energy efficiency is substantially higher (about 2% of the energy of RSW). During ultrasonic metal welding, the vibration is applied parallel to the weld interface. The friction-like oscillation motion shears the surface asperities, disrupts oxide and films, establishes microwelds under pressure, and finally achieves metal bonding. However, due to limitations in the power of available ultrasonic transducers, current applications of ultrasonic welding are primarily restricted to thin gage foils and relatively soft materials. Furthermore, for welding metals, the ultrasonic vibration has been limited to lateral configurations, which geometrically limits its applicability for large sheets required in the automotive industry.

SUMMARY OF THE INVENTION

Certain exemplary aspects of the invention are set forth below. It should be understood that these aspects are presented merely to provide the reader with a summary of certain forms the invention may take and that these aspects are not intended to limit the scope of the invention. Indeed, the invention may encompass a variety of aspects that may not be explicitly set forth below.

In one aspect of the invention, an ultrasonic resistance welding (URW) process and corresponding apparatus integrates RSW and USW to achieve the advantages and benefits of each process. Depending on the value of the electrical current, the URW process can be either in solid or liquid state. Under low current condition, which is generally below 6 KA depending on specific material systems, a solid-state weld can be achieved, which is especially beneficial for dissimilar material joining, where intermetallic formation can be avoided. Under high current condition, which is generally above 8 KA depending on specific material systems, material melting occurs, and the ultrasonic vibration modifies the weld nugget morphology and refines the solidification structure, which also improves the joint strength.

More specifically, by in situ application of ultrasonic vibration during RSW, the potential improvements reside in three stages. The term "in situ" is meant to convey that at some point in the welding process, ultrasonic vibration is applied simultaneously as electrical current passes through the workpiece(s); accordingly, ultrasonic vibration may preferably begin no earlier than 0.1 seconds before electrical current is sent through the associated electrodes, and ultrasonic vibration preferably continues no longer than 0.1 seconds after the electrical current has terminated, so long as at some point during the welding process, ultrasonic vibration and electrical current are simultaneously applied to the workpiece(s). In the beginning of the weld cycle, the contact resistance will be changed. Mechanical vibration can change the macroscopic contact condition while the acoustic energy can disrupt the surface oxide layer and contamination film and increase the nascent metallic contact area. These two factors accordingly moderate temperature rise from resistance heating. In the middle of the weld cycle, ultrasonic vibration affects the dynamics of the melt pool and provides potential degassing. Based on acoustic cavitation and streaming effects, the ultrasonic energy can improve material solidification behavior in restraining columnar dendrites growth, promoting formation of the equiaxed grains, homogenizing element distribution, and minimizing cavities and shrinkage porosities. At the end of the weld cycle, ultrasonic softening effect can potentially relieve weld residual stress and provide nonthermal Martensite tempering. These series of physical interactions can substantially enhance RSW in welding AHSS and Al alloys, promoting nugget formation and a refined weld microstructure, both of which will improve the mechanical properties of the weld. Particularly for joining AHSS to Al alloys, the superimposed ultrasonic vibrations can potentially fracture IMC's into discontinuous layers or fragments, alleviating its detrimental effects on joint performance.

In another aspect of the invention, the URW apparatus is based on a conventional RSW machine, which may be powered by AC, DC, or other variants, including but not limited to capacity discharge for example. The URW apparatus may be used for projection resistance welding, mash seam resistance welding, and in robots typically using RSW technology. A perpendicular or horizontal configuration of ultrasonic vibration may be adopted. The process is compatible for micro-joining and can be applied to multiple layers. A related aspect of this invention is an ultrasonic resistance additive manufacturing process, whereby a number of sheets can be layered over each other and welded together as disclosed herein, whether they be similar or dissimilar metals or substrates.

Accordingly, the present invention contains an ultrasonic resistance welding apparatus containing a resistance spot welding apparatus, a first replaceable electrode and a second base electrode, wherein the base electrode is juxtaposed to and in operable communication with an ultrasonic transducer, whereby the ultrasonic transducer selectively imparts vibratory energy to the base electrode. The second base electrode may be tuned or designed to resonate at about 2.5% above or below an operating frequency of said ultrasonic transducer, thereby stabilizing operation of URW. During operation of the ultrasonic resistance welding apparatus, the first electrode may be positioned at an anti-nodal point of the vibratory energy and the base electrode may be positioned at a nodal point of the vibratory energy. A process for employing the apparatus is also presented.

BRIEF DESCRIPTION OF THE DRAWINGS

The accompanying drawings, which are incorporated in and constitute a part of this specification, illustrate embodiments of the invention and, together with the general description of the invention given above and the detailed description of the embodiments given below, serve to explain the principles of the present invention.

DETAILED DESCRIPTION OF THE INVENTION

URW Apparatus and Process

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1A:
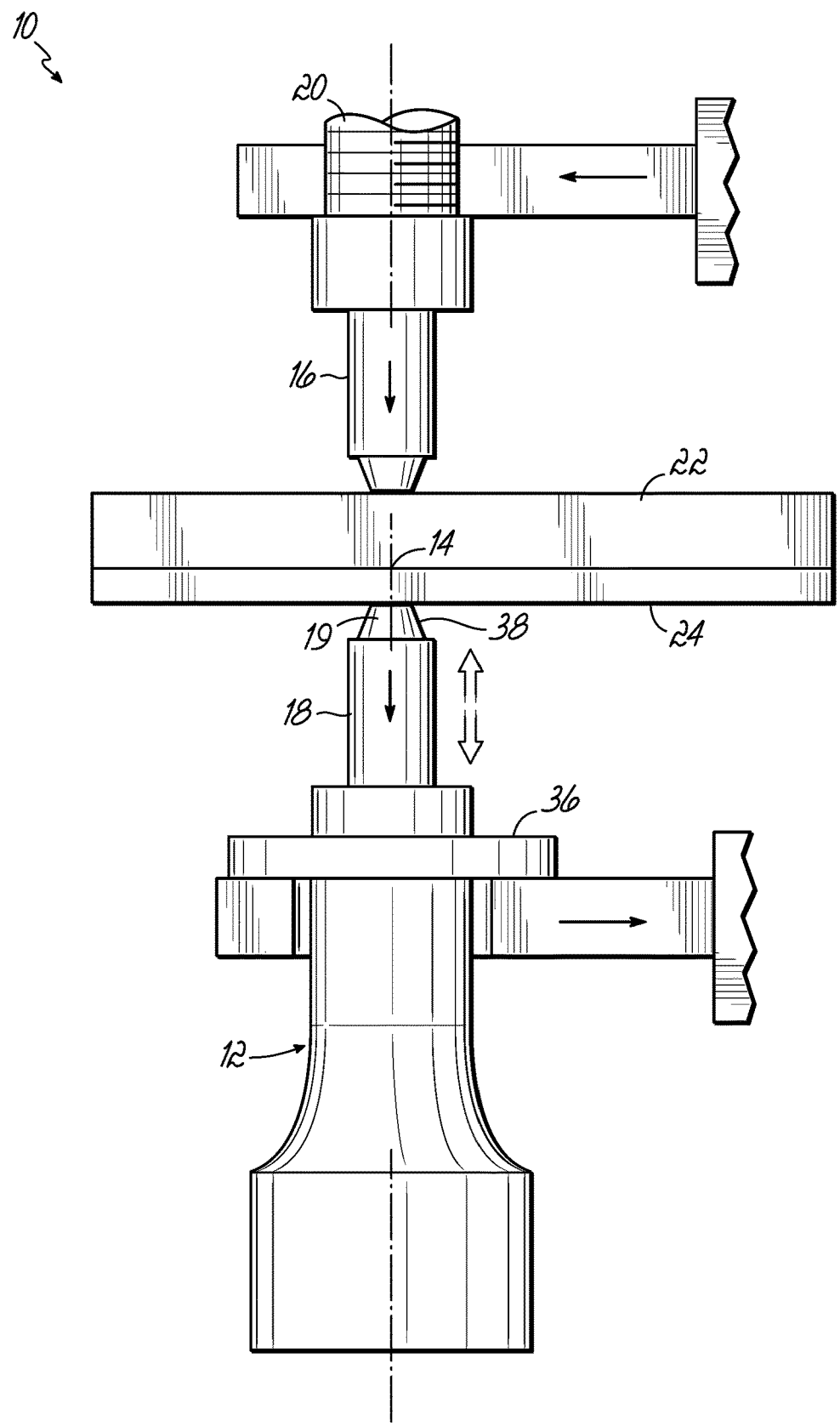
FIG. 1A is a schematic illustration of an ultrasonic resistance welding system.
Figure 1B:
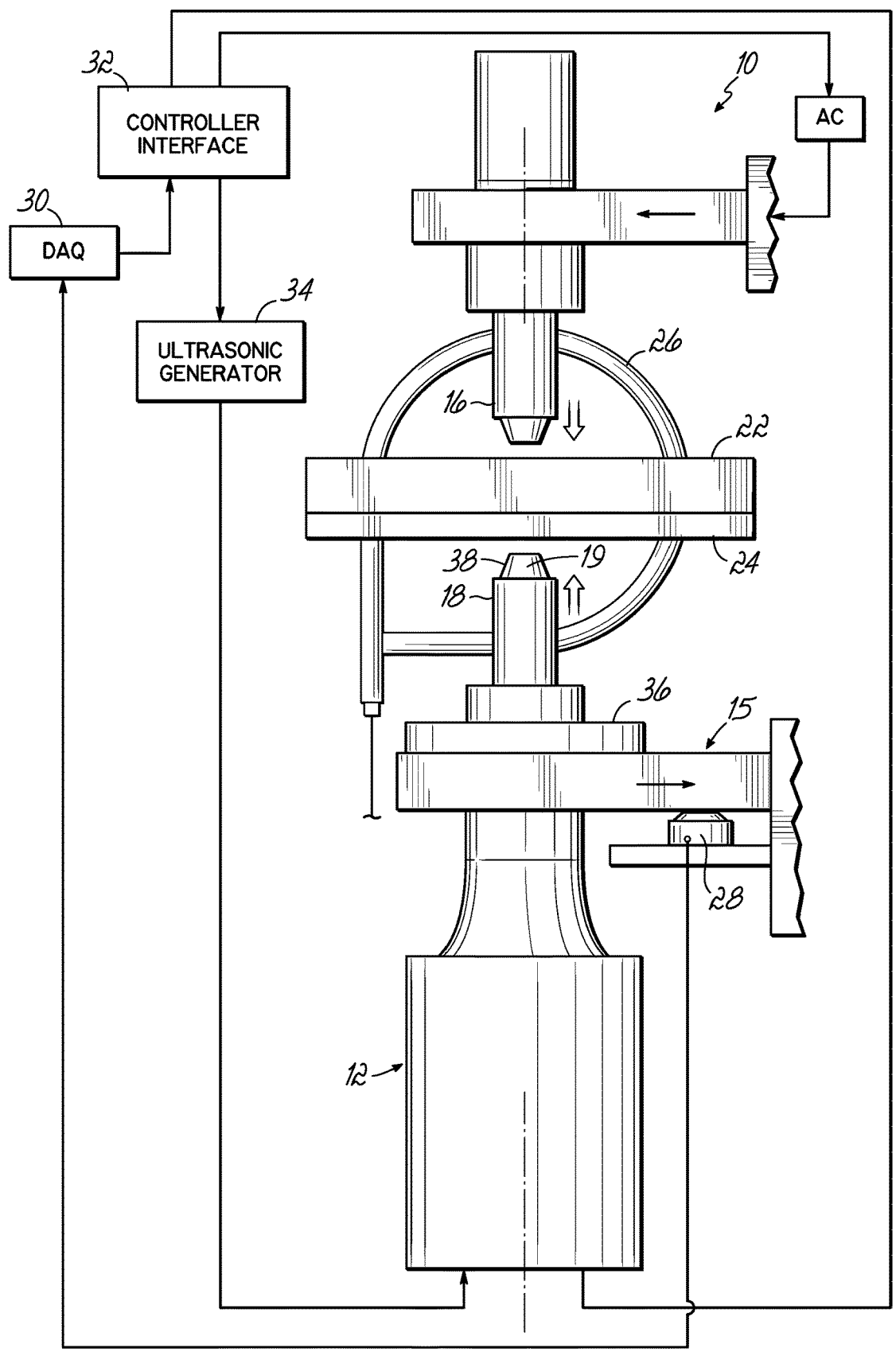
FIG. 1B is a schematic illustration of another embodiment of the present invention.

A schematic of one embodiment of the URW apparatus 10 and process is shown in FIG. 1A. Another exemplary URW apparatus 10 is shown in FIG. 1B. As shown in FIG. 1A, an ultrasonic resistance welding apparatus 10 contains a resistance spot welding apparatus 15 formed as known in the art. One of the electrodes 18 is connected to the ultrasonic transducer 12, serving as the sono-trode to transfer acoustic energy into the workpiece (materials 22 and 24). A first replaceable electrode 16 is removably fixed to the URW apparatus 10 at a position above a contact interface 14 between the first material or first component 22 and the second material or second component 24. The replaceable electrode 16 is readily removed to replace the electrode due to wear, or simply due to tailoring the URW apparatus 10 to a different type and/or amount of material being welded, for example. To that end, a threaded end 20 of the replaceable electrode 16 is received within the URW apparatus 10 for attachment thereto. To ensure unimpeded transfer of ultrasonic energy into the electrodes' interface directed through the electrodes during welding stages, the threads are preferably sized to be 20 threads per inch (TPI) or finer. The threads are preferably sized to be fine enough to ensure optimum surface contact and efficient transfer of ultrasonic energy into the weld nugget instead of dissipation into heat at the interfaces between the electrodes 16, 18 and the components 22, 24, respectively.

Figure 7:
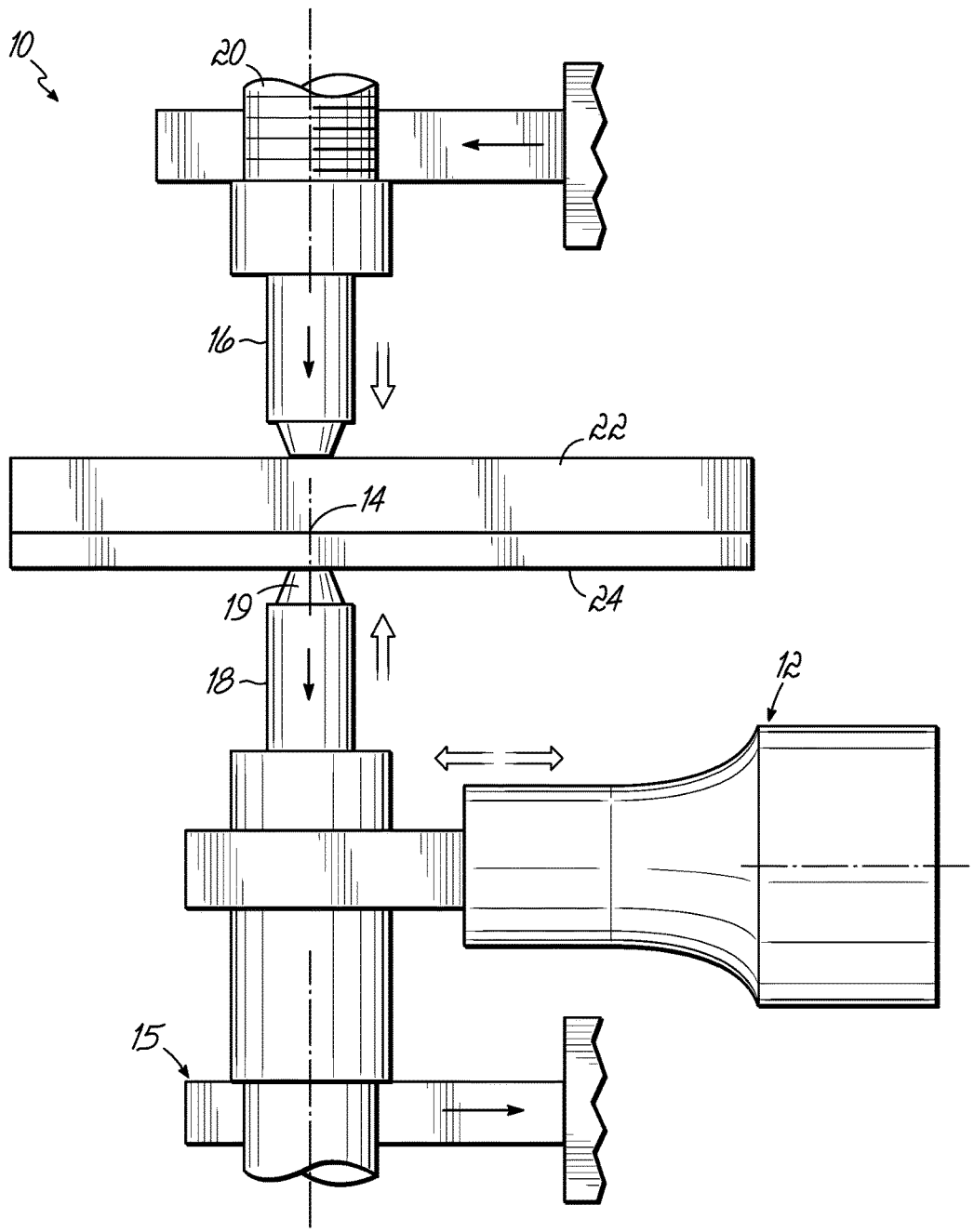
FIG. 7 is a schematic illustration of an ultrasonic resistance welding system with the ultrasonic vibration applied in the lateral direction.

A vibrable second electrode 18 is fixed to the URW apparatus 10 at a position opposite the first electrode 16 and below the contact interface 14. The term "vibrable" is meant to convey that the ultrasonic transducer 12 operably communicates with the vibrable electrode 18 to impart vibrations thereto. As also shown in FIG. 1A, in a known manner, force is applied through each electrode 16, 18 to impinge the materials 22, 24, respectively, at the contact or lap joint interface 14 during the welding stage. Also, in a known manner, electrical current operably communicates with the materials as it is transferred from the URW apparatus 10 and the RSW 15 through first electrode 16 and then through second electrode 18, during the welding stage. Yet further, as shown in FIG. 1A, second electrode 18 operably communicates with and is vibrated by the ultrasonic transducer 12 to impart vertical vibratory energy perpendicular to contact interface 14. Alternatively, as shown in FIG. 7, the ultrasonic transducer 12 may be positioned to operably communicate with and vibrate the vibrable second electrode 18 such that horizontal vibratory energy is imparted parallel to the contact interface 14.

Figure 1C:
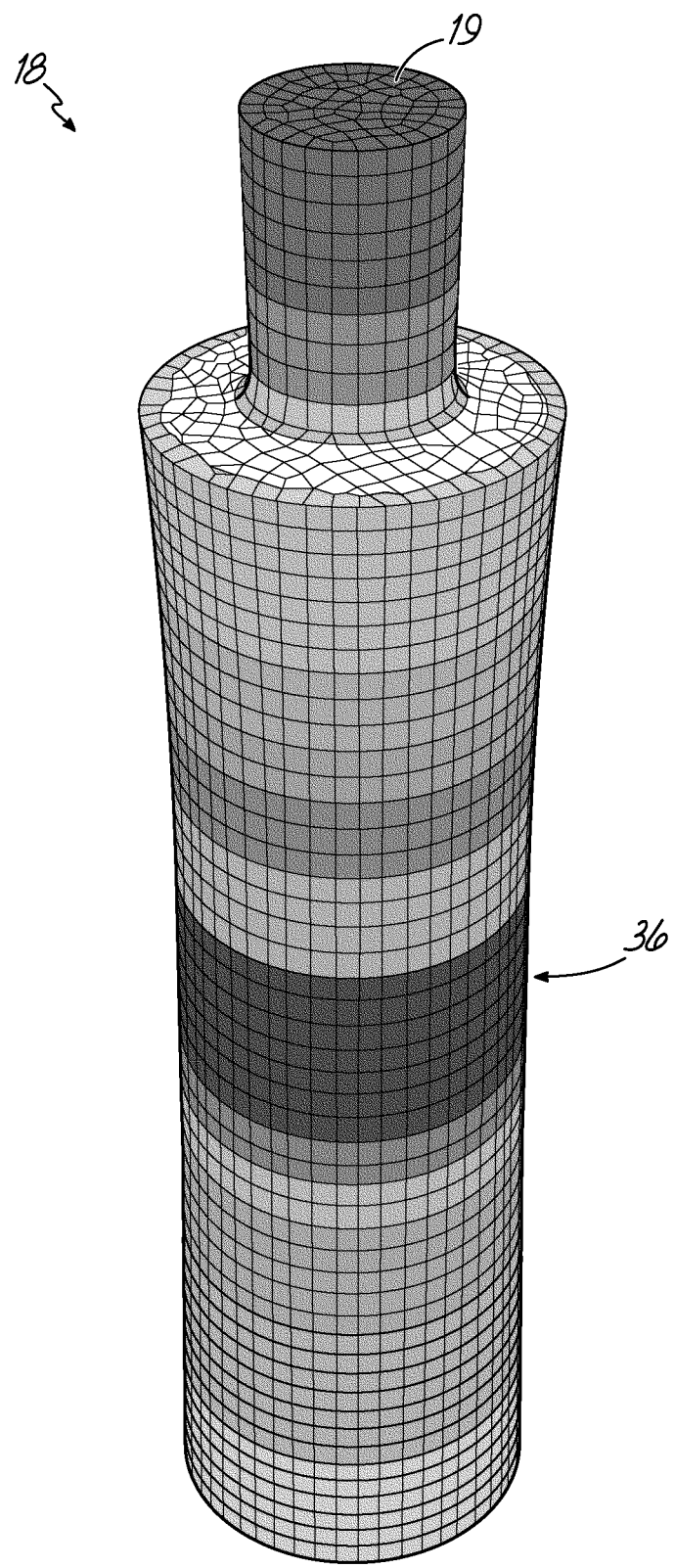
FIG. 1C is a finite element model simulation of a longitudinal vibration mode for an electrode.

As shown by the two-headed vertical arrow, in the embodiment shown in FIG. 1A, vibratory energy or vibration direction is substantially perpendicular to the lap joint interface 14. The total length of the vibrable second electrode 18 is tuned at either half or full wavelength such that its tip 19 vibrates at the maximum displacement amplitude (anti-nodal point) 38. Finite element analyses of the vibrable second electrode 18 (FIG. 1C) are performed to determine and tune the electrode geometry, such that at its resonant or natural vibration frequency (19.5 kHz in this example), a longitudinal vibration mode is achieved to resonate with the ultrasonic transducer. In the case of the horizontal vibration mode shown in FIGS. 1A and 7, the nodal plane or plate 36 would be perpendicular to the direction of the vibration mode (as shown by the vertical two-ended arrow in FIG. 1A), for example. The second electrode or sonotrode 18 is mounted to the RSW machine 15 of the URW apparatus 10 at the nodal plane 36 to isolate the vibration from the entire structure 10. As shown in FIG. 1C, the nodal plane or plate 36 of the vibration energy can be approximated as occupying a plane located within a median lateral portion 21 along the length of the second electrode or sonotrode 18. Accurate position of the vibrable second electrode 18 can be determined by finite element analysis and experimental verifications as illustrated in FIG. 1C, where the location with the minimum amount of vibration amplitude (e.g. the nodal point 36) is identified when part 18 is connected to the resistance spot welder (RSW) 15, in operable communication with the ultrasonic transducer 12. The second electrode 18 with its sonotrode tip 19 are also replaceable and are readily removed to replace the electrode due to wear, or simply due to tailoring a different type and/or amount of material being welded, for example. To that end, a threaded end 23 (not shown) of the tip 19 may be received within the URW apparatus 10 or RSW 15, for attachment thereto.

An exemplary URW apparatus 10 is schematically represented in FIG. 1B and is adapted from an AC (alternating current) resistance spot welder (RSW). The electrical current is measured by a Rogowski coil 26, for example, and the dynamic welding force is measured through a highly sensitive strain sensor 28 mounted at the bottom of the lower arm of the RSW machine 10. The current and force signal recorded by the data acquisition (DAQ) system 30 is processed with a Lab View control program and algorithm or controller 32, provided by National Instruments of Austin, Tex., for example. Based on the collected electrical current or force data, an actuating signal is sent to an electronic switch (not shown) that digitally controls the start-and-off time of the ultrasonic generator 34, allowing a precise adjustment of the synchronization between electrical current and ultrasonic vibration. Depending on different scenarios and requirements, the ultrasonic vibration can be triggered based on one or more variables before the electrical current starts, or after several cycles of the electrical current, or a local melting is detected based on the force, welding distance, or dynamic resistance, wherein these and other variables can be measured with appropriate installed sensors.

Figure 2:
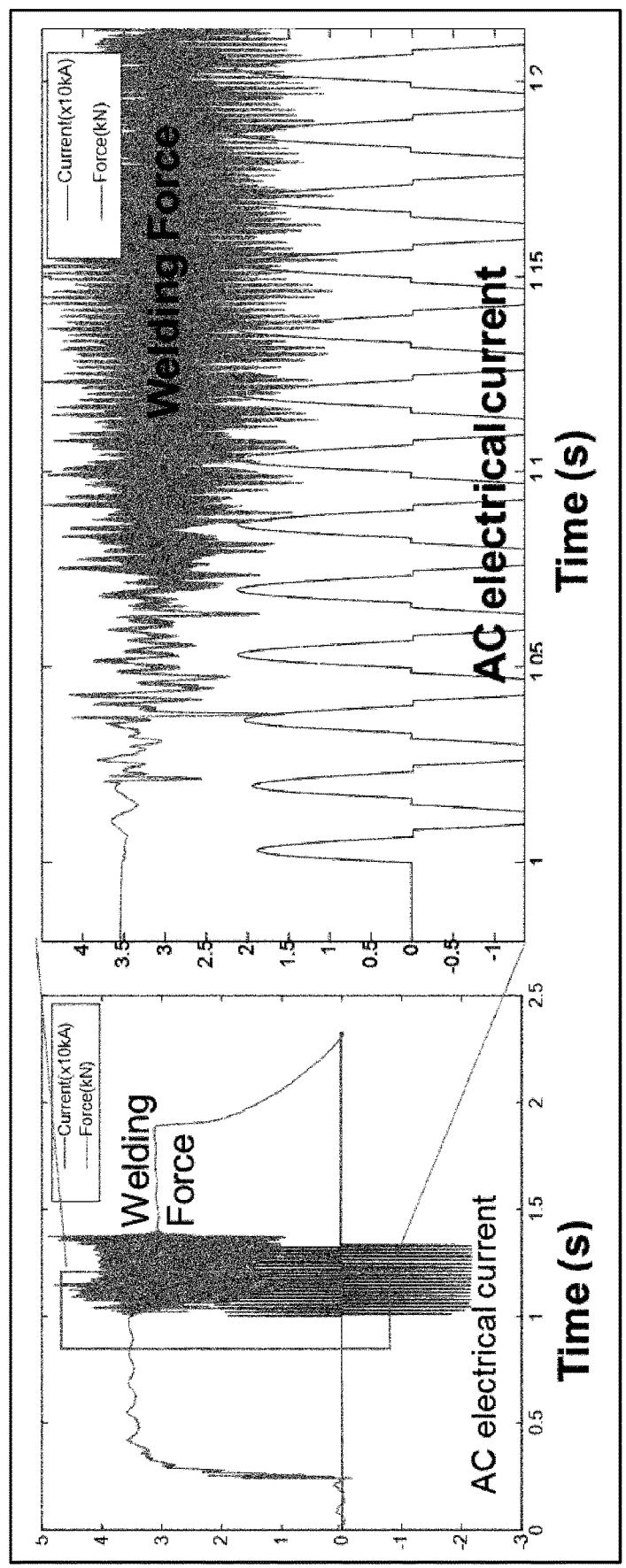
FIG. 2 is a graphical view illustrating the welding force and electrical current measured during URW of an aluminum alloy to TRIP steel.

In FIG. 2, the welding force and the synchronized electrical current is shown when joining Aluminum alloy Al 6061 to TRIP steel in one embodiment of the URW process, where the sampling rate is 40 kHz to capture the dynamic details of ultrasonic vibration. 20 AC cycles with electrical current RMS value of 13.4 KA is applied in this condition. The ultrasonic vibration starts after 3 AC cycles and stabilizes after 5 AC cycles, where a large amount of vibration is observed on the welding force curve.

Figure 3:
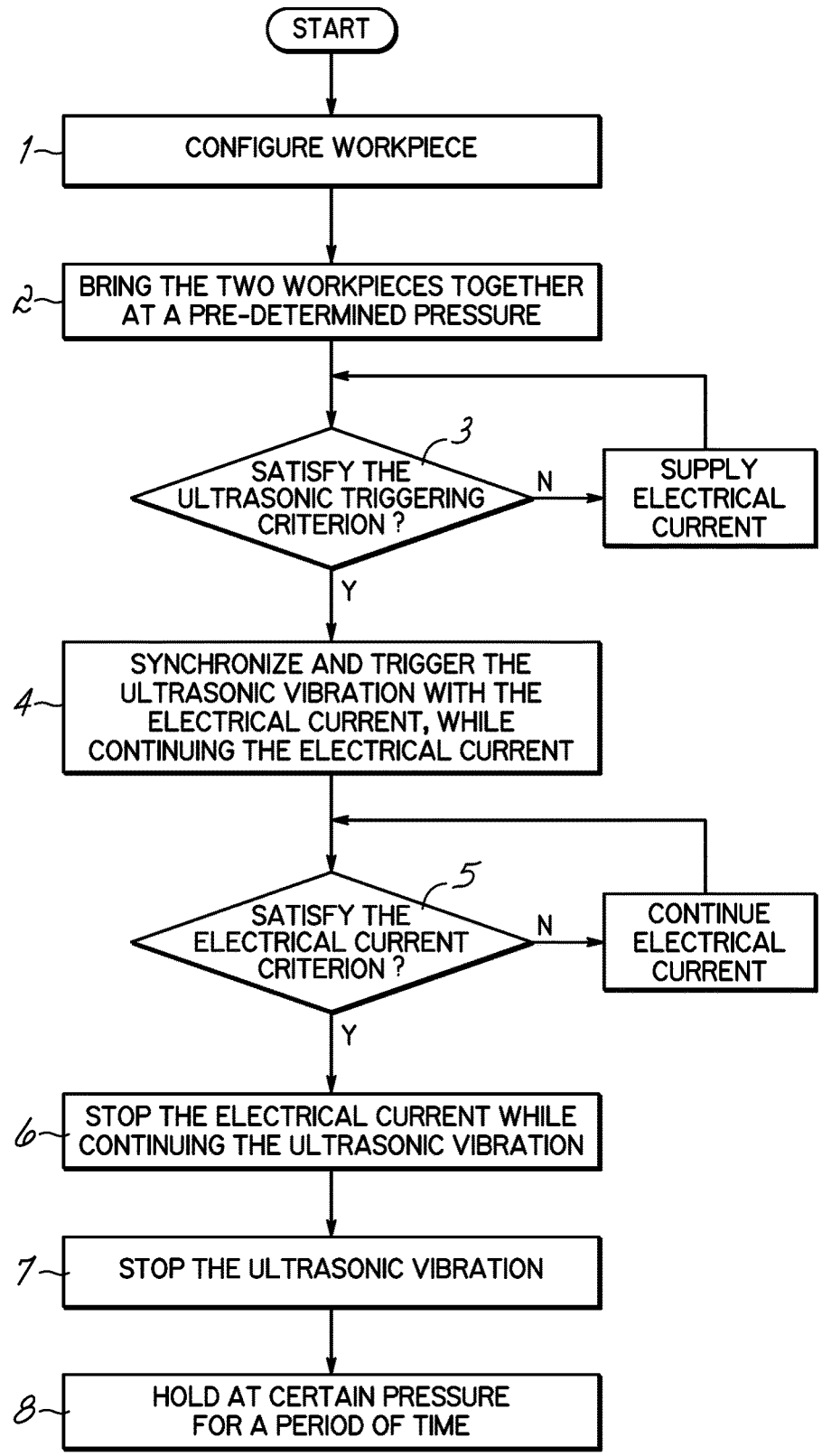
FIG. 3 is a flowchart of the URW weld schedule.

FIG. 3 is a flowchart of one exemplary embodiment of the URW weld schedule. Step 1 is to configure the workpieces (i.e. components or materials 22, 24) for welding. Step 2 is to apply a predetermined pressure to bring the two components or materials 22, 24 (workpieces) together. Step 3 is to determine whether the criterion collected from the data acquisition system 30 is sufficient, based on selected parameters, to trigger the generation of ultrasonic vibrations from the generator 34 vis a vis direction and switching from the controller 32. If not, electrical current is supplied and the system 10 by and through the controller 32 continues to evaluate whether the desired/selected criterion has been satisfied. Step 4 is to trigger the ultrasonic vibration, possibly before application of the electrical current, at the same time as applying the electrical current, or after the electrical current is applied based on a preset criteria such as detected local melting based on pressure or force; welding distance; dynamic resistance, and/or a combination of these and other desired variables. These and other variables can be measured with appropriate sensors, such as pressure sensor 28 of FIG. 1B, wherein such measurements are then communicated to the data acquisition system 30, which in turn communicates them with the controller or control system 32 for dynamic control of the URW 10. Accordingly, in accordance with the present invention, electric current and ultrasonic energy may be synchronized as described herein, for simultaneous application at the weld interface 14.

Continuing with reference to FIG. 3, Step 5 is to determine whether the electrical current stop criterion, again criterion collected from one or more sensors communicating with the data acquisition system 30, is sufficient to terminate the electrical current. If not, electrical current is continued, and the system 10 by and through the controller 32 continues to evaluate the selected requirements to determine whether or not to continue supplying electrical current. Once the criterion of Step 5 are met, Step 6 is to stop the electrical current while continuing the ultrasonic vibration, or, depending on system criterion, to stop the ultrasonic vibration before or simultaneously with the electrical current. Based on recent evaluations, the ultrasonic vibrations should be preferably terminated soon after the electrical current stops, for no longer than 0.1 seconds thereafter. In general, the duration of the vibration energy would depend on different material systems, and therefore, the most reliable way is to iteratively determine, by trial and error for example, the electric and vibratory energy synchronicity for each set of materials to be welded. Step 7 is to cease ultrasonic vibration supplied by the generator 34 based upon predetermined criterion as stated above. In Step 8, the two components 22, 24 (not shown) are then held at a certain pressure for a predetermined period of time. The time of Step 8 can be selected using the American Welding Society (AWS) standards for RSW processing as a guideline, whereby in a similar fashion, the pressure magnitude, the time and amount of electrical current, and other system variables can be iteratively established based on the types of materials to be processed. Exemplary process variable range values include electrical current from 8 kA to 27 kA, welding force from 600 lbs. to 800 lbs., current duration from 167 ms to 500 ms ultrasonic vibration frequency set at either 20 kHz or 40 kHz, and ultrasonic power provided at least at 500 W.

Results of Initial Evaluations/Comparisons of the RSW and URW Equipment

Figure 4:
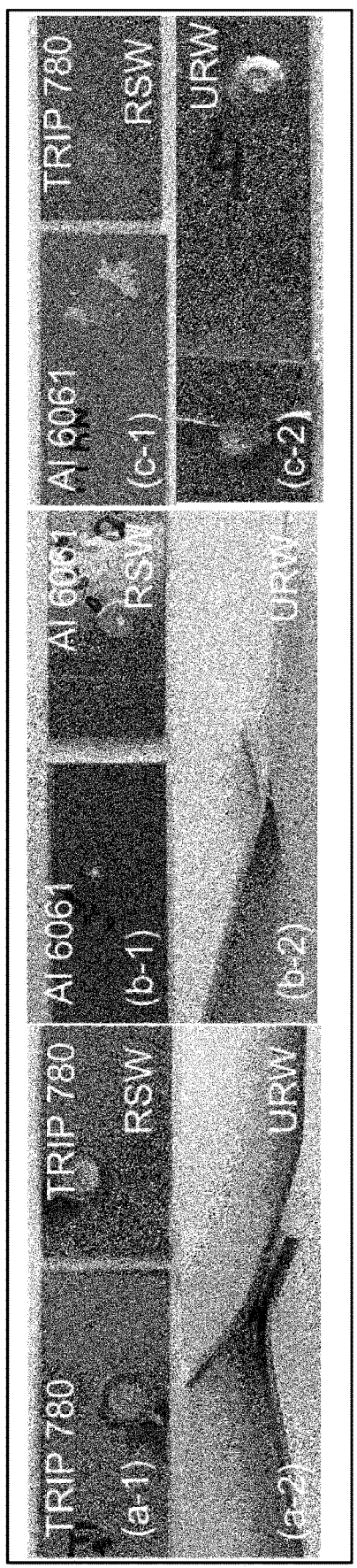
FIG. 4 are photographs comparing RSW and URW welds for different materials: (a-1) RSW of TRIP 780 steel; (a-2) URW of TRIP 780 steel; (b-1) RSW of aluminum alloys; (b-2) URW of aluminum alloys; (c-1) RSW between aluminum alloy to TRIP steel; (c-2) URW between aluminum alloy to TRIP steel.

FIG. 4 compares conventional RSW with URW after lap shear tensile tests. (a-1) and (a-2) of FIG. 4 show the results on galvanized TRIP780 steel. The welding conditions were AC current with root mean square (RMS) value of 11.4 kA, 20 AC cycles, electrode welding force 3 kN. Duration of the ultrasonic vibration was 167 ms and the peak-to-peak vibration amplitude at the tip of the bottom electrode was 34 um. For the conventional RSW, the joint failed in an interfacial fracture mode with limited ductility (FIG. 4, (a-1)). The maximum lap shear strength was around 13 kN. After introducing the longitudinal ultrasonic vibration, a highly ductile button pullout failure was observed, and the joint strength increased significantly to around 20 kN (FIG. 4, (a-2)). (b-1) and (b-2) of FIG. 4 presents the effects of ultrasonic vibration on RSW of Al 6061, where the welding conditions were electrical current RMS of 18 kA, 60 AC cycles, welding force 3 kN, and ultrasonic duration of 500 ms. Acceptable joints could hardly be achieved from conventional RSW. Interfacial debonding occurs and the joint strength is negligible of around 0.66 kN (FIG. 4, (b-1)). Adding ultrasonic vibration promoted the button pullout failure mode and substantially increased the joint strength to around 6.6 kN (FIG. 4, (b-2)). For RSW of Al 6061 to TRIP steel (FIG. 4, (c-1)), when gradually increasing the electrical current magnitude, the weld state transitions from no bonding to aluminum expulsion (FIG. 4, (c-1)). In this case (RMS 13.4 kA, 20 AC cycles, welding force 3 kN, ultrasonic duration 167 ms), the average joint strength was around 2.6 kN. Interfacial debonding occurred during lap shear tensile tests in all the investigated RSW conditions. After introducing ultrasonic vibration (FIG. 4, (c-2)), the aluminum expulsion is restrained. A small aluminum hill is attached to the steel surface. In this case, the joint strength increased to around 5.1 kN on average.

Figure 5:
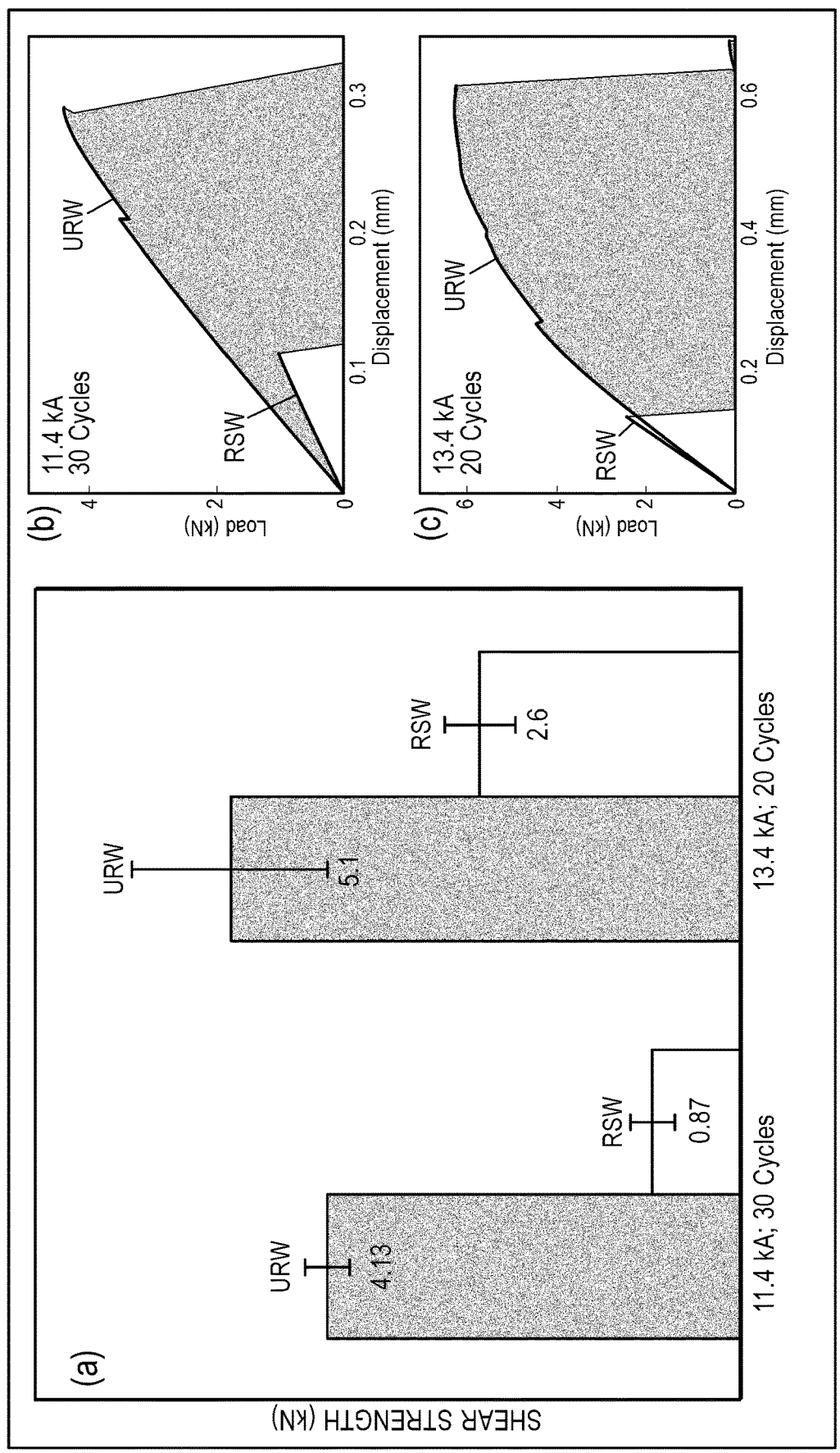
FIG. 5 are graphical views comparing Al-6061-TRIP780 weld mechanical behavior during lap shear tensile tests: (a) Joint strength comparison; (b) Lap shear tensile test curves under welding condition of 11.4 kA RMS and 30 cycles; (c) Lap shear tensile test curves under welding condition of 13.4 kA RMS and 20 cycles.

FIG. 5 compares URW and conventional RSW Al6061-TRIP780 weld mechanical behavior. Two welding conditions were investigated. The first condition used a lower current of 11.4 kA (RMS) with longer 30 AC cycles and the second condition used a higher current of 13.4 kA (RMS) with shorter 20 AC cycles. Ultrasonic vibration was applied for 167 ms in both cases. The welds showed greatly improved load carrying capacity in URW, with both a higher joint strength and ductility. This enhancement is more notable in the case of lower current and longer welding time.

Figure 6:
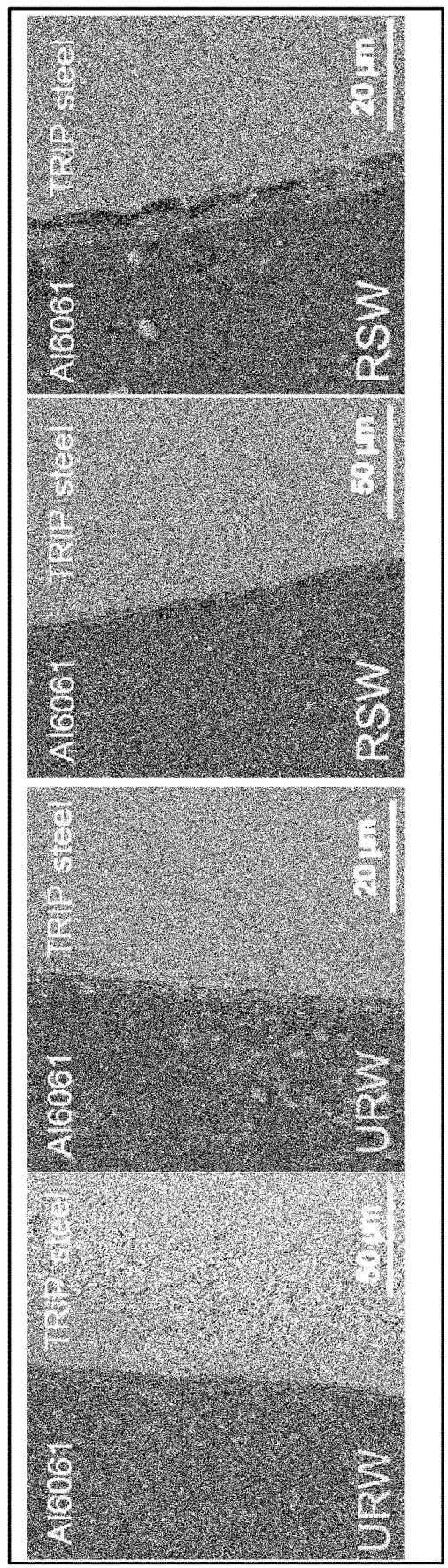
FIG. 6 are photomicrographs illustrating an Al—Fe interfacial microstructure comparison between URW and RSW.

FIG. 6 compares the Al—Fe interface between the hybrid URW and conventional RSW welds. These were obtained under the welding condition of 13.4 kA RMS and 20 AC cycles. In welds obtained from conventional RSW process, a series of microcracks are visible along the interface, which accounts for the negligible weld strength. After adding ultrasonic vibration, a thin layer of Al—Fe IMC with a thickness of less than 2 um was observed. This thickness of IMC is about the same as those produced by other solid-state processes, for example, friction stir welding, which have been shown to be in the range for acceptable Al—Fe welds. A thicker IMC can easily lead to crack initiation and rapid propagation whereas a thinner one provides insufficient bonding.

Secondary Experimental Details

Figure 8:
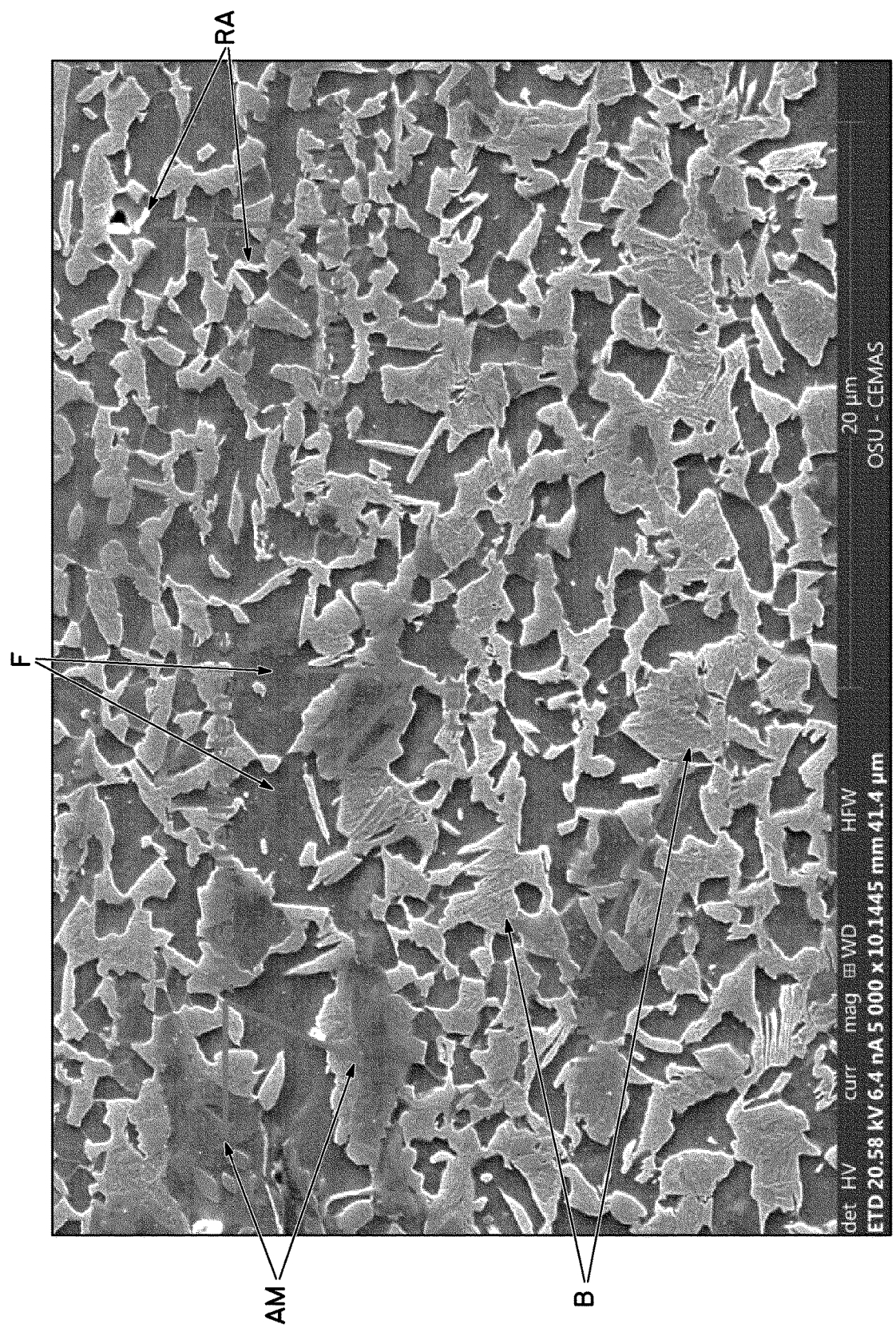
FIG. 8 is a Scanning Electron Microscope (SEM) micrograph of an exemplary sheet of galvanized TRIP 780 steel.

Electrogalvanized TRIP 780 steel with the thickness of 1.6 mm and a coated Zn layer of around 7 μm is used in this study. As a reference, an exemplary supply of TRIP steel contains allotriomorphic ferrite, blocky retained austenite, dispersed bainite and small amount of martensite, shown in the SEM micrograph of FIG. 8. More specifically, with reference to FIG. 8, the letters B, RA, F, and AM, respectively refer to Bainite, Retained Austenite, Ferrite, and Austenite/Martensite, wherein localized examples of these species are shown in FIG. 8. These steel sheets are provided by ArcelorMittal and corresponding chemical compositions are listed in Table 1, wherein smaller amounts of various constituents are listed, and the balance is iron.

TABLE 1

Chemical compositions of the TRIP 780 steel

| | | | | | TRIP-780 | | | | | | | |
|---|---|---|---|---|---|---|---|---|---|---|---|---|
| | C | S | Mn | P | Si | Cr | Ni | Mo | Cu | V | Nb | Ti |
| Wt % | .1 | <.002 | 1.98 | <.002 | 2.35 | <.06 | <0.04 | <.03 | .012 | .019 | <.004 | .01 |

Ultrasonic Resistance Welding (URW) Process

Ultrasonic resistance welding (URW) process The experimental system for ultrasonically assisted resistance spot welding is developed, and the hybrid process is termed hereafter as Ultrasonic Resistance Welding (URW). The URW system is adapted from a conventional AC RSW machine 15 as shown in FIG. 1B. Electrical current passes from the top electrode 16 to the bottom electrode 18. The bottom or vibratory second electrode 18 is directly connected to the ultrasonic transducer 12, and thereby functions as the sonotrode to transfer acoustic energy into the first and second components (i.e. workpiece) 22, 24 simultaneously. The total length of the bottom/base electrode 18 (or sonotrode) is tuned to a certain value such that its tip 19 is located at an antinodal point or plane 38 and vibrates at the maximum amplitude. The natural resonation frequency of the bottom or vibratory second electrode 18 is the same as that of the ultrasonic transducer 12 (around 19.4 kHz).

During URW process, the ultrasonic vibration may be synchronized with the electrical current depending on selected design criterion, as explained above. Duration of the ultrasonic vibration in one embodiment is 500 ms, and the peak-to-peak vibration amplitude $V_{pp}$ is 34 μm, which is measured in the unloaded condition. The AC electrical current is measured via a Rogowski coil 26, which is processed by a data acquisition and self-developed control system to determine the start-and-off time of the ultrasonic power generator 34. Other process parameters include AC current (60 Hz) with root mean square values of 8.8 kA, 9.9 kA, 10.5 kA and 11 kA for 20 cycles (⅓ second) and the applied welding force of 3.1 kN. RSW and URW welds are performed at the same current conditions for benchmarking and comparison.

Weld Property Evaluation and Characterization

Figure 9:
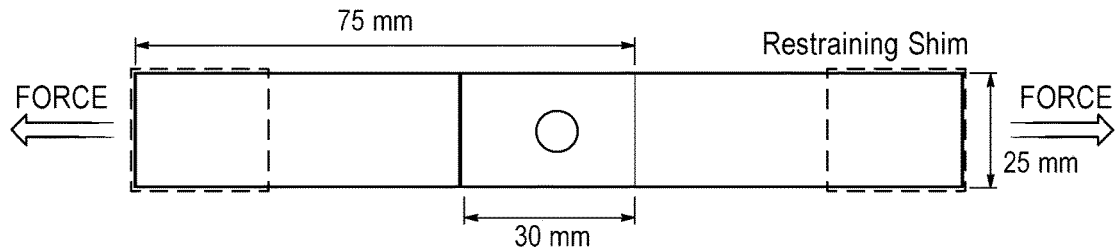
FIG. 9 illustrates the geometry of a weld specimen for lap shear tensile testing.

Lap shear tensile tests of the weld specimens were carried out by a mechanical tensile test system at a displacement rate of 1 mm/min. The long side of the weld specimen is parallel to the sheet rolling direction. Detailed geometries are provided in FIG. 9, which illustrates the typical geometry of the weld specimen for a lap shear tensile test. Restraining shims are placed at the two ends of the specimen to ensure co-planar loading condition. Microstructure of the weld is characterized by light optical and scanning electron microscope (SEM). Metallurgical samples are sectioned along the weld center, ground and polished following standard preparation procedures. The samples are finally etched with 2 vol % Nital solution to reveal different steel phases. Vickers microhardness maps were measured across the weld area, including the weld nugget, the heat affected zone, and the base metal. The hardness measurements are performed with a load of 100 g for a duration of 15 seconds, and 200 μm spacings between indentations.

Results

Weld Mechanical Properties

Figure 10:
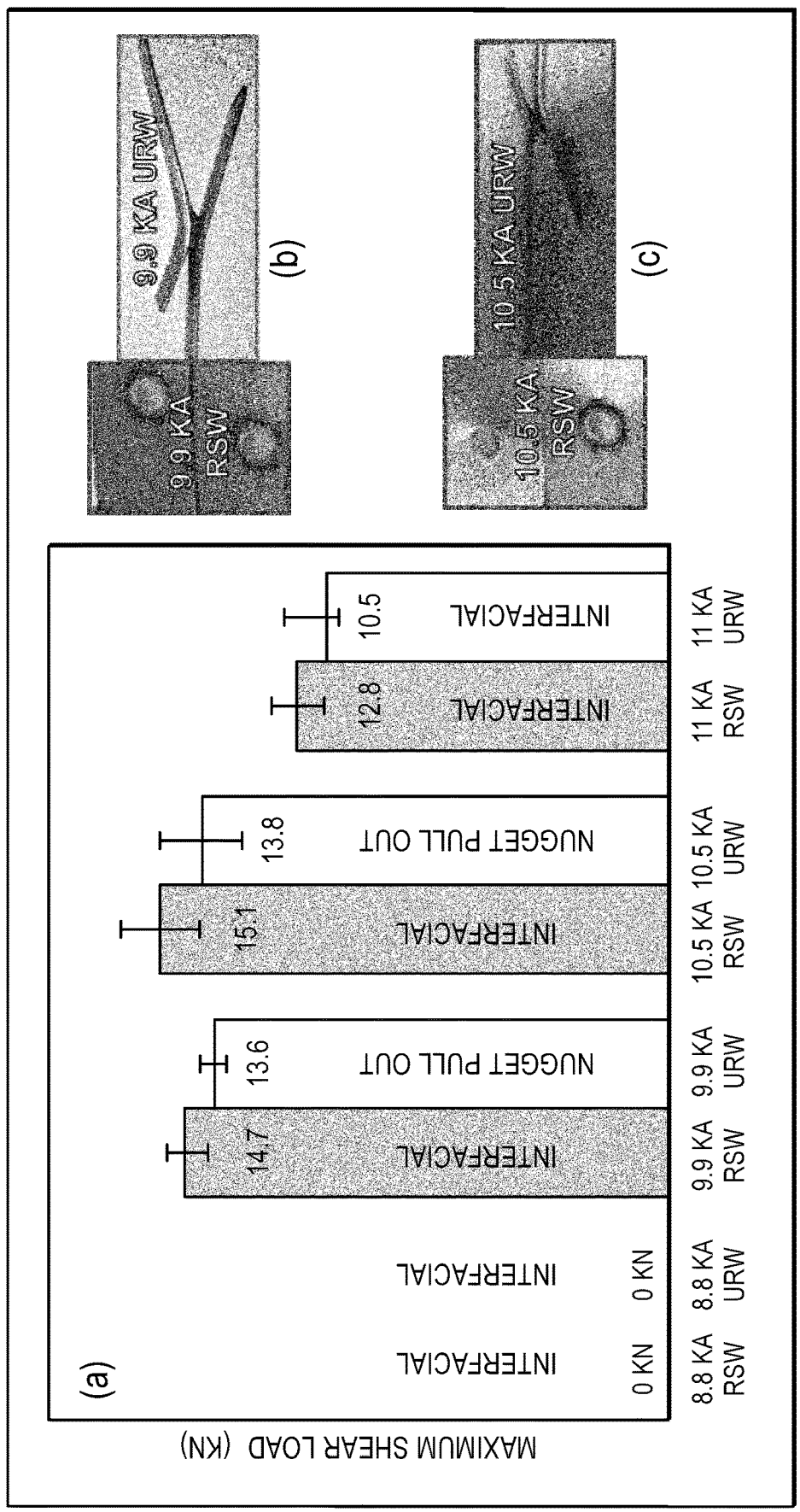
FIG. 10 illustrates the weld strength and failure mode comparison between RSW and URW welds.

During lap shear tensile test, the maximum loads or strength before failure for RSW and URW joints are compared in the graphs of FIG. 10. Overall, electrical current below 8.8 kA is insufficient to initiate welds, while too much expulsion is generated at and above 11 kA. According to AWS D8.1M standard, the acceptable shear tensile strength (STS) of RSW welds can be calculated based on sheet thickness t (mm) and base metal tensile strength (TS, MPa) as follows:

$$STS(kN) = [t^{1.5} \times (-2.544 \times UTS^3 \times 10^{-8} + 2.632 \times UTS^2 \times 10^{-5} + 6.696 \times UTS)]/1000_{min}$$

It can be seen that in the current conditions of 9.9 KA and 10.5 KA, all the welded samples are able to satisfy this minimum requirement of 10.5 kN and provide adequate joint mechanical strength. In this acceptable electrical current range, the difference between RSW and URW weld strength is insignificant statistically. RSW welds show slightly higher tensile shear strength. However, they failed in interfacial debonding (IF) mode, while all URW samples were found to favorably fail in nugget pull out (NPO) mode, as shown in FIG. 10. Failure in NPO indicates that more strain and energy was required to break the weld, or, that the weld is capable of absorbing more energy before failure. This is especially notably beneficial in an impact loading condition, such as a car crash situation, for example.

Figure 11:
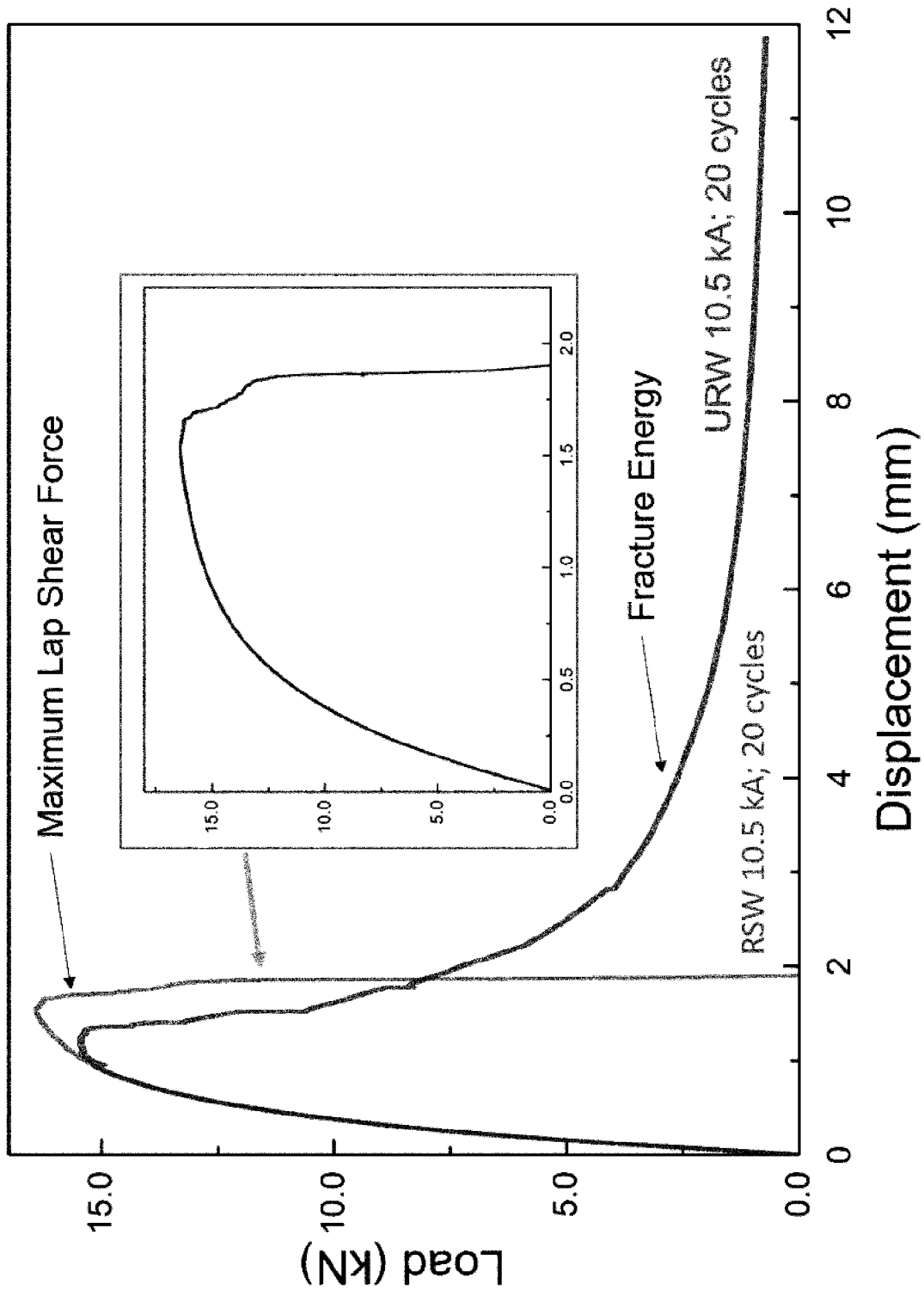
FIG. 11 illustrates the load displacement curve of RSW and URW welds obtained at 10.5 kA.

To further show the different mechanical behaviors of URW and RSW welds in details, load displacement curves of URW and RSW welds obtained at 10.5 kA are provided in FIG. 11. In conventional RSW welds, a maximum load of 15.1 kN is reached, followed by a sharp drop in the curve, indicating a relatively brittle rapid failure. Interfacial debonding is generally observed, which suggests that AHSS steel welds are more prone to IF. As a comparison, the tensile load of the URW weld is slightly smaller at around 13.8 kN. However, nugget pullout mode (FIG. 10) is achieved with higher amount of plastic deformation. In other words, the weld is capable of absorbing more energy before failure. Interfacial debonding failure mode would occur under the normal stress at the interface between the two sheets. During lap shear tensile tests, the notch tip of welds is initially loaded under mode II/III (tangential modes). As the weld starts to rotate, the fraction of mode I (normal opening) increases. Whereas in NPO, the region around the weld fails due to the subjected tensile stresses arising from the superimposed tension and bending loads. Fracture occurs in the relatively soft heat affected zone (HAZ). Microstructure comparison between the URW and RSW welds will be provided in the following session to understand these observed different mechanical behaviors.

To investigate the effects of Zn coating, another set of RSW welds were performed where Zn layer was mechanically removed at the steel/steel contact interface prior to welding. In this case, NPO failure modes can be obtained for both URW and RSW welds. The Zn coating is known to have a lower electric resistance than bare TRIP steel. It is believed that as the thickness of the Zn layer increases, the weldability window may shift towards higher current region. Zn at the faying surface of the two sheets acts as an interface layer and tends to form a small weld nugget, which results in interfacial failure during tensile tests. In this investigation, removal of Zn shows the capability to transform the failure mode of RSW welds from IF to button pullout condition, which is similarly achieved through URW process, when all the electrical current parameters remain unchanged. Accordingly, it is believed that the ultrasonic vibration can help break up the Zn coating at the contact interface during RSW, which facilitates weld nugget formation and growth.

Figure 12A:
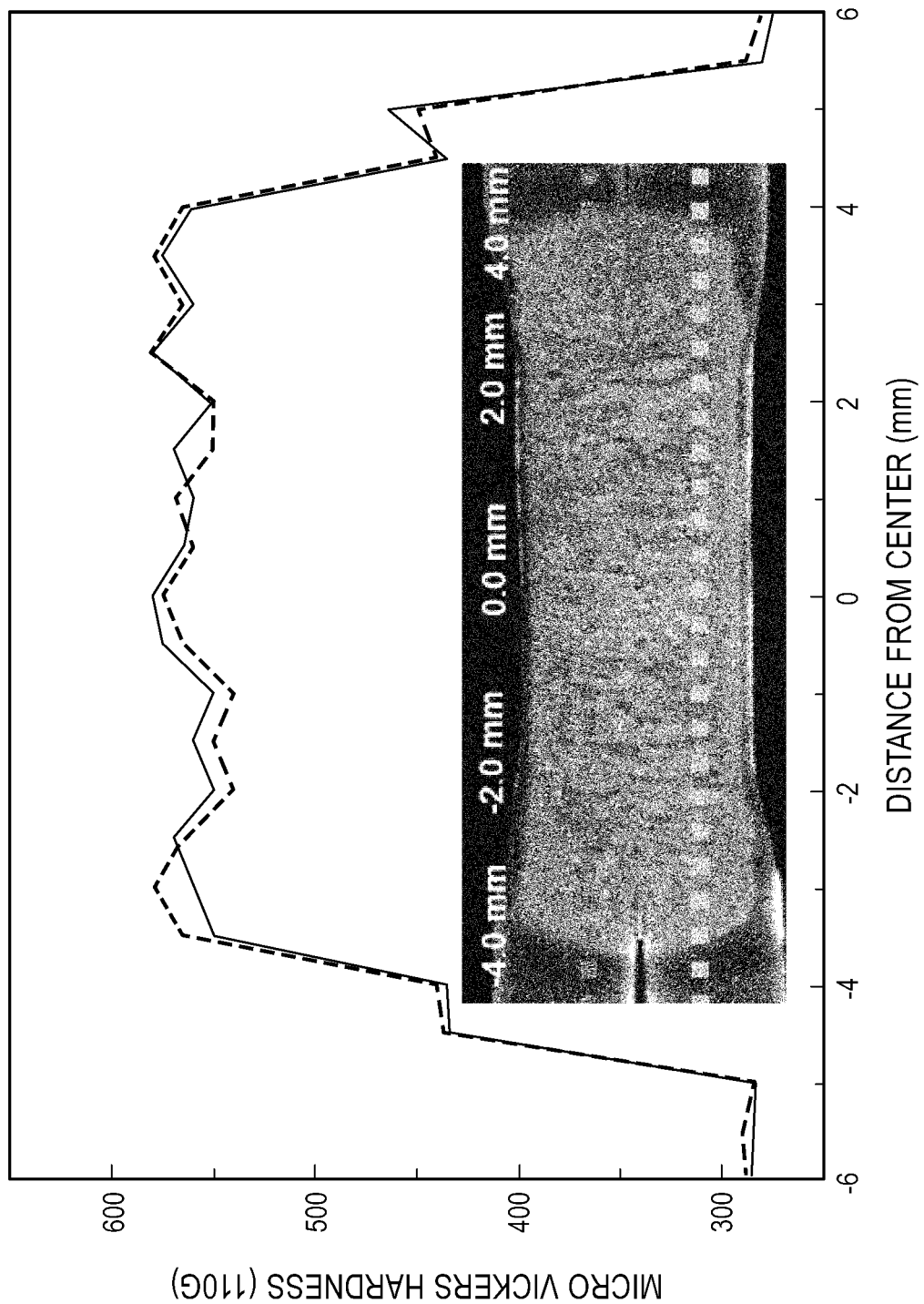
FIG. 12A illustrates the microhardness profile across the fusion zone relative to RSW at 10.5 kA for 20 cycles.
Figure 12B:
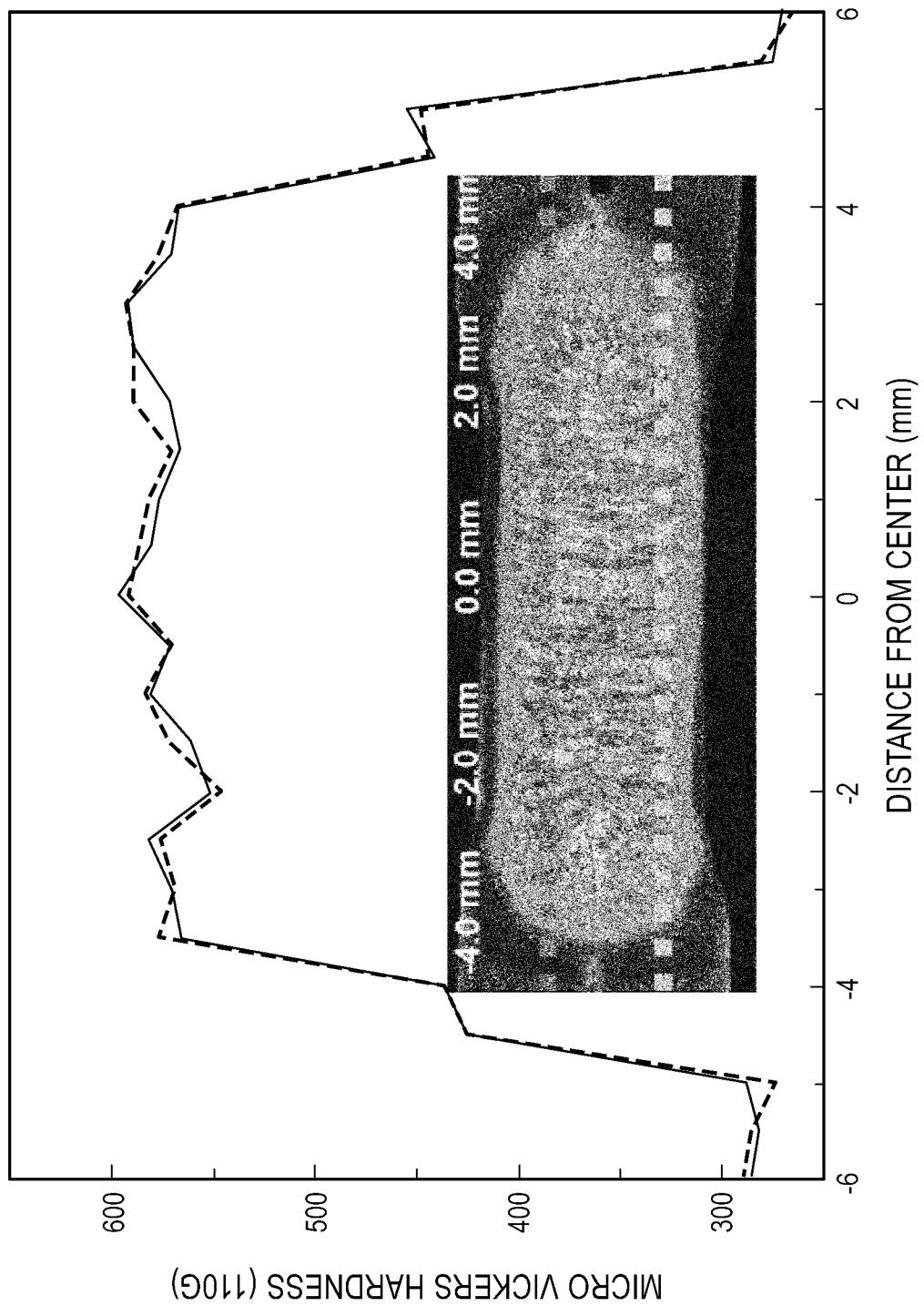
FIG. 12B illustrates the microhardness profile across the fusion zone relative to URW at 10.5 kA for 20 cycles.
Figure 15:
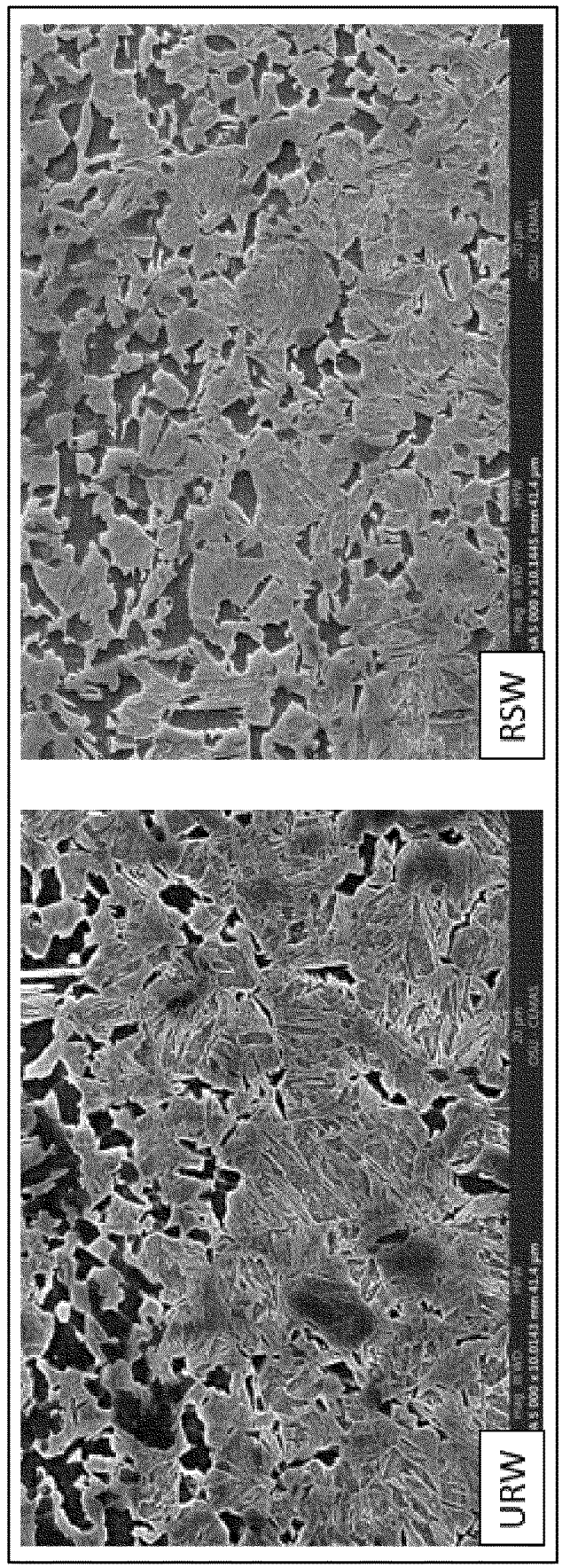
FIG. 15 provides SEM micrographs comparing the inter critical heat affected zone (ICHAZ) between URW and RSW welds.

FIG. 12A graphically illustrates RSW at 10.5 kA for 20 cycles, and, for the same material, FIG. 12B graphically illustrates URW at 10.5 kA for 20 cycles. As shown, the microhardness profile from the base material (BM) towards fusion zone (FZ) along the center line. BM shows a relatively constant value of 280 HV. As the measurement point moves from base material towards the weld center, an intermediate increase of hardness can be observed, which is in the range of 425 HV to 435 HV and is located around 4 mm from the weld center. This is related to the inter critical heat affected zone (ICHAZ), see FIG. 15 for RSW and URW comparison, which has a two-phase microstructure consisting of ferrite and partially transformed martensite. Moving towards the fusion zone the hardness increases with the increasing fraction of martensite and bainite. The average hardness value of FZ is around 575 HV and the small amount of variations across the region is attributed to microstructural differences such as random distribution of martensitic and bainitic phase, different sizes and local crystallographic orientations of various grains, and possible local segregation of alloying elements.

Weld Microstructure Comparison

Figure 13:
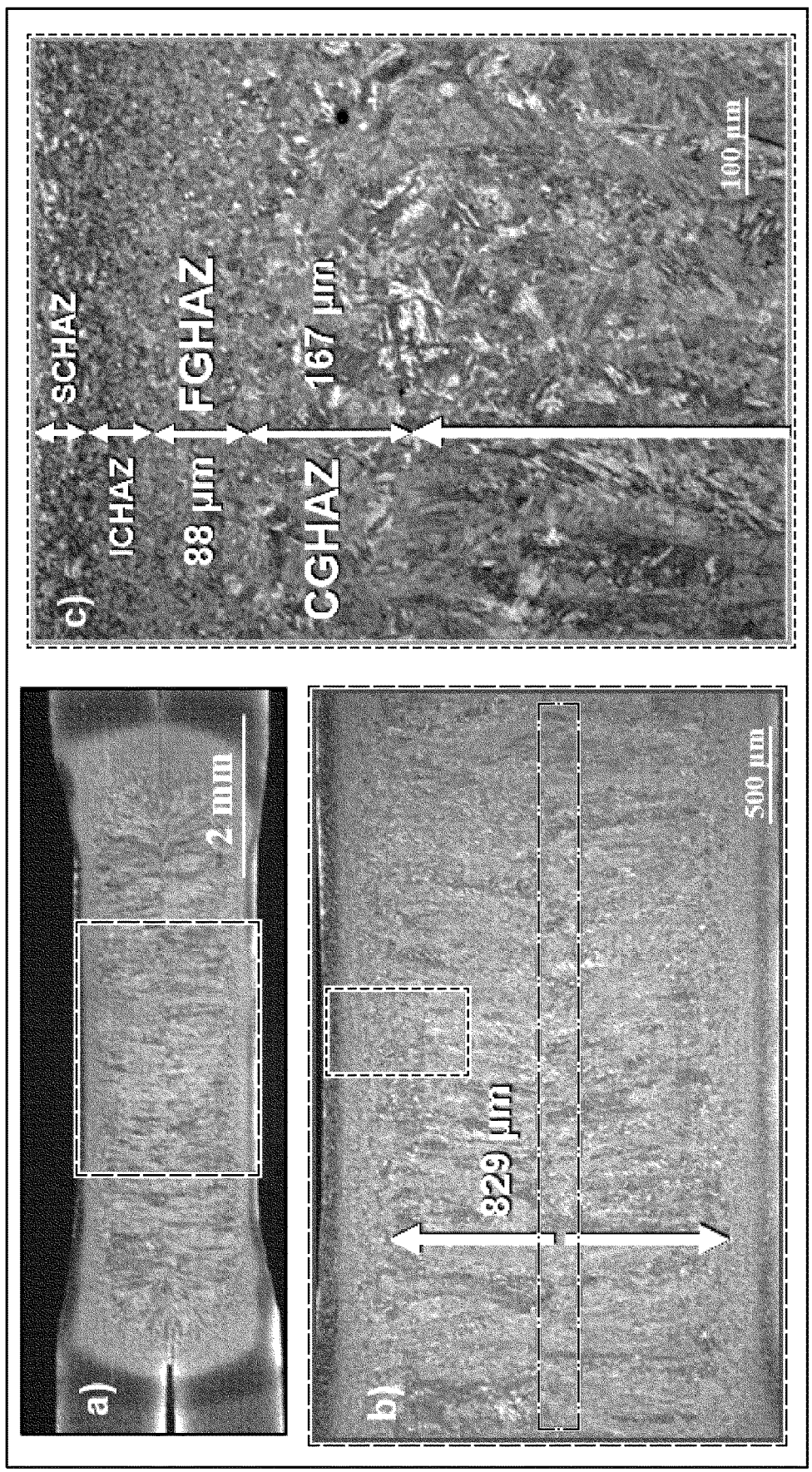
FIG. 13 illustrates optical microscopic images (a-c) of RSW welds at 10.5 kA for 20 cycles.
Figure 14:
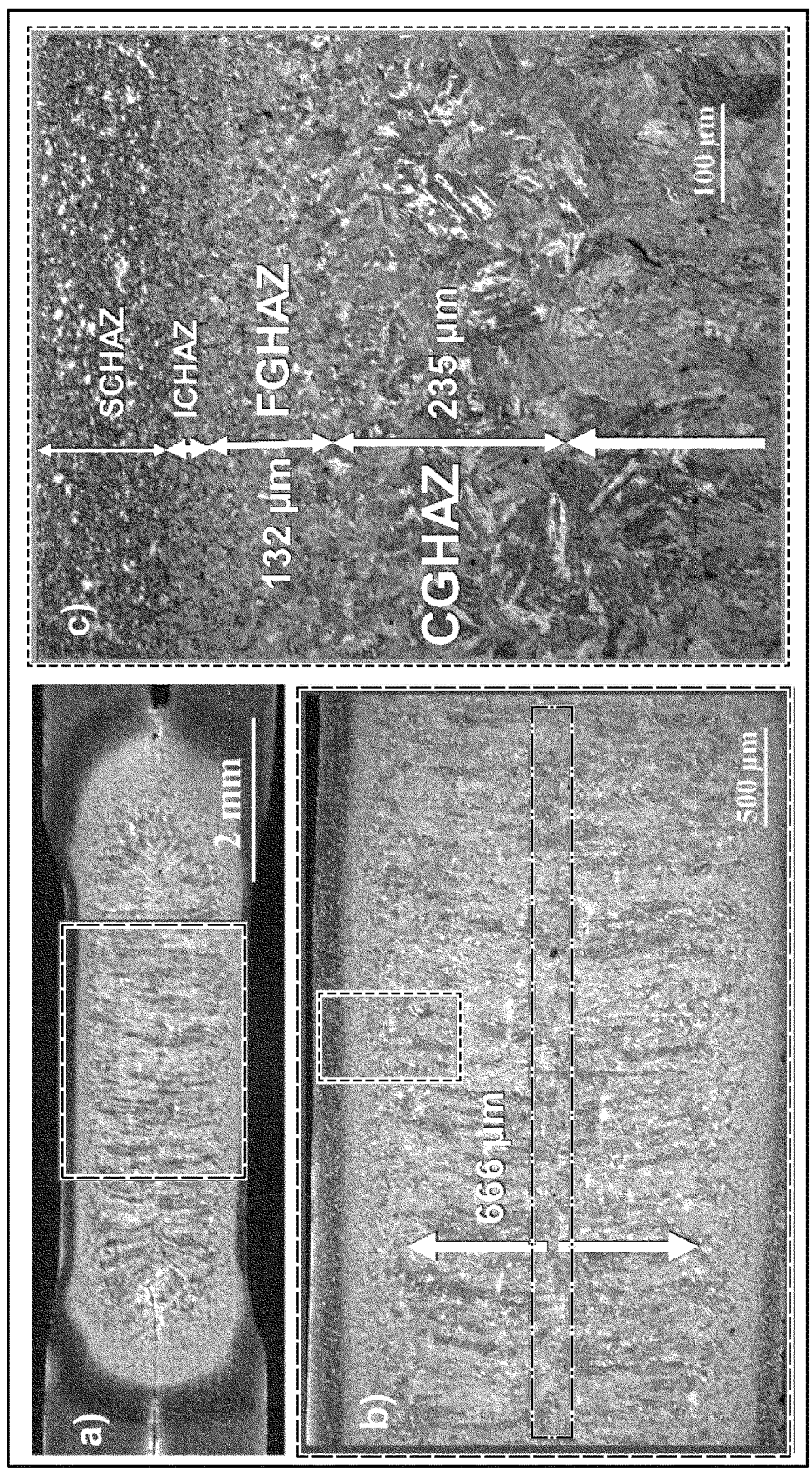
FIG. 14 illustrates optical microscopic images (a-c) of URW welds at 10.5 kA for 20 cycles.

The microstructure of typical RSW and URW welds observed under a light optical microscope (LOM) is provided in FIGS. 13 and 14 respectively. FIG. 13 shows optical microscopic images of RSW welds at 10.5 kA for 20 cycles. FIG. 14 shows optical microscopic images of URW welds at 10.5 kA for 20 cycles. The welds are obtained under the condition of 10.5 kA, 20 cycles and welding force of 3.1 kN. Near the top and bottom surface of the workpiece that contacts the electrodes, the subcritical heat affected zone (SCHAZ) is observed. In this region, the maximum temperature is below A1 and a certain degree of bainite tempering and carbide coarsening can occur. Next to SCHAZ is the ICHAZ, where the peak temperature during welding is between A1 and A3. Austenitization will preferentially occur at martensite and bainite locations, which contain a higher carbon concentration. Subsequently during the fast cooling stage, these partially transformed austenite will be more likely to form martensite due to carbon partitioning. As a result, ICHAZ consists of a two-phase structure including martensite and ferrite grains. SEM images of the ICHAZ zone in URW and RSW welds are compared in FIG. 15. The ICHAZ zone in URW welds is slightly narrower than that in RSW welds. Accordingly, during URW process, the locally concentrated carbon in bainite and martensite regions can be homogenized under the superimposed ultrasonic vibration, which increases the average carbon level in the entire microstructure and facilities austenite transformation during heating stage. As a result, the amount of remaining ferrite is reduced, and the ICHAZ area is narrower.

In between ICHAZ and fusion zone (FZ) is the upper critical heat affected zone (UCHAZ), where the temperature is between A3 and the melting point. In this region, the base metal structure is fully transformed into austenite during heating, which eventually forms martensite and bainite upon cooling. Depending on the temperature range and length of thermal history, UCHAZ can be further divided into fine grain heat affected zone (FGHAZ) and coarse grain heat affected zone (CGHAZ). CGHAZ is located adjacent to the fusion zone. Large prior austenite grains can form in this region, which finally exhibit as blocky grains of martensite after the weld. As presently understood, the cooling rate of CGHAZ may be higher than FZ, which generally leads to a full martensite structure. The temperature in FGHAZ is relatively lower than CGHAZ and the transformed austenite has a smaller grain size.

Figure 16:
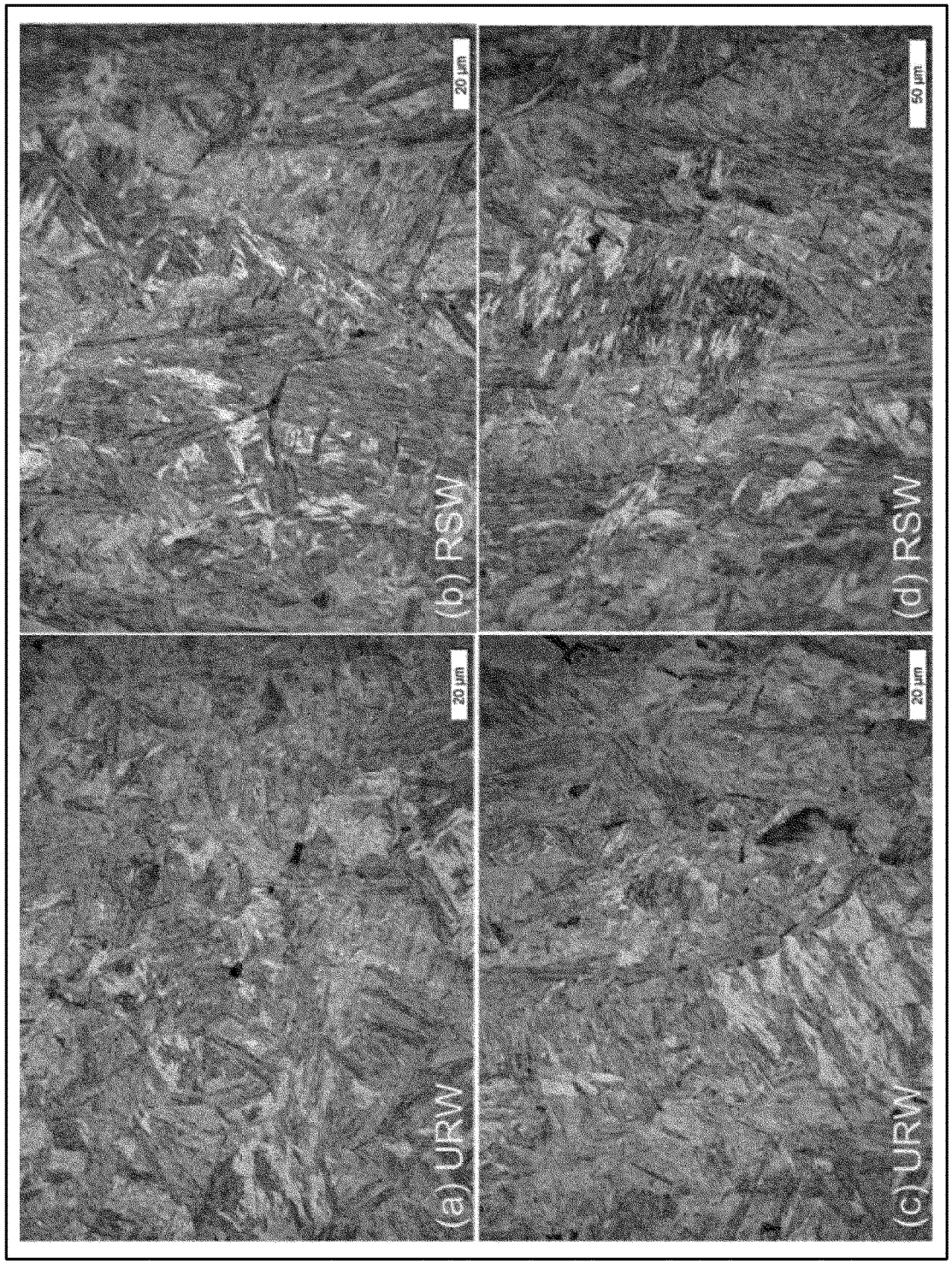
FIG. 16 provides a comparison of the martensite structure in the fusion zone (FZ) between URW (a and c) and RSW (b and d) welds.

In the center of the weld is the fusion zone (FZ), where metal melting and solidification occurs. During RSW, as presently understood, the cooling rate may reach 4000° C./s. This leads to directional epitaxial solidification towards the center of the fusion line, which forms large columnar structure of martensite and bainite along the thickness direction. The microstructure evolution in the fusion zone is dominantly controlled by peritectic solidification and solid-state eutectic phase transformation. It can be observed in FIG. 13 that in conventional RSW welds, the thickness of columnar martensitic grains in fusion zone (indicated by green arrow in FIG. 13b) is around 829 µm. As a comparison, after adding ultrasonic vibration, the thickness of this region is reduced by 20% to around 666 µm, shown in FIG. 14. Another interesting feature to observe is that in the RSW weld (FIG. 13b) the centerline along the weld thickness direction is sharp and straight while in case of URW, the centerline is not clearly distinguishable and is marked by the red dashed lines in FIG. 14b. The region where dendrites meet shows a zigzag behavior and entangle each other in a pattern of peaks and valleys. A more detailed comparison of the optical microstructure in the fusion zone between URW and RSW welds is provided in FIG. 16. FIG. 16 compares the martensite structure in the fusion zone between URW (FIGS. 16a and c) and RSW (FIGS. 16b and d) welds. As shown in FIGS. 16(a-d), more equiaxed structure and brighter (whitish) area can be observed in the URW welds.

Figure 17A:
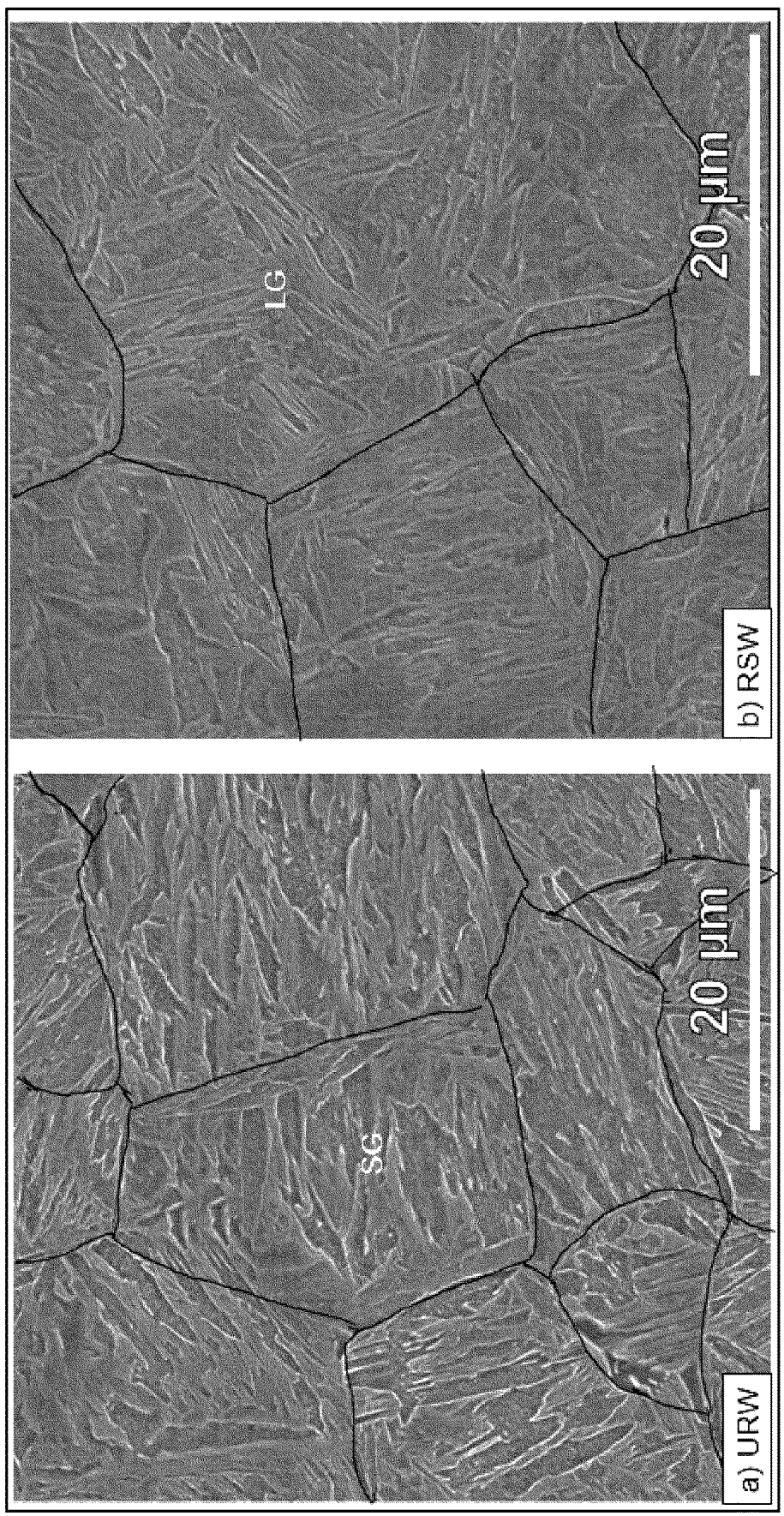
FIG. 17A provides SEM micrographs showing (a) the course grain heat affected zone (CGHAZ) of URW; and (b) the course grain heat affected zone (CGHAZ) of RSW.
Figure 17B:
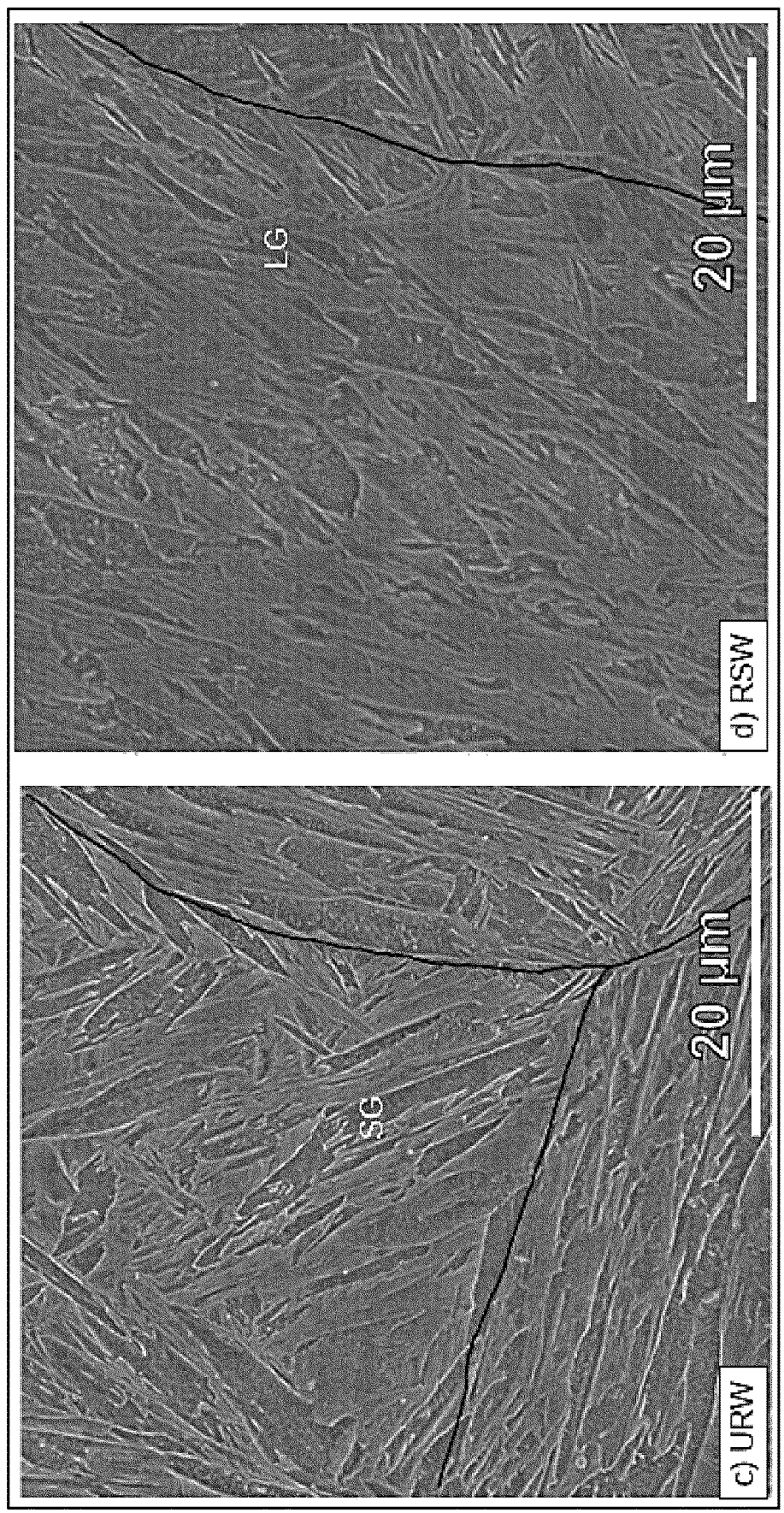
FIG. 17B provides SEM micrographs showing (a) the fusion zone (FZ) of URW; and (b) the fusion zone (FZ) of RSW.

The weld microstructure at different regions is further characterized with scanning electron microscope (SEM) for a higher magnified view. FIGS. 17(a-d) provide SEM micrographs showing a) CGHAZ of URW; b) CGHAZ of RSW; c) FZ of URW; and d) FZ of RSW, wherein SG represents smaller grains and LG corresponds to larger grains. FIGS. 17a and 17b compare the CGHAZ between URW and RSW welds, where the grains in the former one are smaller. FIGS. 17c and 17d compare the fusion zone and a refined structure that can also be observed in URW welds.

The fusion zone is further examined in detail, as shown in FIG. 18. Bainitic islands (BI) structure is observed in conventional RSW welds, which is also known as coalesced bainite. Coalesced bainite has been found in dendritic core regions of AHSS welds. The formation of coalesced bainite starts with the supersaturated ferrite platelets with the same orientation, which join and merge into one coarse plate without intervening austenite film. Coalesced bainite is different from conventional lower bainite in terms of carbon precipitation. In coalesced bainite or BI, carbon is precipitated as cementite towards center of ferrite grain randomly, whereas in lower/upper bainite, cementite is present in certain patterns. As presently understood, the presence of BI in the steel microstructure results in relatively high strength but poor toughness and less resistance to crack propagation. This is ratified by our load displacement test results and the interfacial debonding failure mode observed in the RSW welds.

Figure 18A:
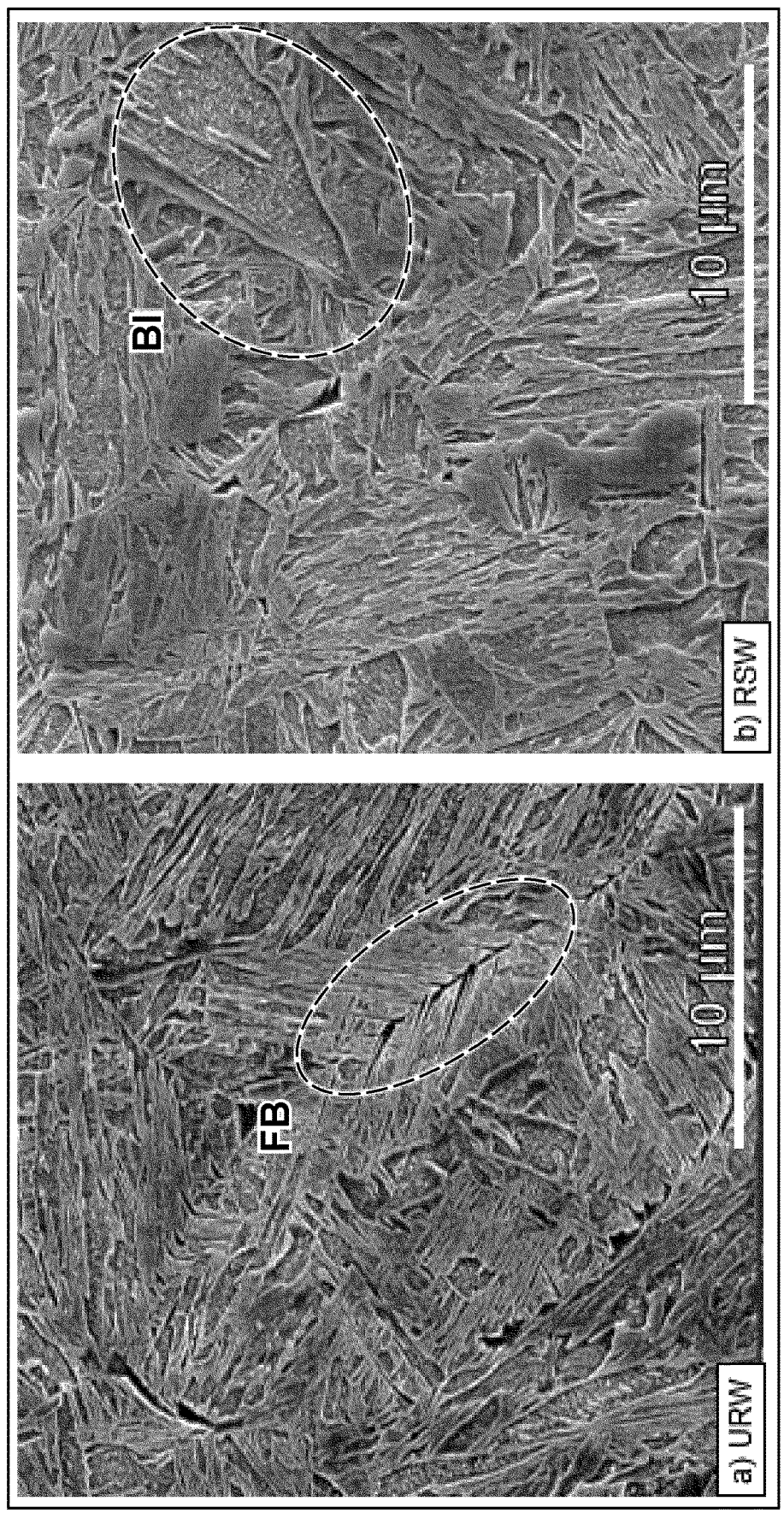
FIG. 18A provides SEM micrographs showing (a) FZ of URW; and (b) FZ of RSW. Here FB corresponds to feathery bainite and BI corresponds to bainitic islands.
Figure 18B:
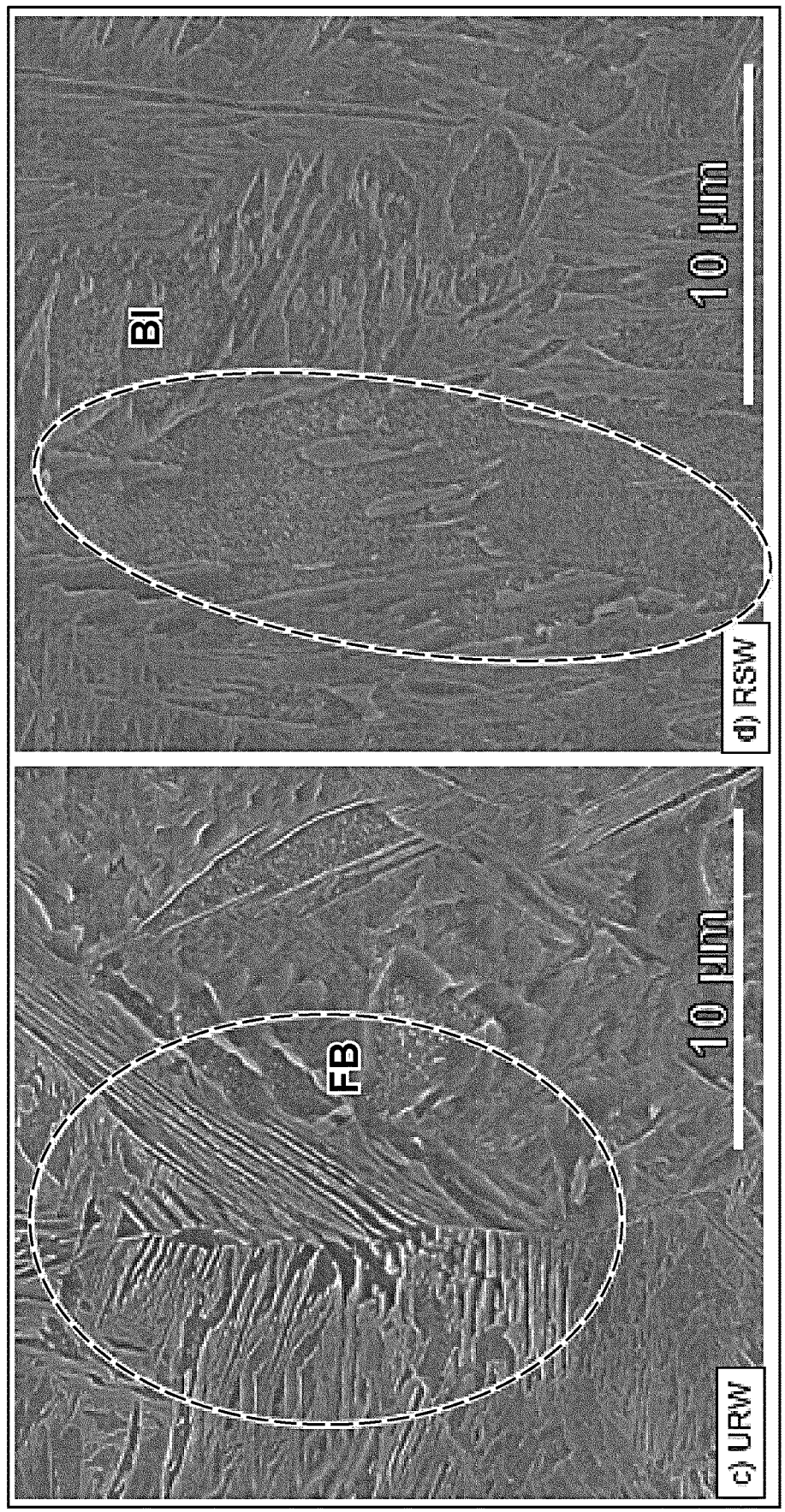
FIG. 18B provides SEM micrographs showing (c) FZ of URW; and (d) FZ of RSW. Here FB corresponds to feathery bainite and BI corresponds to bainitic islands.

On the other hand, the fusion zone of URW shows the presence of feathery bainite in certain locations, as shown in FIGS. 18(a and c). FIGS. 18(a-d) provide SEM micrographs showing (FIGS. 18a and c) FZ of URW; (FIGS. 18b and d) FZ of RSW. Here FB corresponds to feathery bainite and BI corresponds to bainitic islands. As presently understood, feathery bainites are groups of large parallel ferrite plates formed during early stages of upper bainite.

Figure 19A:
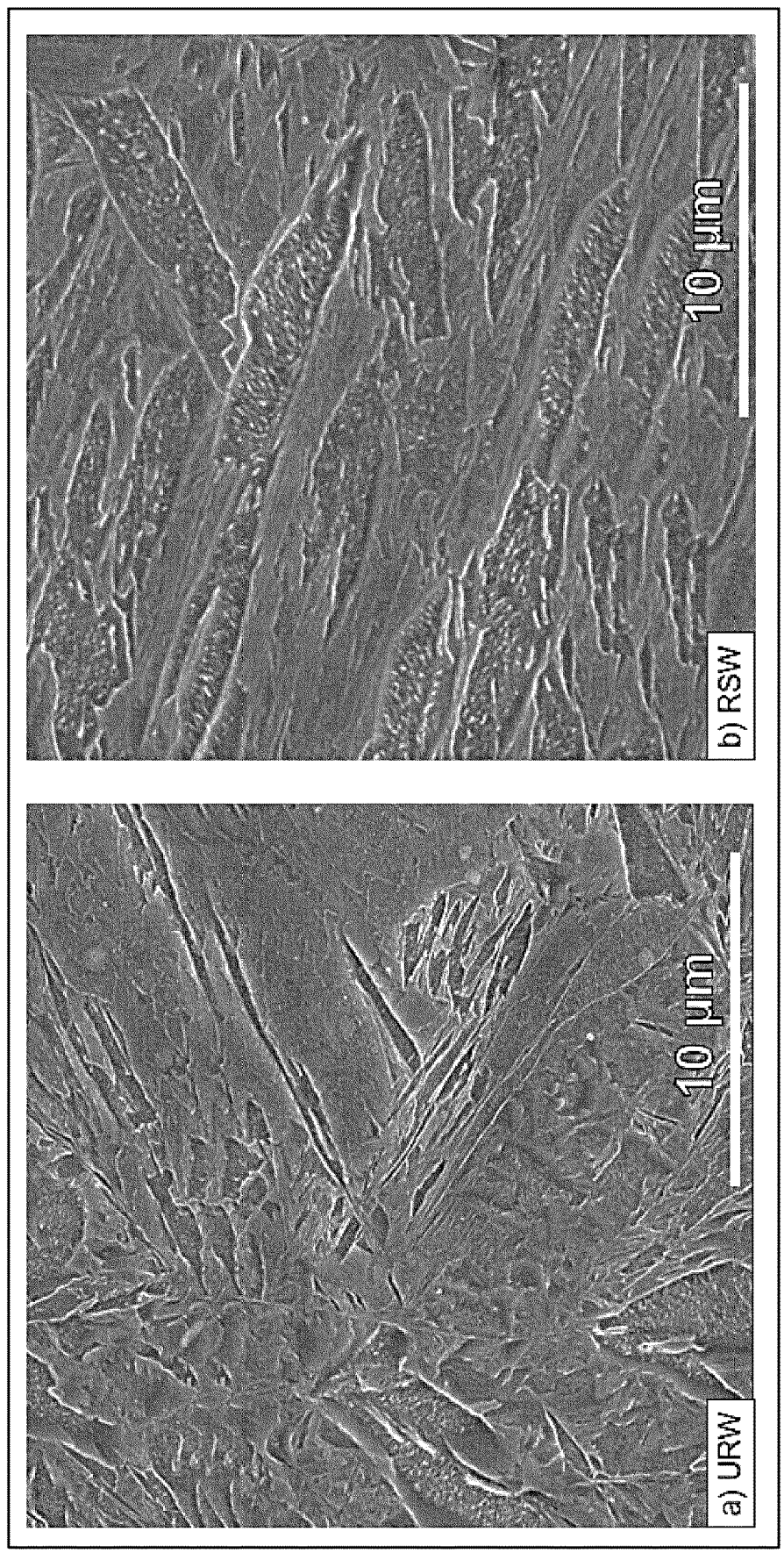
FIG. 19A provides SEM micrographs showing (a) FZ of URW; and (b) FZ of RSW.
Figure 19B:
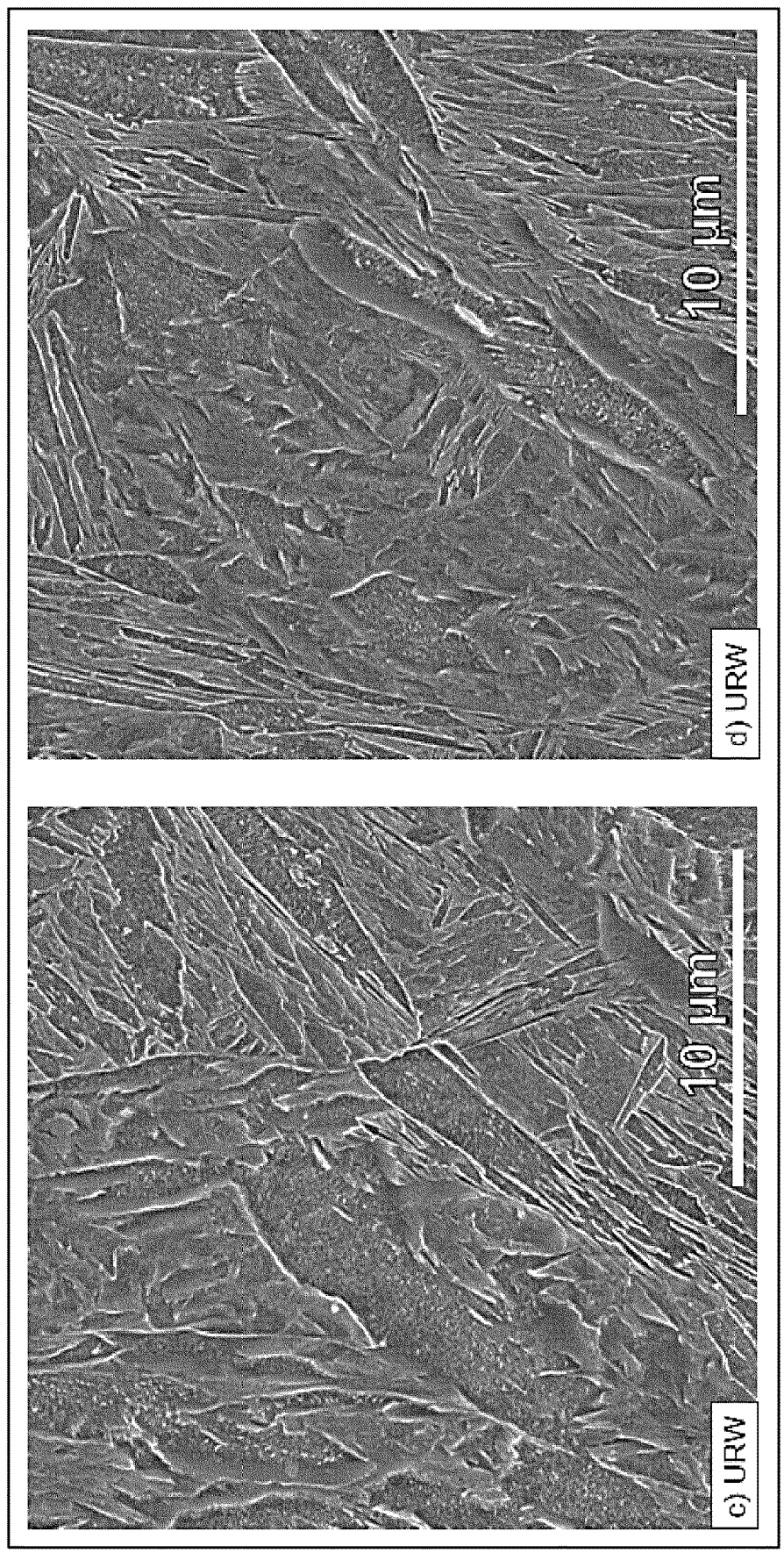
FIG. 19B provides SEM micrographs showing (c, and d) FZ of URW.

FIGS. 19(a-d) provide SEM micrographs showing (FIGS. 19a, c and d) FZ of URW; (b) FZ of RSW. In URW martensitic laths fine dispersion of white particles depicting cementite and representing tempering whereas in RSW, large coalescence of bainite can be seen along with large martensitic laths. Also, the surface waviness and curvature depict another evidence of tempered microstructure.

Another interesting microstructure feature observed in URW welds is the possible existence of tempered martensite, as shown in FIGS. 19 a, c and d. In contrast, no evidence of tempering could be identified in the fusion zone of RSW welds, which is dominated by coalesced bainite. martensite is known to form through displacive transformation due to fast cooling. Conventionally, martensite tempering is achieved by post processing heat treatments, where the specimen is held isothermally at elevated temperature to relieve the internal strain energy and allow diffusion of carbon atoms. The diffused carbon atoms would form precursor clusters within the solid solution. Upon further tempering, these precursor clusters will be able to transform into more stable cementite precipitates, shown as finely dispersed white particles in FIGS. 19 a, c and d. During the URW process, it is believed that local absorption of ultrasonic energy at martensite laths facilitates carbon diffusion and cementite nucleation, resulting in certain degree of martensite tempering in the fusion zone.

Ultrasonic Effects on RSW Process

In the first several cycles of electrical current, the ultrasonic vibration possibly breaks up the Zn coating on the steel surface, which modifies the contact resistance and heat generation rate. After melting occurs, it can be expected that the ultrasonic energy is primarily absorbed by the molten pool in the fusion zone. The high intensity ultrasonic vibration is known to be capable of generating non-linear effects in liquids, including transient cavitation and acoustic streaming. These have been widely used for ultrasonic degassing of liquid metals to reduce porosity. Regarding the cavitation effect, micro-bubbles can be induced in the molten pool under the cyclic ultrasonic waves. During the negative pressure cycle, the micro bubbles grow while during the positive pressure cycle, they collapse implosively. This leads to instant local high pressure and temperature. During early stage of solidification, ultrasonic induced cavitation disrupts the solidification front and fractures the large columnar dendrites and coarse prior austenite grains. During the collapse of bubbles from ultrasonic cavitation, microwaves and shock waves are generated on the solid surface and cause localized erosion, which is followed by dendrite defragmentation and promotes heterogeneous nucleation. Accordingly, the primary solidification structure can be refined to nearly equiaxed grains. This also partially explains the smaller thickness of fusion zone in the URW welds compared with RSW results. Acoustic streaming is a forced convection of material flow due to acoustic pressure gradients under the ultrasonic vibration. The associated high-speed flow in welding pool can effectively stir the material in microscopic scale, which improves the uniformity of element and temperature distribution. Moreover, the fragmented dendrite arms from cavitation effects could be carried away to new locations with acoustic streaming, which act as artificial sources of heterogeneous nuclei and form as new grains. This further refines the microstructure and promotes formation of the equiaxed structure, which can improve the ductility of URW welds compared with RSW welds.

In the final stage of cooling, potential martensite tempering takes place in URW. It is known that the martensite is thermodynamically unstable due to the large strain energy associated with carbon supersaturation in the BCT crystal lattice, as well as the high twin and dislocation density within the martensitic laths and along the lath interface. After the fusion zone is solidified, the continual supplied ultrasonic energy can be expected to be locally absorbed in these regions of high strain energy, such as dislocation rich sites in the martensite lath. The mechanism is similar to the material softening effect from acousto-plasticity. It is believed that the local absorption of ultrasonic energy increases dislocations mobility and promotes dislocation annihilation. It is also believed that the removed dislocation facilitates redistribution of carbon as they tend to segregate to the interstitial sites near dislocations. The redistributed carbon then precipitates out as cementite and other carbides, which results in ultrasonically assisted non-isothermal tempering of martensite. This tempered martensite reduces the brittleness of fusion zone and improves the ductility of URW welds in addition to the refined microstructure.

In view of the second set of experimental details, it can be concluded that:
1. During lap shear tensile tests, URW welds showed improved joint properties with nugget pullout failure mode, whereas RSW welds failed in the interfacial debonding mode.
2. Ultrasonic vibration decreased the thickness of columnar dendritic martensitic region from 829 μm to 666 μm in the fusion zone and widens the heat affected zone area.
3. Tempered martensite is observed in the fusion zone of URW welds, which is potentially the result of local absorption of ultrasonic energy in martensite laths.

Tertiary Experimental Details

In one exemplary embodiment of the present invention, commercially available Al-6061T6 (McMaster) and electrogalvanized TRIP-780 (ArcelorMittal) with dimensions of $70^L \times 25^W \times 1.6^T$ mm$^3$ and $70^L \times 25^W \times 1.3^T$ mm$^3$ respectively are used in this study. The design of the URW system 10 is based on an RSW machine, again with reference to the schematic illustrations provided in FIGS. 1A and 1B. AC current passes from the top or replaceable electrode 16 to the bottom electrode 18, which is connected to the ultrasonic transducer 12 serving as the sonotrode to transfer acoustic energy into the workpiece. The total length of the bottom electrode 18 is tuned such that its tip 19 vibrates at the maximum displacement with a resonant or natural frequency resonating with the ultrasonic transducer 12 (19.4 kHz). The tip diameter of the top and bottom electrodes is 10 mm. The electrical current is measured via a Rogowski coil 26 (provided by DENT Instruments of Oregon, for example) and the dynamic welding force is measured through a highly sensitive strain sensor (Kistler 9232A) installed under the lower arm of the RSW machine.

Again, with reference to FIGS. 1A and 1B, a self-developed Lab View program/controller 32 digitally controls the start-and-off time of the ultrasonic generator 34. In this study, the ultrasonic vibration starts after 3 cycles of AC current and continues for a duration of 167 ms (peak to peak vibration amplitude 34 μm). Other investigated welding parameters are summarized in Table 2, where the magnitude of the AC electrical current is shown with the root mean square (RMS) values. These parameters are selected based on welds with acceptable properties. Each condition is repeated for a minimum of 5 times. Lap shear tensile tests were performed via MTS 800 test machine at a rate of 1 mm/min and the detailed specimen dimensions are provided, again with reference to FIG. 9. Regarding weld cross section characterizations, the Al—Fe interface is examined via Quanta-200 scanning electron microscope (SEM). EDS line scans are performed via EDAX 102 mm Octane Prime EDS detector with accelerating voltage of 14 kV, step size of 0.2 μm and a total scanning distance of 20 microns.

TABLE 2

RSW and URW conditions

| No | Material | Thickness | Current (RMS) | Current Cycles | Force | Condition |
|----|----------|-----------|---------------|----------------|-------|-----------|
| 1. | Al-6061  | 1.6 mm    | 11.4 kA       | 30 c @60 Hz    | ~3.2 kN | RSW |
|    | Trip-780 | 1.3 mm    |               |                |       |           |
| 2. | Al-6061  | 1.6 mm    | 11.4 kA       | 30 c @60 Hz    | ~3.2 kN | URW |
|    | Trip-780 | 1.3 mm    |               |                |       |           |
| 3. | Al-6061  | 1.6 mm    | 13.4 kA       | 20 c @60 Hz    | ~3.2 kN | RSW |
|    | Trip-780 | 1.3 mm    |               |                |       |           |
| 4. | Al-6061  | 1.6 mm    | 13.4 kA       | 20 c @60 Hz    | ~3.2 kN | URW |
|    | Trip-780 | 1.3 mm    |               |                |       |           |

Note:
(force refers to the applied welding force, which varies dynamically during the process)

Additional Results

Figure 20A:
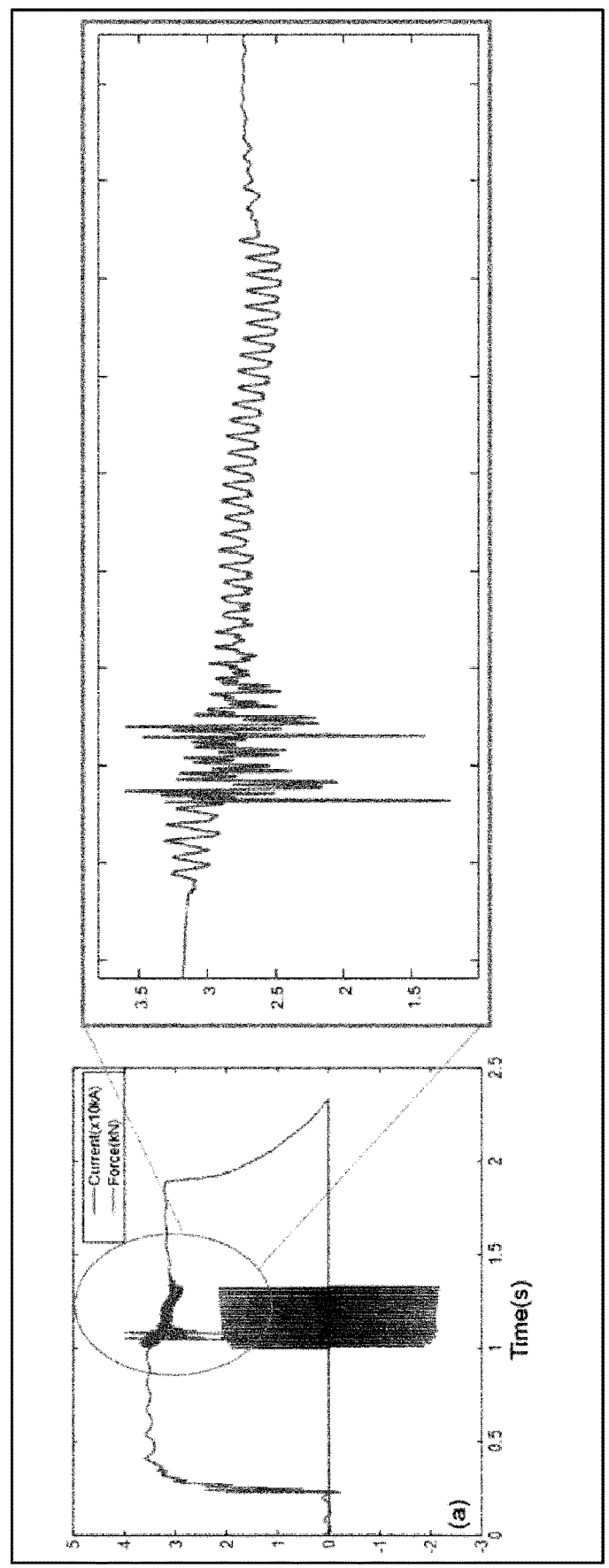
FIG. 20A presents an RSW Force curve at 13.4 kA & 20 cycles.
Figure 20B:
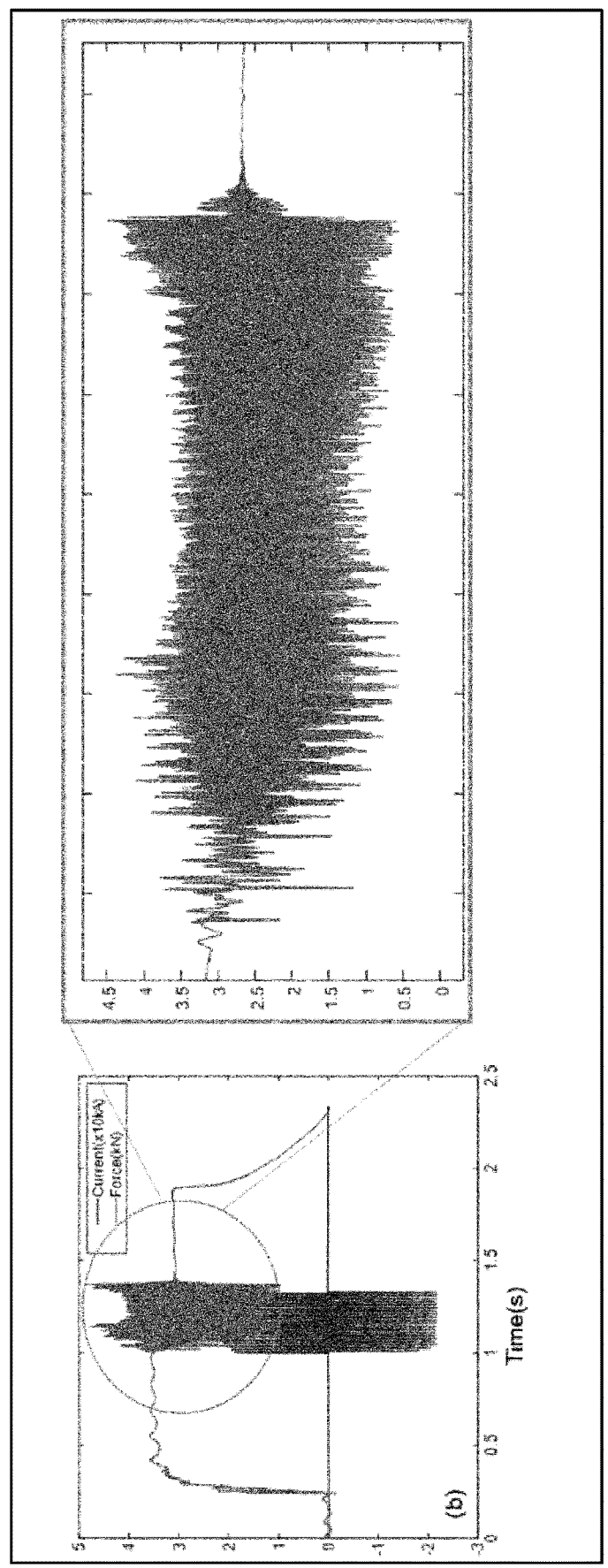
FIG. 20B presents a URW Force curve at 13.4 kA & 20 cycles.

FIGS. 20a and 20b show the recorded welding force during RSW and during URW, respectively, at 13.4 kA for 20 cycles. Initial variations in the curves are due to the deformation of material surface asperities as the two substrates start to contact each other. As the welding current passes through, oscillations are observed, which matches the AC current waveform. This is because the material deformation resistance can be reduced by electrical current through direct electro-plastic effect (EPE), and indirect thermal softening from resistance heating. EPE has been shown on various metals and alloys, where a drop of material flow stress is observed when high density electrical current is passed through during plastic deformation. Different mechanisms have been proposed to explain this EPE effect. One hypothesis is that as the electrons pass through the deformation region, associated energies of moving electrons are transferred into dislocations, which facilitate their motion and modify the dislocations multiplications and arrangements. As the absolute value of electrical current reaches the peak magnitude, the material is softened to the highest degree, which is reflected as a valley on the welding force curve. Certain large spikes are observed, indicating expulsion since the material flow stress will drop dramatically as they get melted. After the current is stopped, the force curve is slightly lower than the original level, which is possibly due to the reduced sheets total thickness after they were plastically deformed at high temperature.

Large oscillations of welding force can be observed during URW process in FIG. 20(b). The oscillation starts after about three (3) cycles of AC current, as shown in the force and current waveform. This could be attributed to the superimposed dynamic stress induced by ultrasonic vibrations. In addition, ultrasonic energy creates a softening effect similar to EPE in metals known as acoustic plastic effect (APE). During plastic deformation, the ultrasonic vibration interacts with material in terms of internal friction and dislocation movements. Local absorbance of ultrasonic energy at the dislocations sites, dislocation annihilation and stress superposition results in reduction of material deformation resistance and potentially additional residual softening. This acoustic softening is also reflected as variations on the welding force curves in FIG. 20(b). A fast Fourier transformation analysis reveals a peak at the frequency of 19.7 kHz, which is slightly higher than the ultrasonic frequency measured in the unloaded condition (19.4 kHz). Another peak of 120 Hz also shows up, representing cycles of the absolute AC current values.

Mechanical Properties Comparisons

Figure 21:
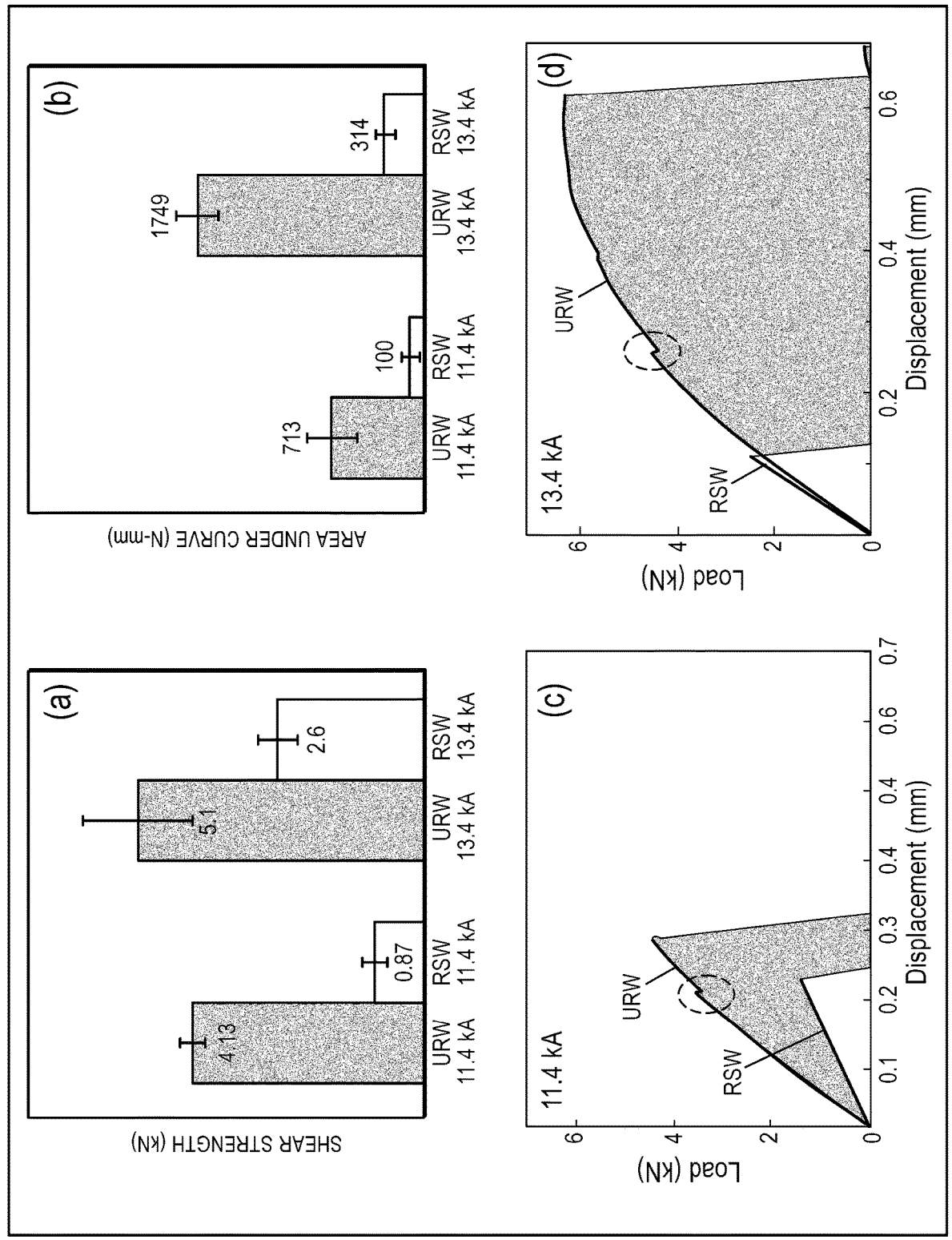
FIG. 21 presents tensile test results illustrating: (a) joint shear strength from 11.4 kA (30 cycles) and 13.4 kA (20 cycles); (b) energy absorption calculated via area under load-displacement curve for 11.4 kA (30 cycles) and 13.4 kA (20 cycles); and (c-d) load-displacement curves for 11.4 kA and 13.4 kA.

FIG. 21(a-d) contains tensile test results for (FIG. 20a) Joint shear strength from 11.4 kA (30 cycles) & 13.4 kA (20 cycles); (FIG. 20b) Energy absorption calculated via area under load-displacement curve for 11.4 kA (30 cycles) & 13.4 kA (20 cycles); and (FIGS. 20c-d) load-displacement curves for 11.4 kA and 13.4 kA.

Stated another way, FIGS. 21(a-d) compare the mechanical behavior of URW and conventional RSW welds during lap shear tensile tests. At 11.4 kA and 30 cycles, 300% increase in joint strength is achieved after applying high-frequency ultrasonic vibration. Similarly, in the case of 13.4 kA and 20 cycles, up to 90% increase in strength is obtained. Total energy absorption of URW welds (FIG. 21b) is much higher than that of RSW welds, i.e. about 713 N-mm at 11.4 kA and about 1749 N-mm at 13.4 kA condition. This is also reflected from the much larger area under the load-displacement curves of URW joints (FIGS. 21c and d), showing a greatly enhanced load-bearing capacity. At 11.4 kA, interfacial failure is observed in both URW and RSW welds. At 13.4 kA, RSW welds still showed interfacial failure mode and relatively flat fracture surface, whereas in URW welds (13.4 kA), a small pile of aluminum is attached to the steel surface, indicating much stronger bonds. Small spikes in the middle of the URW curve (FIGS. 21c and d) are potentially related to local instabilities of the bonded area. Since bonding condition and intermetallic at the micro level can vary at different locations, during tensile loading, local fracture can be initiated in some weakly bonded areas and result in a small drop of the force curve. As the applied load continues to increase, remaining area of the weld is still able to provide enough strength until the fracture propagates throughout the entire weld.

Weld Microstructure Comparison

Figure 22A:
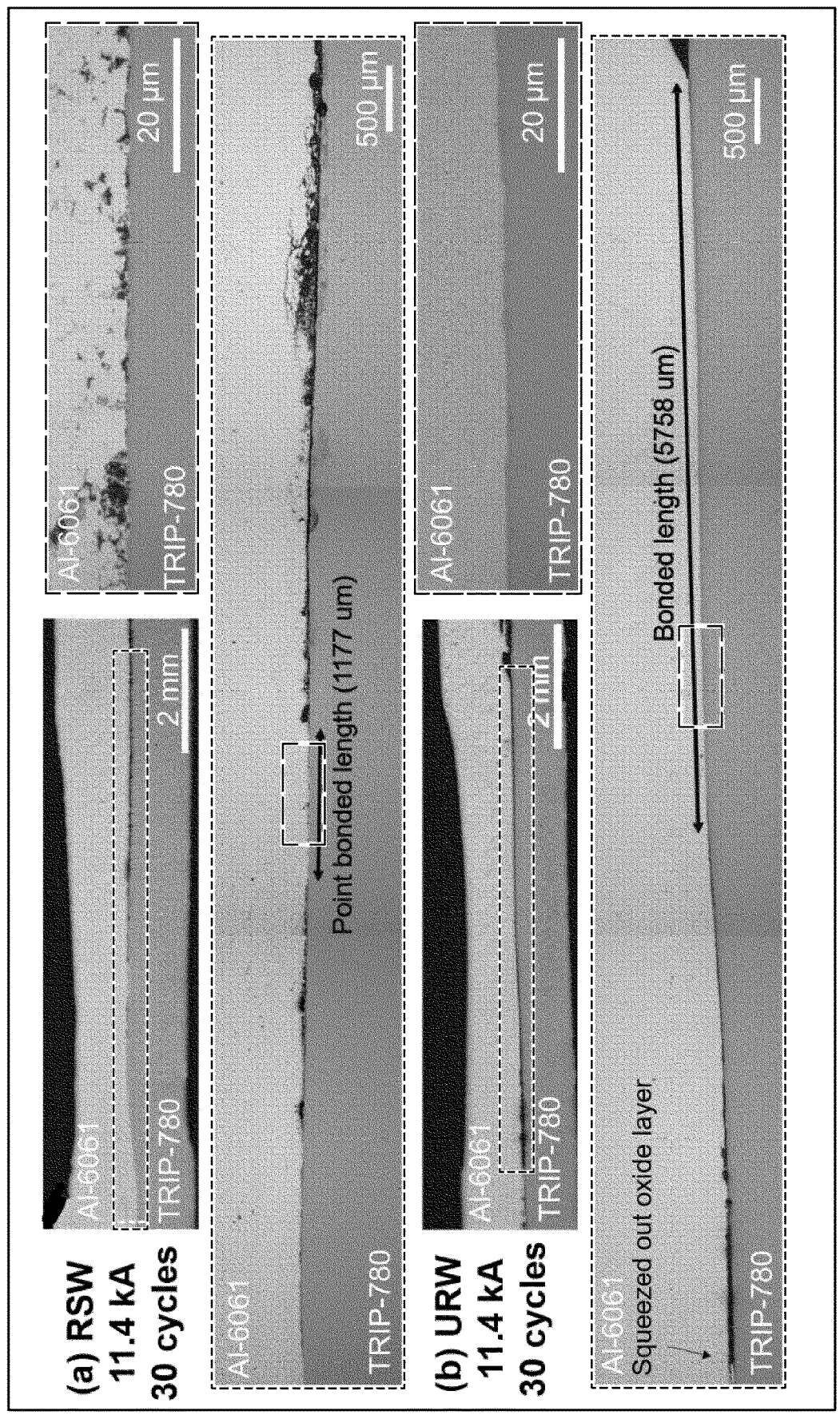
FIG. 22A presents light optical microscope images relative to (a) RSW at 11.4 kA (30 cycles); and (b) URW at 11.4 kA (20 cycles).
Figure 22B:
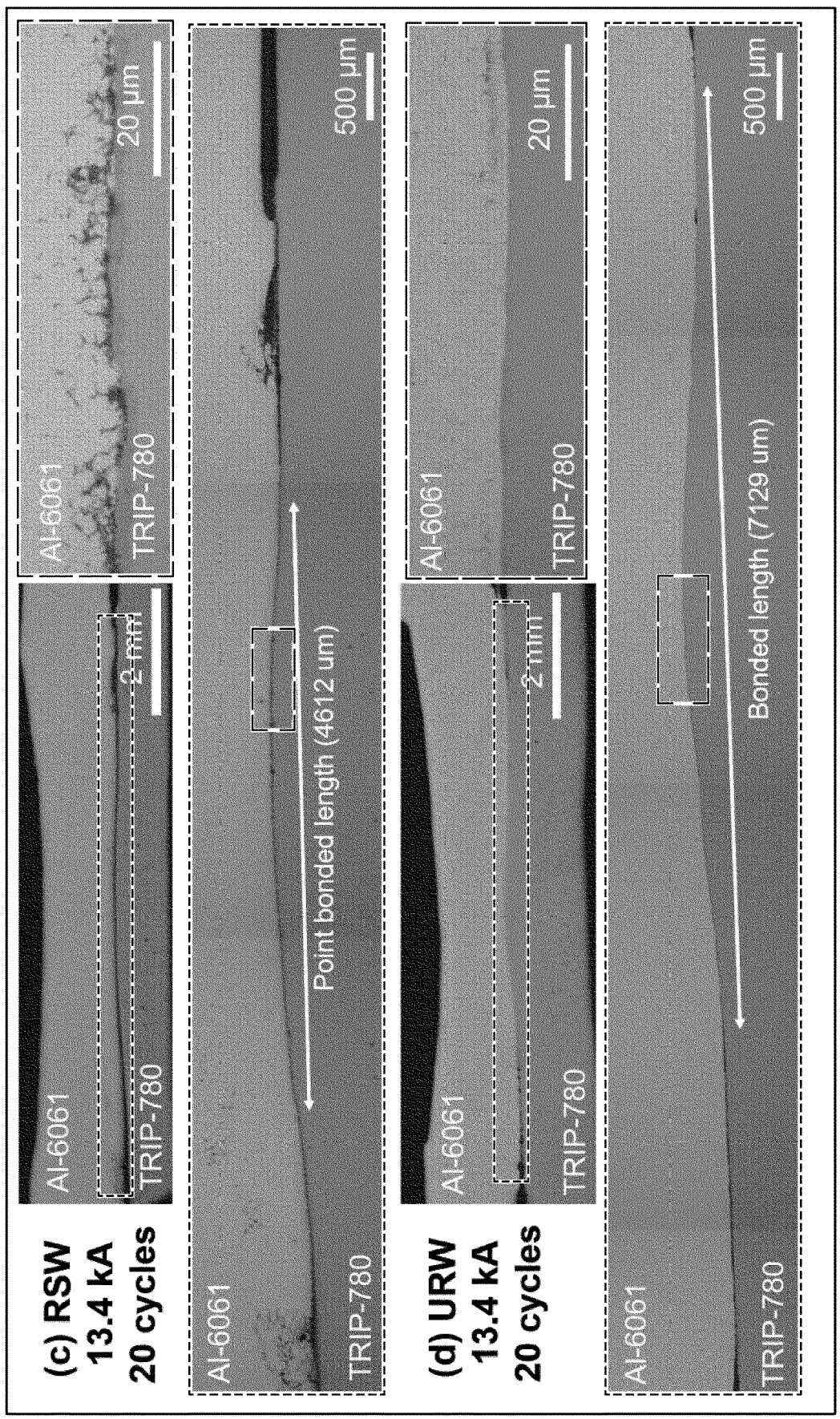
FIG. 22B presents light optical microscope images relative to (c) RSW at 13.4 kA (30 cycles); and (d) URW at 13.4 kA (20 cycles).

FIGS. 22(a-d) provide light optical microscope images for: (FIG. 22a) RSW at 11.4 kA (30 cycles); (FIG. 22b) URW at 11.4 kA (20 cycles); (FIG. 22c) RSW at 13.4 kA (30 cycles); and (FIG. 20d) URW at 13.4 kA (20 cycles).

Stated another way, FIGS. 22(a-d) compare the optical microscopic images of RSW and URW weld cross sections. RSW welds at 11.4 kA showed point bonded region with the length of around 1177 μm. In this region, the bondline is discontinuous and the joint is created at the interface through disconnected spots, as shown in the magnified FIG. 22(a-c) highlighted with dashed blue outline. Compared with URW welds obtained at the same electrical current condition (11.4 kA for 20 cycles), the length of the fully bonded region is around 5758 μm, which is much larger than that in RSW welds. This increased bonded area contributes to the improved joint mechanical properties. Similarly, at higher current condition of 13.4 kA, URW joint shows the largest bonded length of 7129 μm, which partially explains its highest joint strength (5.1 kN) and load carrying energy (1749 N-mm). Indentation depth (ID) of the RSW welds increased from about 0.36 mm at 11.4 kA to about 0.39 mm at 13.4 kA. URW samples showed slightly higher ID compared with RSW welds, with increases of about 0.1 mm at both current conditions of 11.4 kA and 13.4 kA.

Figure 23:
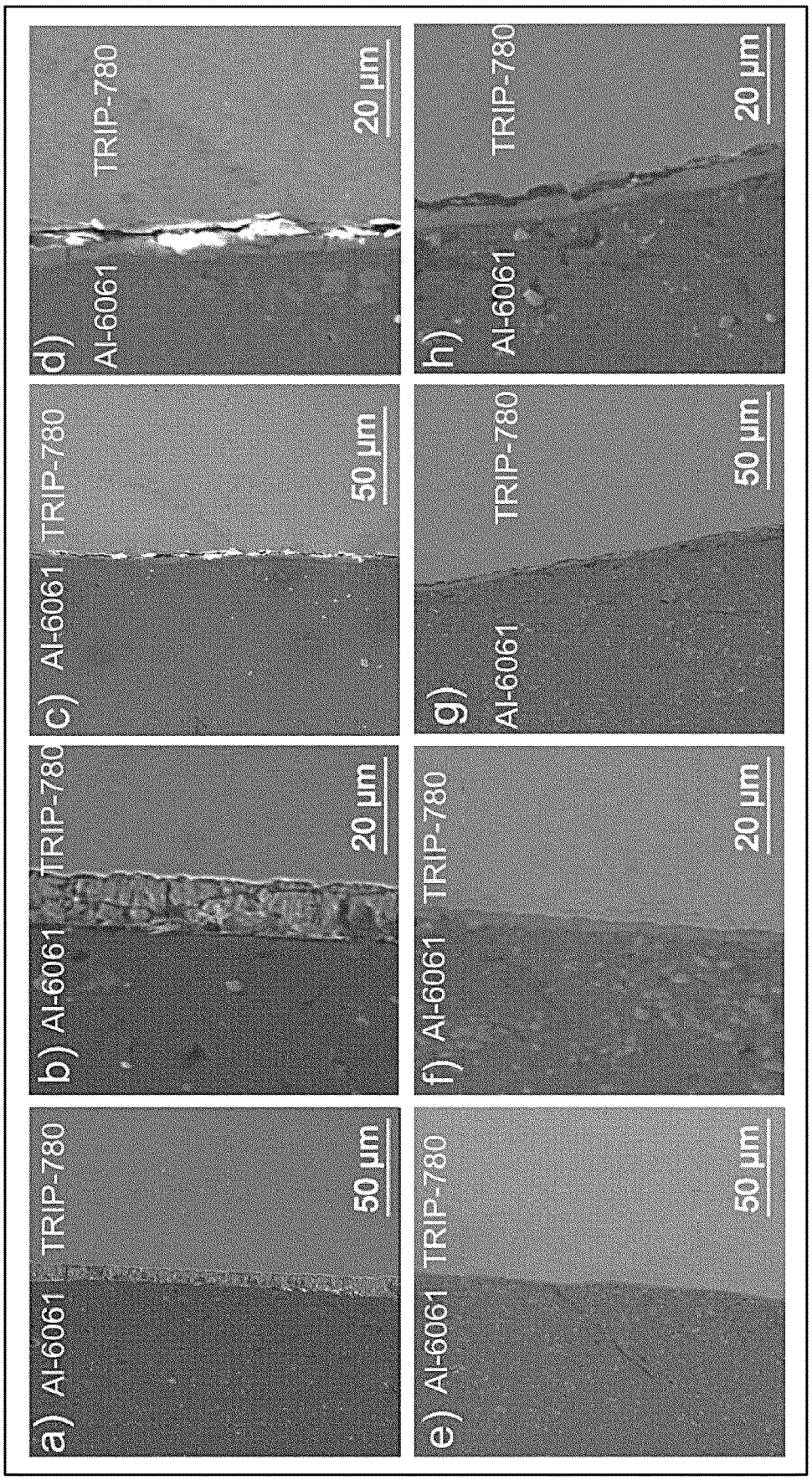
FIG. 23 presents SEM micrographs of Al-6061 & TRIP 780 of (a-b) URW at 11.4 kA & 30 cycles; (c-d) RSW at 11.4 kA and 30 cycles; (e-f) URW at 13.4 kA and 20 cycles; and (g-h) RSW at 13.4 kA & 20 cycles.

FIGS. 23(a-h) provide SEM micrographs of Al-6061 & TRIP 780 for (FIGS. 23a-b) URW at 11.4 kA & 30 cycles; (FIGS. 23c-d) RSW at 11.4 kA & 30 cycles; (FIGS. 23e-f) URW at 13.4 kA & 20 cycles; and (FIGS. 23g-h) RSW at 13.4 kA & 20 cycles. (SEM images are taken from the middle of spot weld).

Stated another way, to further reveal the detailed weld interface microstructure, higher magnified SEM images are provided in FIGS. 23(a-h). In conventional RSW welds, random irregular patterns of widely debonded areas occur throughout the interface (FIGS. 23c and d), which is detrimental to joint integrity and leads to the low strength. At lower current of 11.4 kA, Al—Fe joint is possibly achieved through a brazing mechanism with melted Zn. Discontinuities along the interface are due to uneven thermal contraction that results in localized shrinkage and unbonded region. At higher current of 13.4 kA, zinc evaporation makes it more prone to welding defects. During RSW, initially force is applied to create a pressure zone between the electrodes. As the electrical current passes by, Joule heating rapidly increases the temperature at the interface and results in material melting. After the electrical current is stopped, the associated rapid cooling can induce solidification shrinkage. Particularly for welding aluminum to steel, their different thermal expansion coefficients and conductivities lead to a large mismatch in thermal contraction strains and induce high residual stress. Accordingly, cracks and debonded areas are formed at the end of the welding cycle, as observed in RSW welds of this study. Since the steel also contains a Zn coated layer, evaporation of Zn from electrical resistance heating facilitates the generation of weld crack deficiencies as well. It is believed that if welding current is less than 12 kA, Zn is melted (at about 419° C.). Heat is consumed in the nugget and the latent heat for melting Zn is 101 kJ/kg. Above 12 kA, Zn is evaporated (about 907° C.) and the latent heat of Zn evaporation is much higher at around 1782 kJ/kg. Evaporated zinc may result in the formation of tiny gas bubbles and also degrade the joint properties.

As a comparison, in URW welds, a continuously bonded interface is achieved. In the condition of lower current (11.4 kA) and longer weld cycles (30), an interlayer with the thickness of around 8-10 microns is observed at the Al—Fe interface, as shown in FIG. 23b.

Figure 24A:
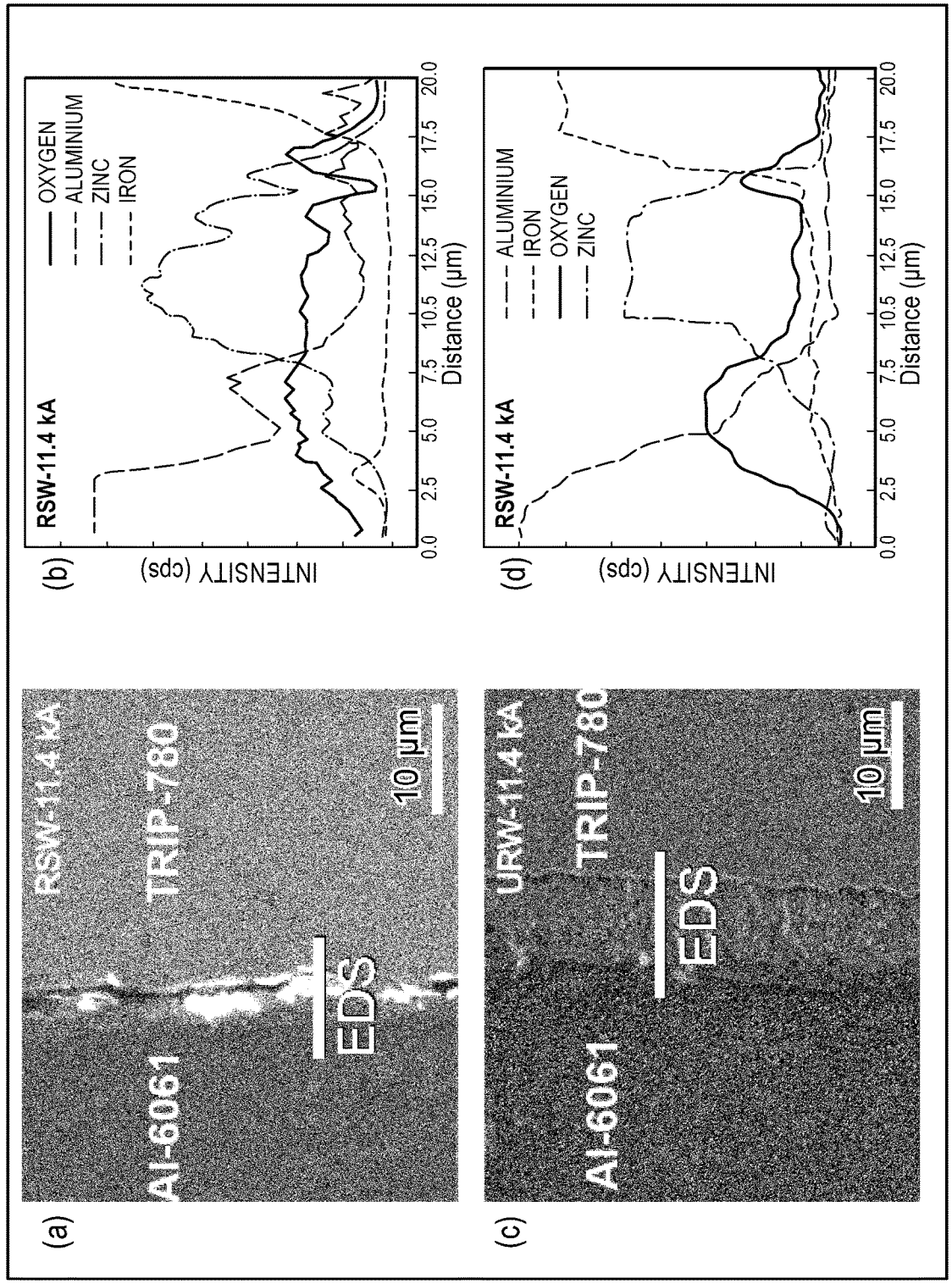
FIG. 24A presents an Energy Dispersive Spectroscopy (EDS) line Scan of Al-6061 & TRIP 780 across the interface for: (a-b) RSW at 11.4 kA; and (c-d) URW at 11.4 kA.
Figure 24B:
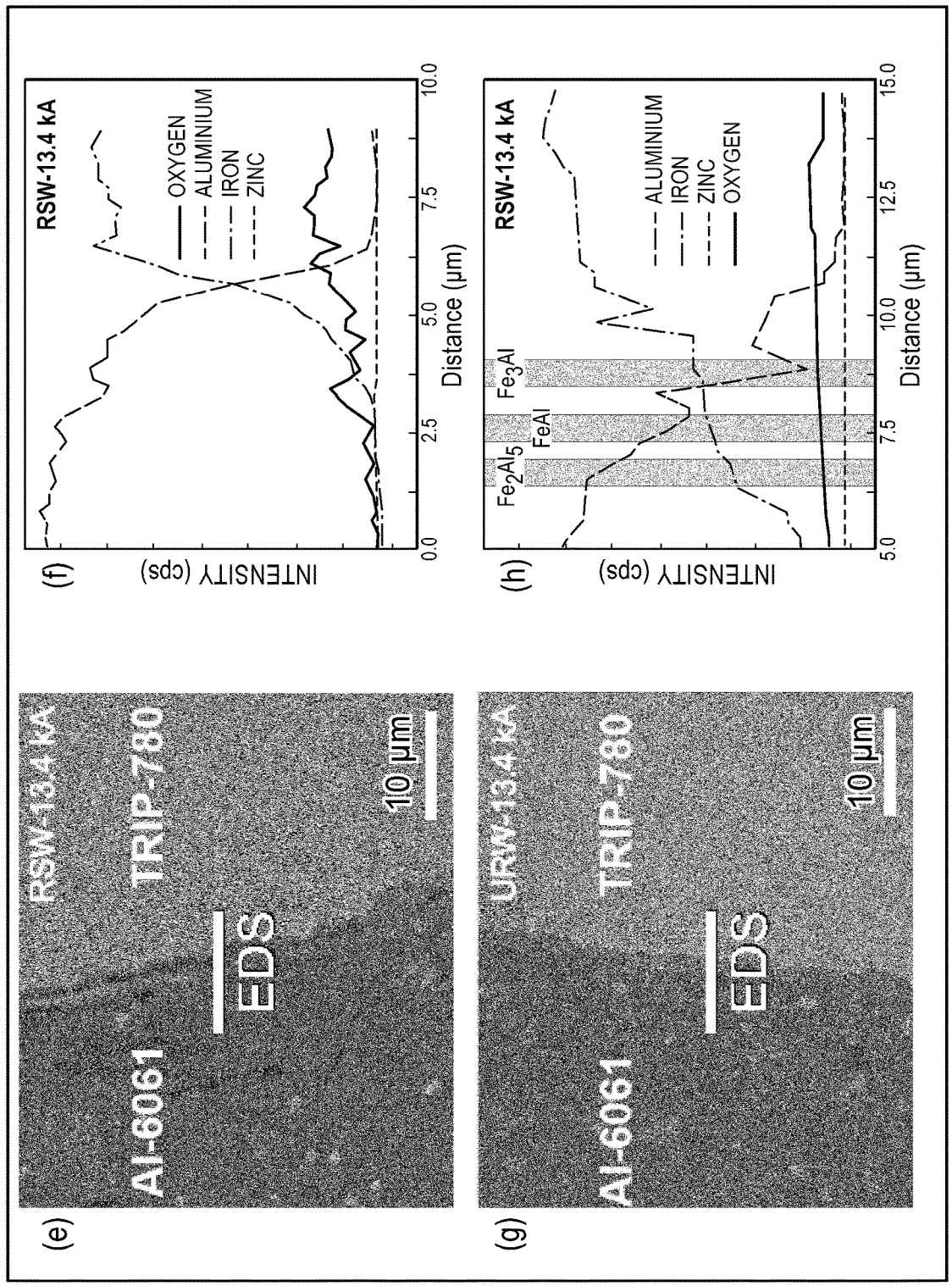
FIG. 24B presents an Energy Dispersive Spectroscopy (EDS) line Scan of Al-6061 & TRIP 780 across the interface for: (e-f) RSW at 13.4 kA; and (g-h) URW at 13.4 kA.

FIGS. 24(a-h) provide Energy Dispersive Spectroscopy (EDS) line scans of Al-6061 & TRIP 780 across the interface for RSW at 11.4 kA (FIGS. 24a-b) and at 13.4 kA (FIGS. 24e-f); and for URW at 11.4 kA (FIGS. 24c-d) and at 13.4 kA (FIGS. 24g-h).

Accordingly, EDS line analysis revealed high amounts of zinc at this layer (FIG. 24). In between the bulk aluminum and Zn layer, a thin aluminum oxide layer is observed. In this lower current condition, the Al—Fe intermetallic layer is not obvious, potentially because the weld is formed as a zinc brazed joint at the interface. It was reported that the coated Zn decreases the contact resistance, which generates less heat at the interface.

For URW weld obtained at higher current of 13.4 kA and 20 cycles, uniform Al—Fe intermetallic layer is observed. The Zn is not noticeable at the interface. However, EDS analysis reveals existence of Zn at the edge of the weld nugget. This is probably because the higher magnitude of current increases nugget temperature. The melted Zn is then squeezed out from the weld center towards the edge under the electrode compression force. The EDS line analysis showed existence of intermetallics across the interface with the thickness varies from 2.6 µm to 3.4 µm. According to the Al—Fe phase diagram, there are potentially three types of Al—Fe intermetallics formed at the interface, including $Fe_2Al_5$, FeAl and $Fe_3Al$. Chen et. al. classified the Al—Fe RSW joint failure modes based upon thickness of intermetallic layer. He concluded that the intermetallic (IMC) layer with thickness of less than 3 µm will result in button pullout mode while the IMC layer of thickness greater than 3 microns, interfacial debonding failure occurs. This agrees with the mixed failure mode observed on fracture surfaces of our URW welds obtained at 13.4 kA (FIG. 26), where thickness of the IMC layer varies from 2.6 µm to 3.4 µm across the Al—Fe interface.

Figure 25:
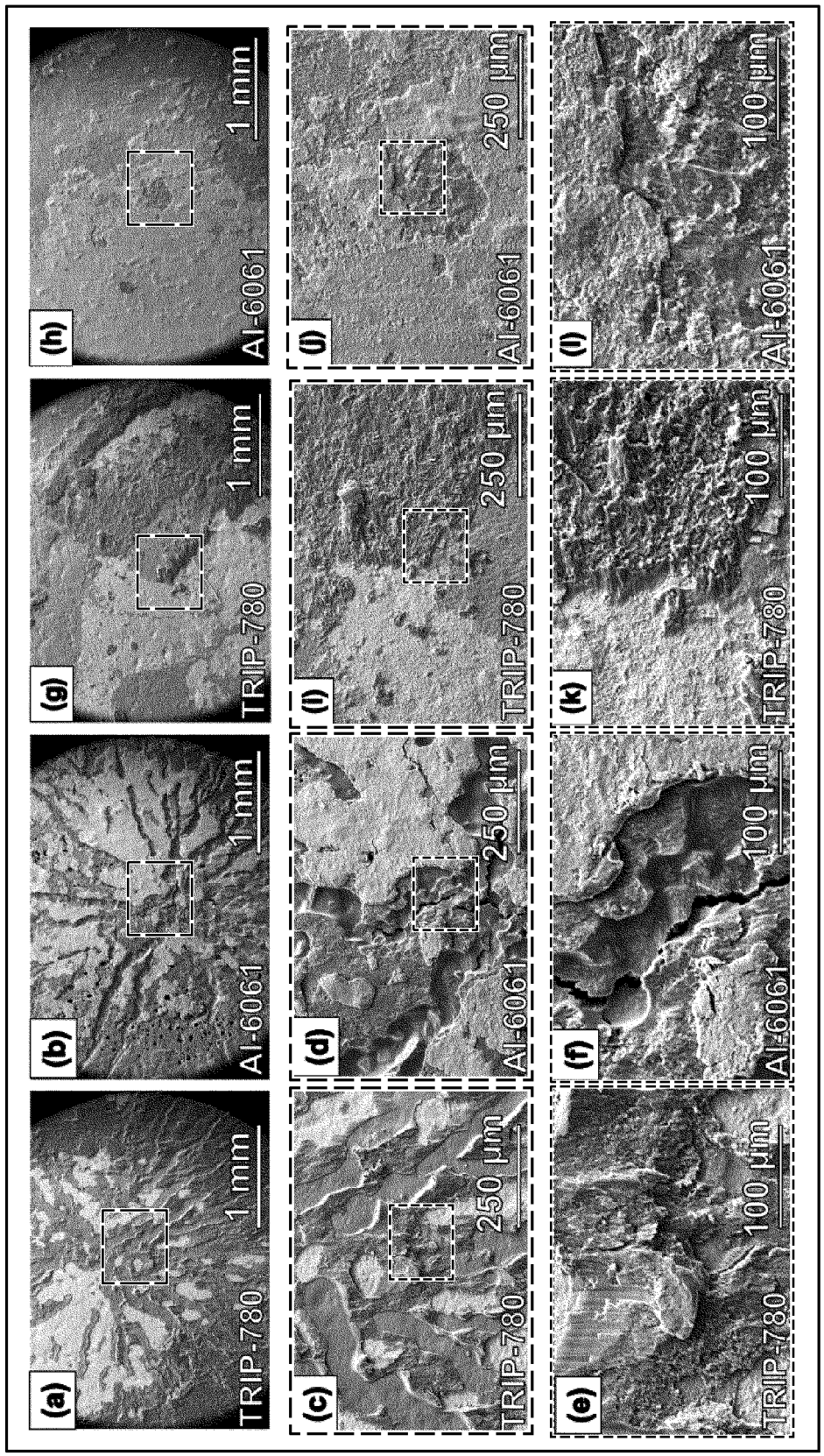
FIG. 25 presents: (a-f) an SEM of the fracture surface after tensile testing RSW products at 11.4 kA & 30 cycles; and (g-l) URW products at 11.4 kA & 30 cycles.

FIGS. 25(a-l) provide SEM micrographs for: (FIGS. 25a-f) SEM of fracture surface after tensile testing RSW at 11.4 kA & 30 cycles; FIGS. 25(a), (c) and (e) correspond to TRIP-780 fracture surface whereas FIGS. 25(b), (d) & (f) correspond to Al-6061 surface after fracture; and, for FIGS. 25 (g-l) URW at 11.4 kA & 30 cycles; (g), (i)&(k) corresponds to TRIP-780 fracture surface whereas (h), (j) & (l) corresponds to Al-6061 surface after fracture.

Figure 26:
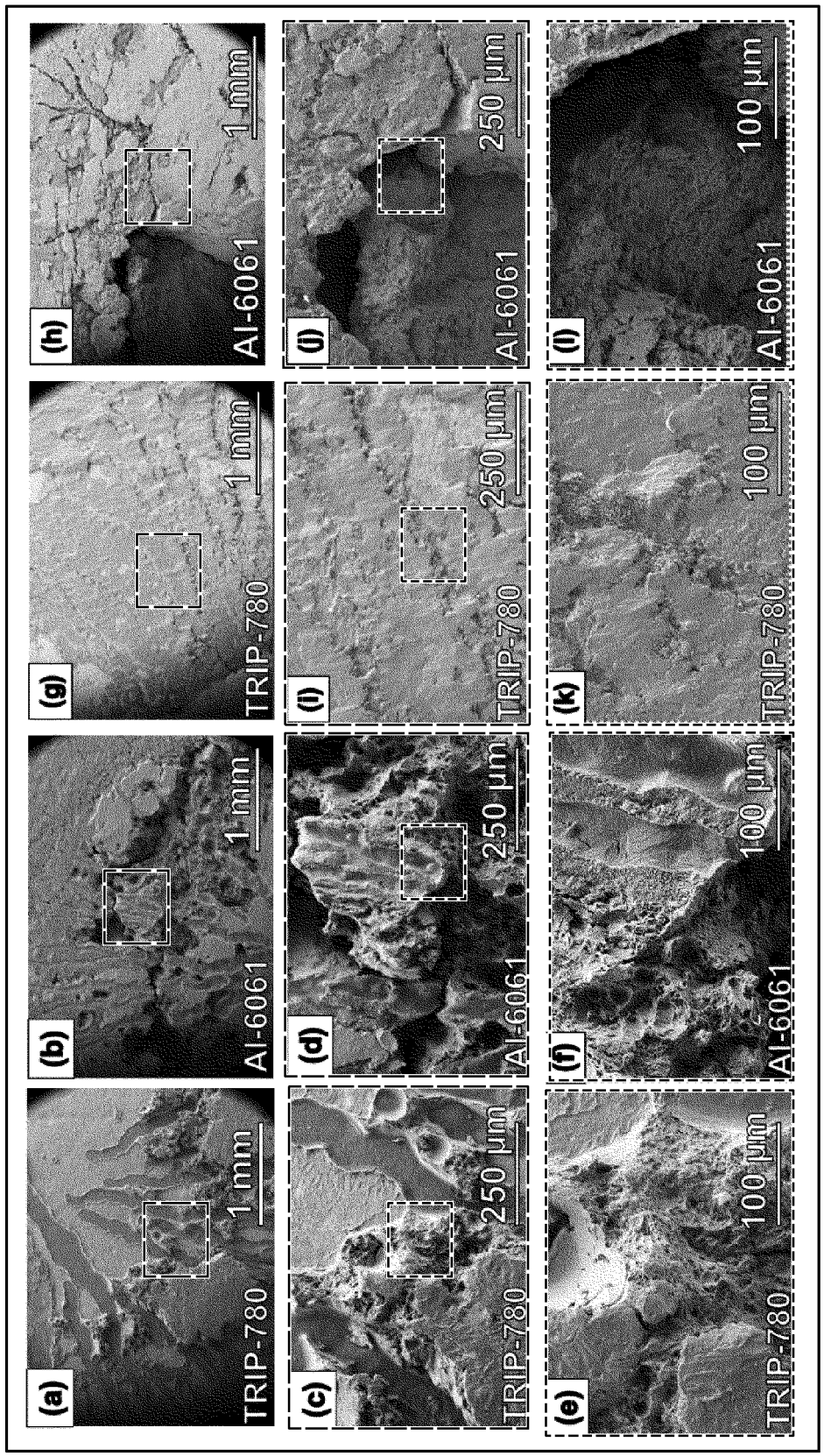
FIG. 26 presents: (a-f) SEM micrographs of the fracture surface after tensile testing RSW products at 13.4 kA & 20 cycles; and (g-l) SEM micrographs of the fracture surface after tensile testing URW products at 13.4 kA & 20 cycles.

FIG. 26(a-l) provide SEM of fracture surface after tensile testing for RSW at 13.4 kA & 20 cycles: FIGS. 26(a), (c) and (e) correspond to TRIP-780 fracture surface whereas FIGS. 26(b), (d) and (f) correspond to Al-6061 surface after fracture. For comparative URW testing, FIGS. 26(g-l) at 13.4 kA & 20 cycles are provided: FIGS. 26(g), (i) and (k) correspond to TRIP-780 fracture surface whereas FIGS. 26(h), (j) and (l) correspond to Al-6061 surface after fracture.

Accordingly, FIGS. 25 and 26 compare fractured surface of the RSW and URW joints after lap shear tensile tests obtained from different electrical conditions. In the case of 11.4 kA with 30 cycles, RSW samples (FIGS. 25a-f) are dominated with highly brittle cleavage features, whereas in URW samples (FIGS. 25g-l), some dimpled fracture surface with cup and cone features are observed, indicating relatively ductile behavior. At 13.4 kA condition, RSW samples (FIGS. 26a-f) also showed brittle appearance (FIG. 26e) whereas URW welds fracture surface contained both brittle and ductile failure characteristics (FIGS. 26g-l).

Figure 27:
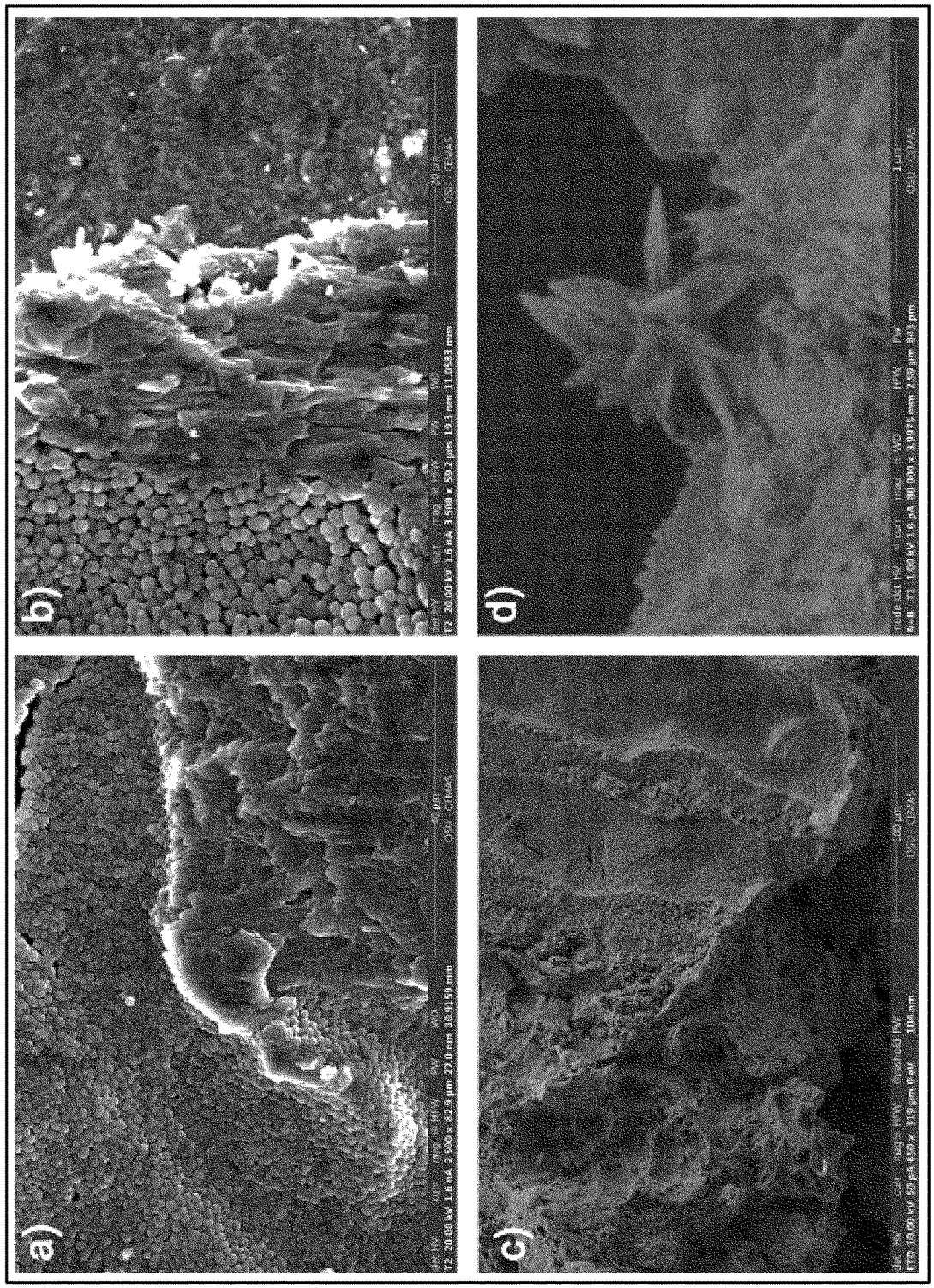
FIG. 27 presents: (a-b) SEM micrographs of the fracture surface for RSW products at 11.4 kA; (c) an SEM micrograph of the fracture surface for RSW products at 13.4 kA; (d) an SEM micrograph of the periphery of the fracture surface for RSW products at 13.4 kA, indicating the presence of zinc oxide flowers or Fe—Al intermetallics.

FIGS. 27(a-d) provide SEM micrographs pertaining to the RSW process wherein: FIGS. 27(a and b) show the fracture surface for RSW at 11.4 kA; FIG. 27(c) shows the fracture surface for RSW at 13.4 kA; and FIG. 27(d) shows the periphery of fracture surface for RSW at 13.4 kA and indicates the presence of zinc oxide flowers or Fe—Al intermetallics.

Accordingly, fractured surface of RSW welds are examined in more details and results are shown in FIG. 27(a-d). It can be seen that eggcrate features are observed under both 11.4 kA and 13.4 KA conditions, which are typical features of solidification cracking. These also correspond to the observed unbonded area in the previous weld cross section microstructure, which directly deteriorate the Al—Fe RSW joint quality and lead to brittle failure mode with low strength.

Figure 28:
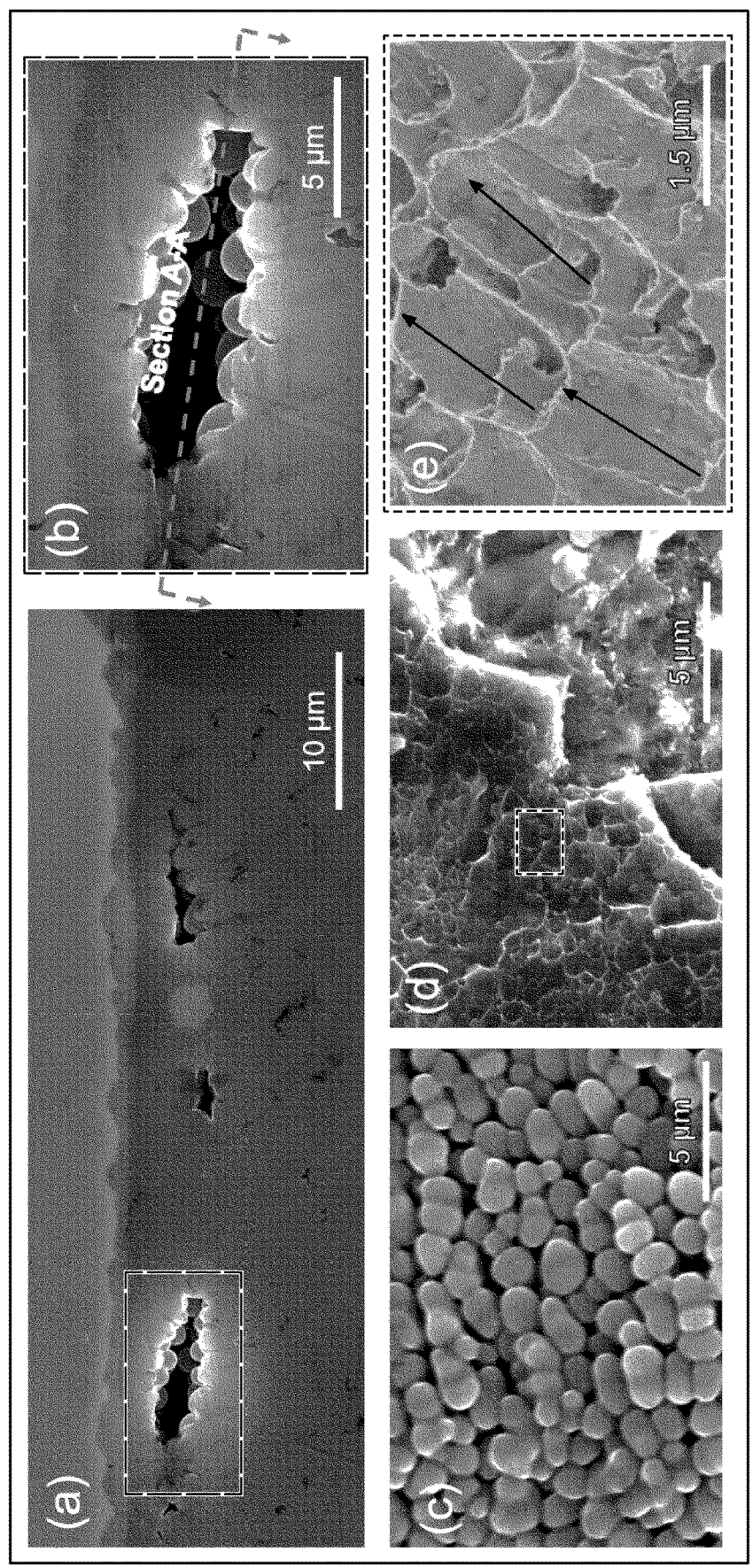
FIG. 28 presents: (a-b) SEM micrographs of solidification cracks in RSW welds; (c) an SEM micrograph of a characteristic image of solidification cracking as seen on the fractured surface for an RSW joint; (d) an SEM micrograph of a fractured surface for URW joints; and (e) an SEM micrograph of a magnified view of ductile dimples appearing on the fractured surface of URW joints.

FIGS. 28(a-e) provide additional SEM micrographs of RSW and URW welds wherein FIGS. 28(a-b) show solidification cracks in RSW welds; FIG. 28(c) shows a characteristic image of solidification cracking as seen on the fractured surface for RSW joint. (It can be interpreted as the top view of the Section A-A); FIG. (d) shows an SEM of fractured surface for URW joints; and FIG. 28(e) shows a magnified view of ductile dimples appearing on the fractured surface of URW joints. Arrows indicate the direction of the dimples elongated in the shear direction.

Accordingly, FIGS. 28(a-b) show the direct evidence of solidification cracking inside the unbonded region of RSW joints, represented by the typical rounded edges in FIG. 28(b). This morphology is more obvious on the fractured surface of RSW joints, as shown in FIG. 28(c). As a comparison, fractured surface of the URW joints showed some ductile dimple features (FIGS. 28d-e). In liquid, ultrasonic energy produces various nonlinear effects such as cavitation and acoustic streaming, which help in the minimization of solidification defects. In the later stage when material is solidified, ultrasonic energy induces oscillating stress fields, which increases the concentration of dislocations and point defects up to certain saturation level, followed by the formation of new refined grains.

Figure 29A:
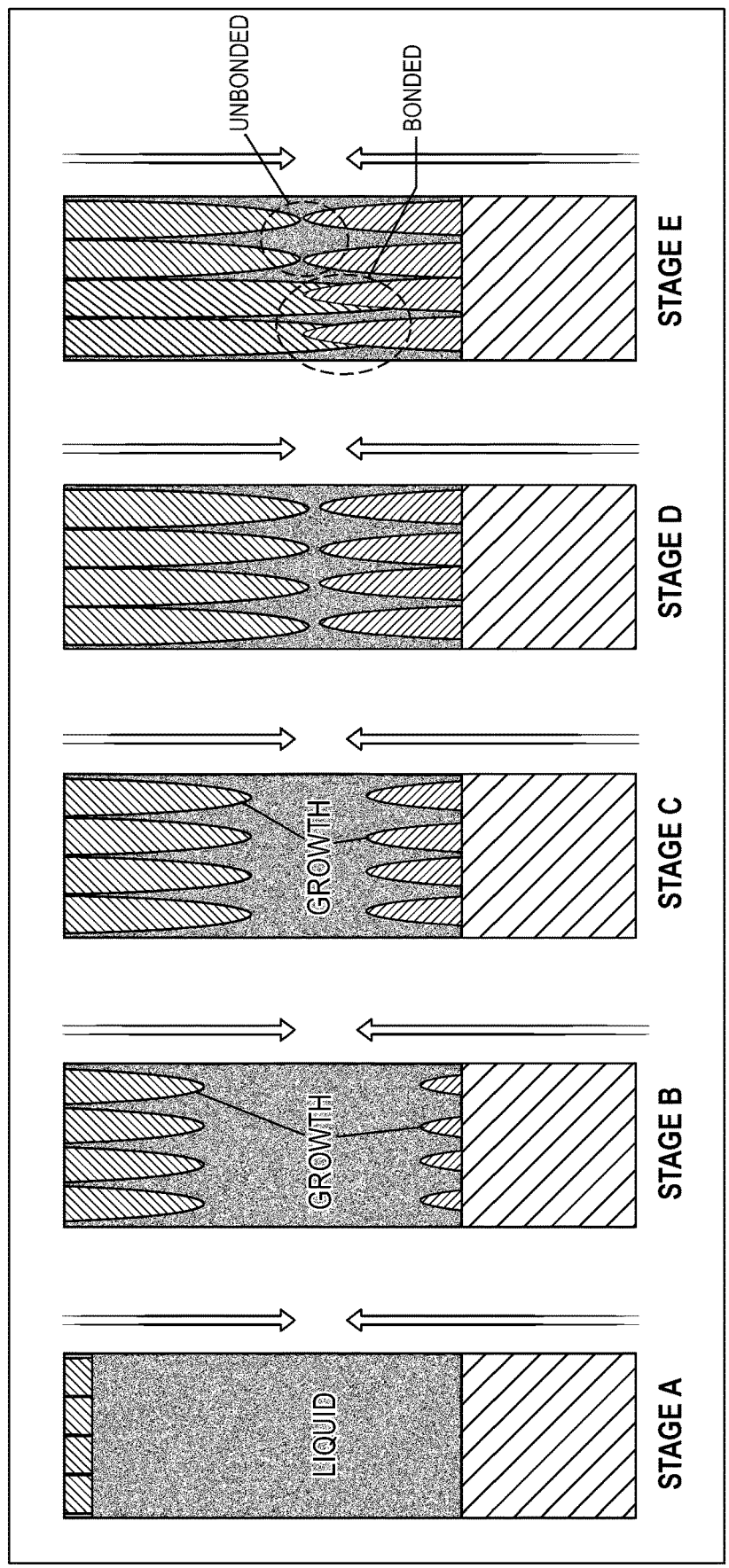
FIG. 29(a) presents schematics of solidification process during RSW.

FIGS. 29 (a and b) present schematics of the solidification process during RSW and URW, respectively. Accordingly, FIG. 29(a) shows a schematic model that explains the possible effects of ultrasonic vibration on RSW process. As the electrical current passes through pressure zone during RSW process, localized melting takes place at the interface followed by inward solidification. A mushy zone exists ahead of solidification front, which is the most susceptible region to cracking due to the liquation. Another region prone to cracking is the interdendritic area, where filling of the material solely depends upon the presence of remaining liquid metal. During solidification, penetration through the solidified dendrites becomes more difficult for the liquid metal. Besides, the semi-solid nature of the mushy zone hinders the flow of liquid metal, which facilitate cracks propagation.

Again, with reference to FIG. 29(a), in Stage A of the RSW solidification process, the aluminum and zinc are melting. In Stage B, solidification growth begins. In Stages C and D, solidification growth continues until at Stage E, bonded areas (denoted by the overlap of Al-6061 and TRIP-780) and unbonded areas (denoted by the tip to tip junctions of the Al-6061 and the TRIP-780) appear, thereby depicting eggcrate morphology.

Figure 29B:
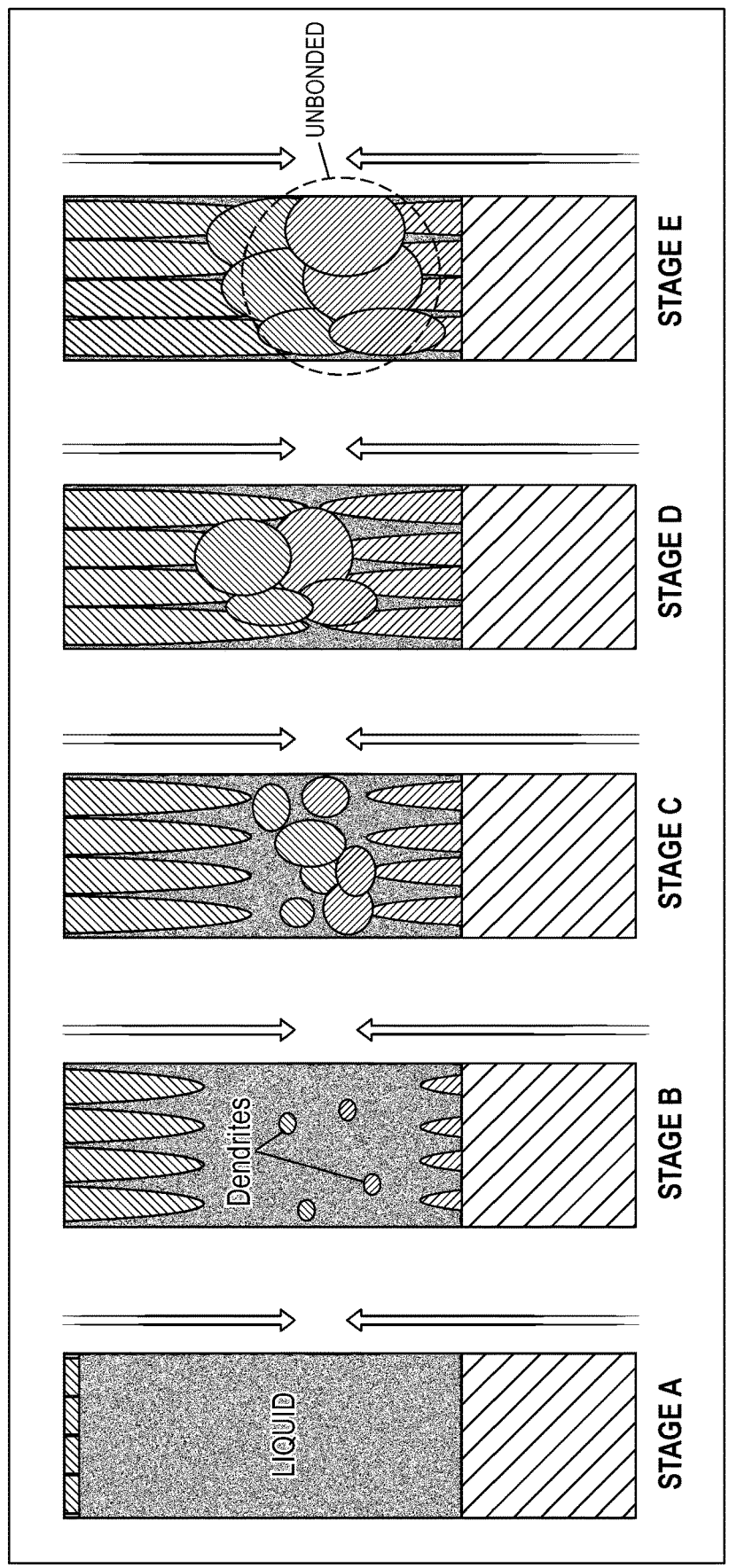
FIG. 29(b) presents schematics of solidification process during URW.

As indicated in FIG. 29(b) ultrasonic vibration of the URW process can alleviate these aforementioned problems by adding disturbance material flow from the acoustic streaming and cavitation effects. This flow breaks down the dendrite fragments (FIG. 29b-Stage B), creates additional nucleation sites and promotes epitaxial structure growth during URW process. See Stages C-E. Moreover, ultrasonic vibration enhances the flowability of the liquid metal in the mushy zone. Another potential ultrasonic effect is to homogenize element distribution in the liquid metal, which minimizes element segregation and also reduces possibility of solidification cracking.

Ultrasonic Effects on RSW Process

Figure 30:
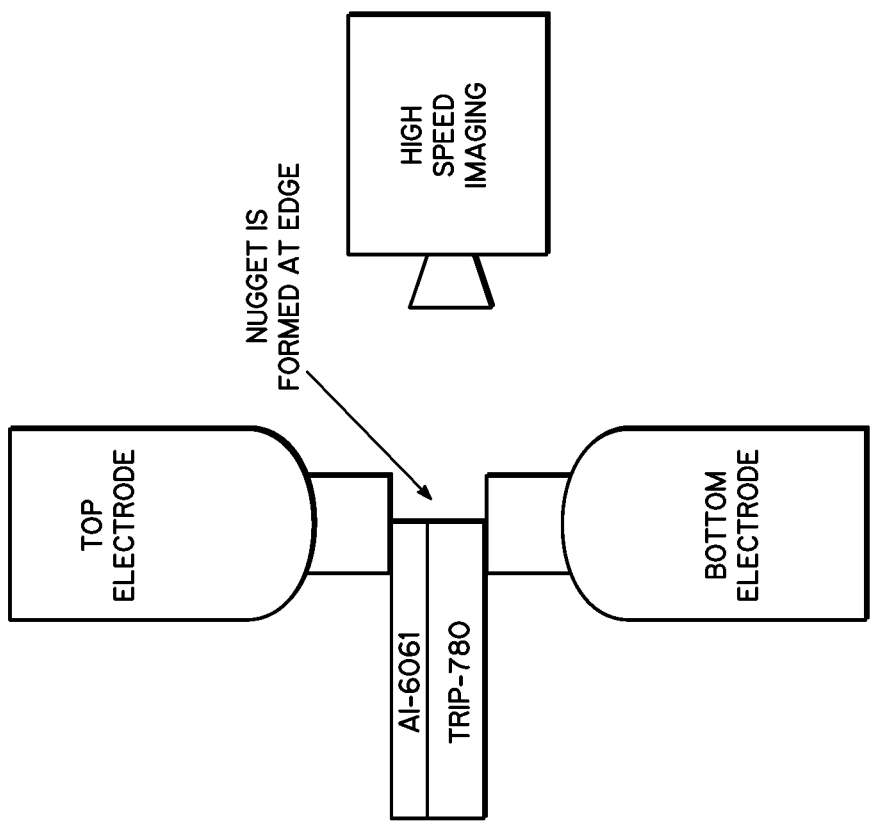
FIG. 30 is a schematic view of an electrode-workpiece assembly for High Speed Imaging.

For a further understanding of the hybrid URW process, in situ observation of ultrasonic vibrations during URW of Al-6061 (the first component 22) and TRIP-780 (the second component 24) is achieved via a high-speed camera (Photron SA-X2) under the image capturing rate of 100,000 frames per second (100 k fps). In the setup, the stack of aluminum and steel sheet is placed halfway at the center of the electrode. An edge weld is performed, as shown in FIG. 30.

Figure 31:
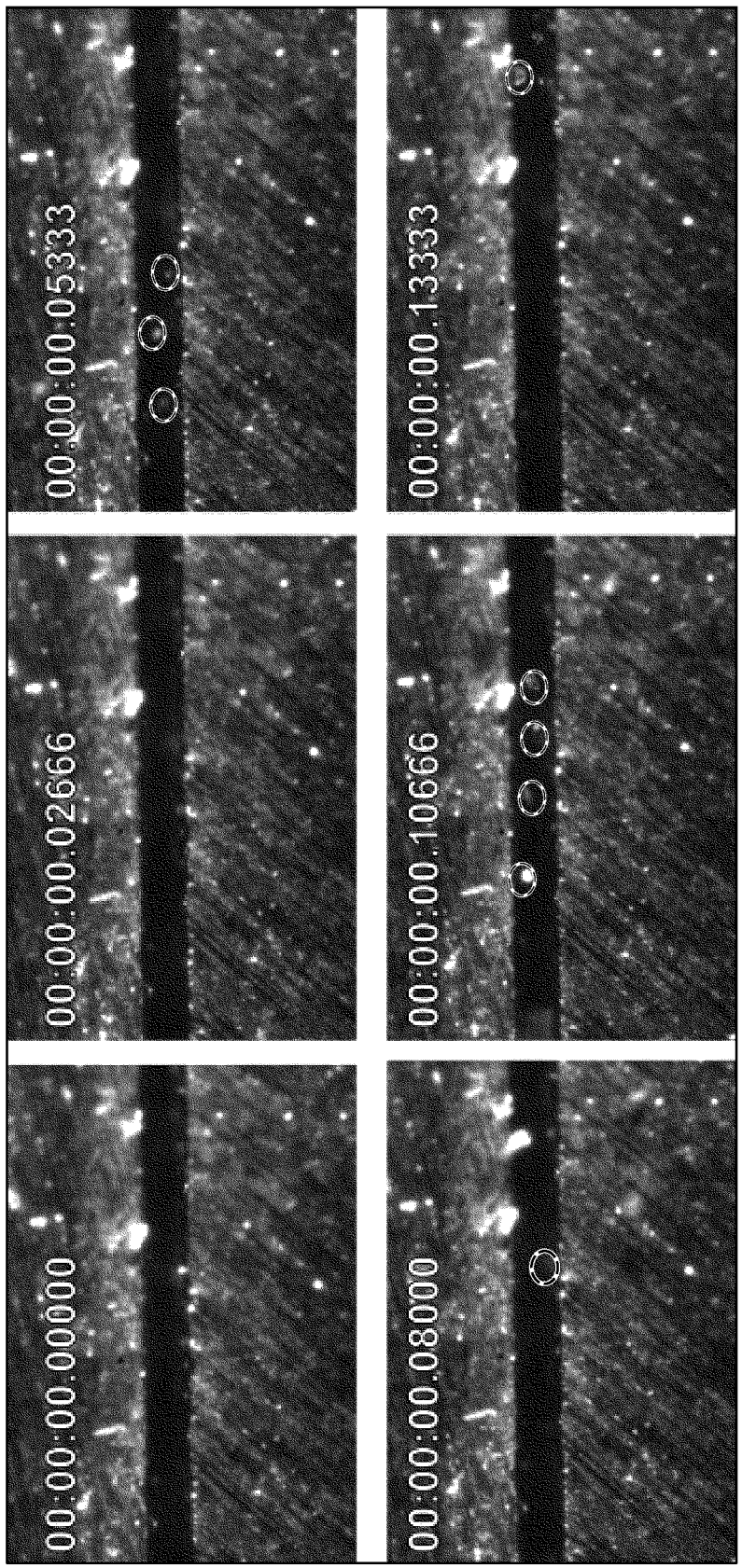
FIG. 31 is High-Speed Imaging at the Al—Fe interface showing breakdown of surface oxide layer and asperities during URW process.

From the high-speed imaging, ultrasonic effects during the URW process can generally be described in two categories, depending on the occurrence of melting. In conditions without melting as shown in FIG. 31, ultrasonic vibration helps abrade surface oxides and asperities. The break-up particles are marked with red circles in FIG. 31. This modifies the contact conditions between the two sheets, and accordingly the resistance heat generation rate.

Figure 32:
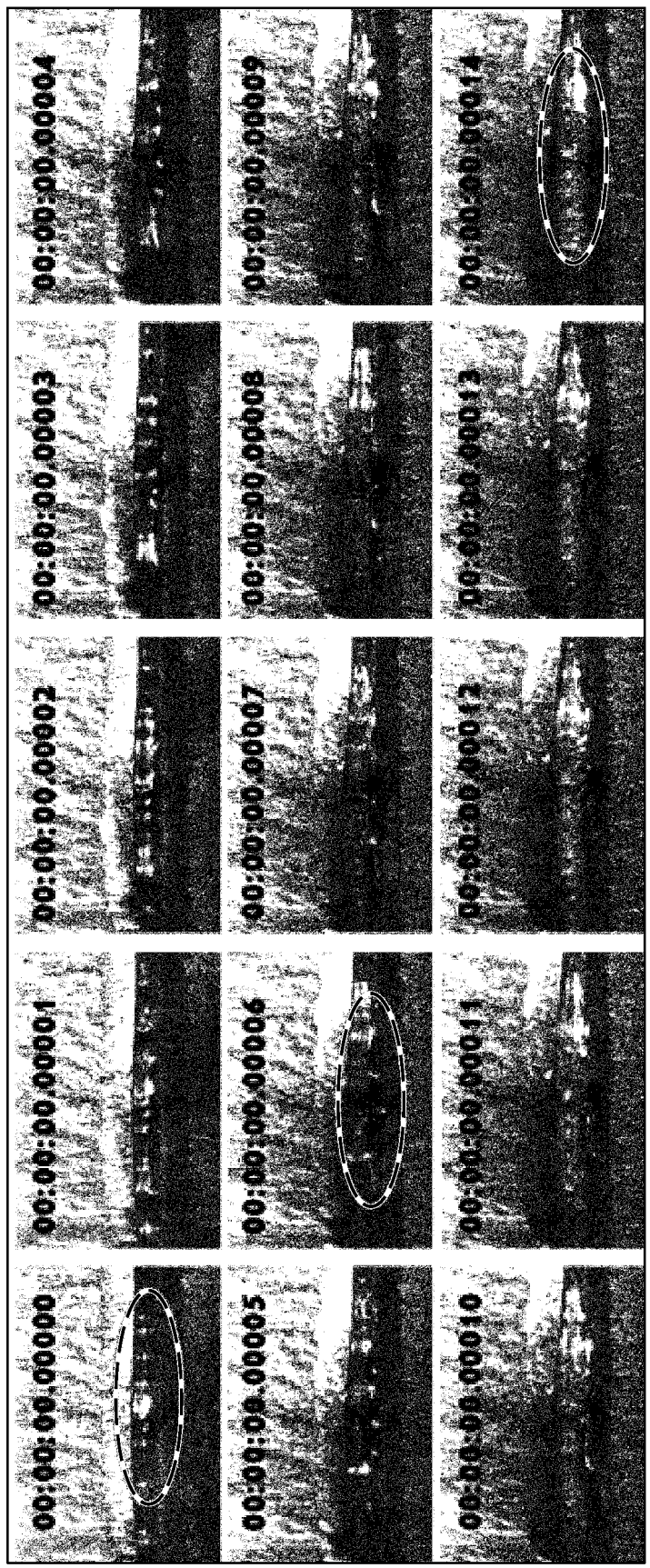
FIG. 32 is High Speed Imaging at the Al—Fe interface showing wetting of aluminum during URW process.

FIG. 32 provides High Speed Imaging at the Al—Fe interface showing wetting of aluminum during the URW process. Highlighted circles indicate molten aluminum. If melting occurs, as shown in FIG. 32, the ultrasonic waves promote wetting of melted aluminum with steel, facilitate spreading of the locally melted spot, and create a uniformly melted interlayer.

Based on these observations, it is believed that ultrasonic vibration can alter the RSW process dynamics at several stages. At the beginning of the weld cycle, reduced contact resistance can be achieved as the ultrasonic vibration breaks off the surface oxide layer and removes undesirable contaminants at the faying surfaces of the two workpieces. Since the actual geometry of the electrode is not ideally flat, relative shear components can be expected at the steel-aluminum interface even though the ultrasonic vibration is perpendicularly configured. In addition, acoustic softening of the material enhances the plastic deformation under electrode force. As a result, net contact area between the two workpiece increases by closing the initial gaps. All these effects can reduce contact resistance and lower the heat generation rate. This potentially explains the perseverance of Zn layer at the Al—Fe interface in the URW welding condition of 11.4 kA.

In the middle of the weld cycle, if melting occurs, the ultrasonic vibration would influence material flow dynamics in the melt pool, as shown in the high-speed video. The alternate compression and rarefaction field from ultrasonic vibrations can induce cyclic stresses into the joint. This alters the solidification pattern of welding process by detachment of dendritic fragments ahead of solidification front, which serves as addition nucleation sites, facilitates bonding and minimizes the overall solidification cracking. At the end of the weld cycle, ultrasonic cavitation effects can minimize possible shrinkage porosities, which is similar to the mechanisms of ultrasonic degassing.

Finally, during cooling down, the acoustic softening effect helps ameliorate thermal stresses and maintains bonding at the Al—Fe interface. However, continuing supply of ultrasonic energy for a long period can potentially induce fatigue failure and generate cracks at the nugget edge, which becomes undesirable.

Figure 33:
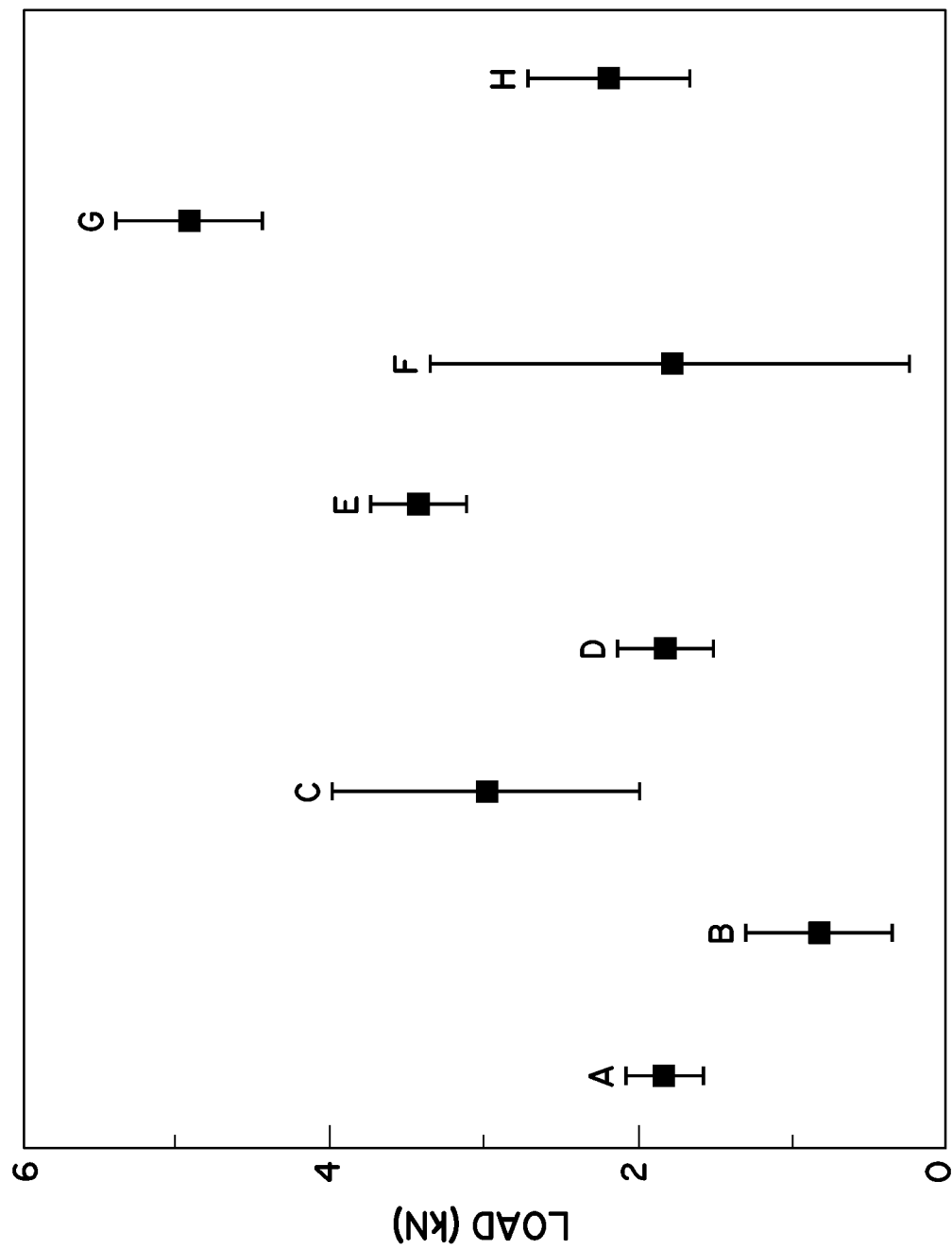
FIG. 33 is a comparative chart illustrating that URW shows higher joint strength than RSW in all the investigated conditions.

Improvement of Ultrasonic Resistance Welding (URW) Compared With Conventional Resistance Spot Welding (RSW) for Aluminum Alloy Quaternary Experimental Results Yet another exemplary embodiment is an aluminum alloy Al 6061 with thickness of 1.6 mm. The welding strength (unit: KN) under different process conditions, including the magnitude of electrical current (unit: KA) and its duration (ms) are listed in Table 3 (UA: ultrasonically assisted; NUA: no ultrasonic condition) and also plotted in FIG. 33. URW welds show higher strength in all the investigated conditions.

TABLE 3

| | Condition | Values (kN) | Mean (kN) |
|---|---|---|---|
| A. | 20 KA 150 ms-150 ms UA | 1.8, 1.6, 2.1 | 1.83 ± 0.252 |
| B. | 20 KA 150 ms-Nua | 1, 0.3, 1.2 | 0.83 ± 0.472 |
| C. | 20 KA 500 ms-500 ms UA | 4.0, 3.0, 2.0 | 3.00 ± 1.000 |
| D. | 20 KA 500 ms-Nua | 1.5, 2.0, 2.0 | 1.83 ± 0.288 |
| E. | 30 KA 150 ms-150 ms UA | 3.3, 3.2, 3.8 | 3.43 ± 0.321 |
| F. | 30 KA 150 ms-Nua | 2.7, 2.7, 0 | 1.80 ± 1.558 |
| G. | 30 KA 500 ms-500 ms UA | 5.5, 4.5, 4.2 | 4.73 ± 0.680 |
| H. | 30 KA 500 ms-Nua | 2.4, 2.6, 1.6, | 2.20 ± 0.529 |

Figure 34:
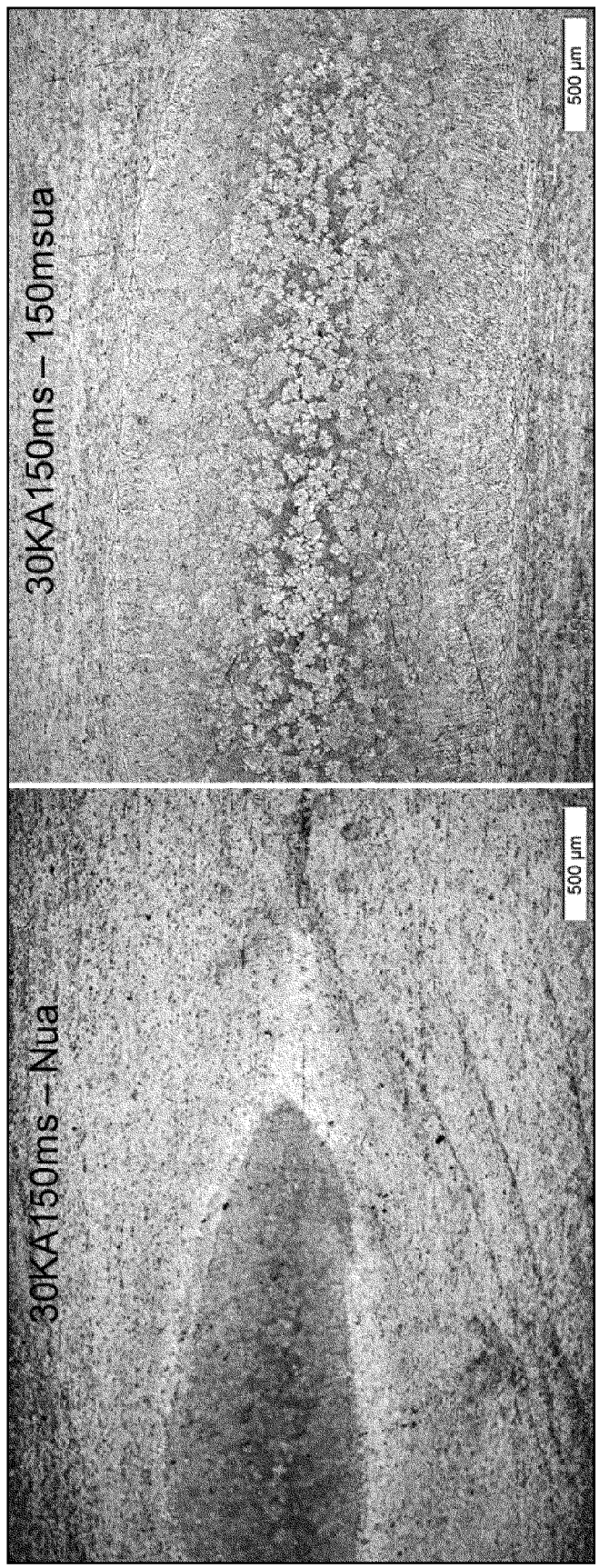
FIG. 34 illustrates how URW increases the weld nugget size.
Figure 35:
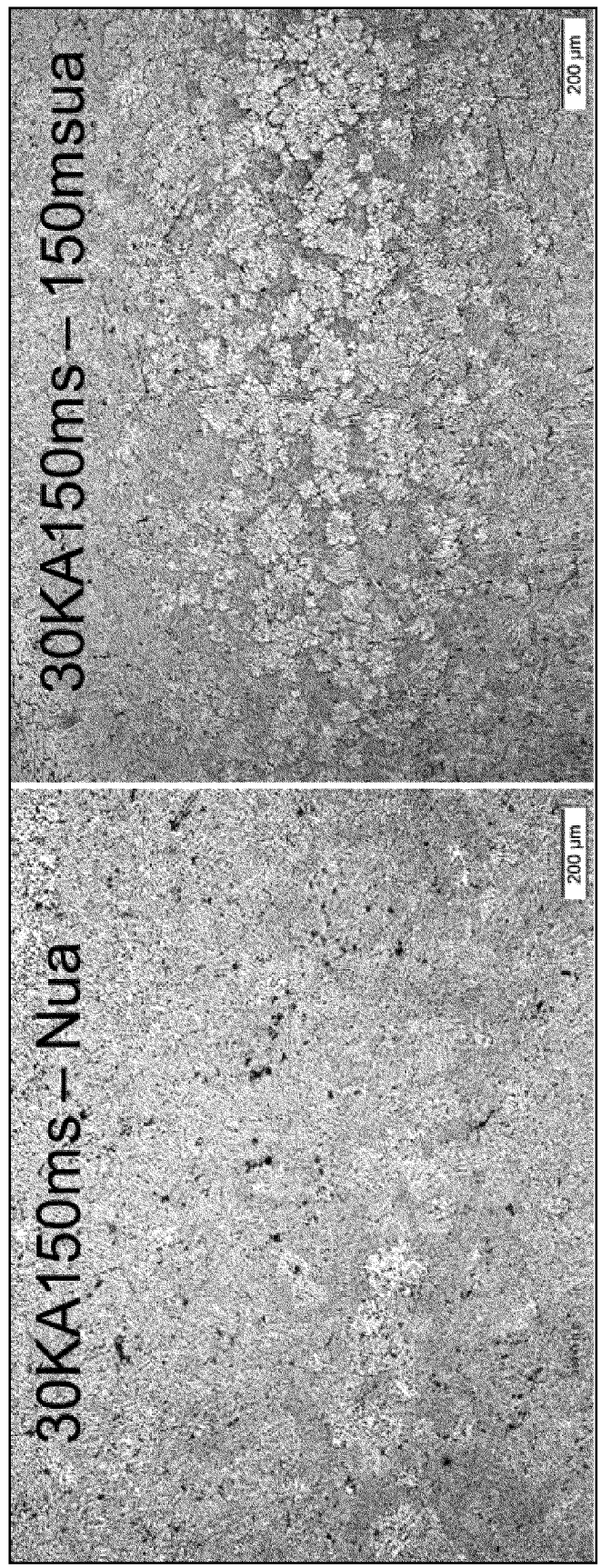
FIG. 35 illustrates how URW promotes equiaxed dendrite formation in the center of the nugget.

In addition, URW also improves the weld microstructure compared with RSW welds in the following two perspectives:
1. Increased nugget size at the same amount of current and length of the current (as shown in FIG. 34).
2. Larger area of equiaxed dendrite zone in the center of the weld nugget (as shown in FIG. 35).

Battery tab welding as an exemplary application: the ultrasonic resistance welding of the present invention can be applied for welding for battery tabs and foils. One embodiment includes welding 20-25 lays of aluminum foils to aluminum tabs. Aluminum foils have thickness of 16 um. The aluminum tab can be anodized or not anodized with the thickness of 0.4 mm. A second embodiment includes welding 20-25 lays of copper foils to copper tabs. Copper foils have thickness of 9 um. The copper tab can be regular, or nickel-coated with the thickness of 0.2 mm, for example.

Replaceable electrodes: the sono-electrode contains two parts. One is the base (or bottom) electrode 18 that connects to the ultrasonic transducer 12 and is mounted to the RSW apparatus 15. The other is the replaceable electrode, which can be changed regularly as the electrode wears down during production. The replaceable electrode also allows different size and shape of the electrodes to be used for welding workpiece with different materials and thicknesses. With this approach, the base component would stay the same. The replaceable electrode contains threads at the bottom. The threads need to be fine enough to ensure good surface contact and efficient transfer of ultrasonic energy into the weld nugget instead of dissipation into heat at the electrodes-interface. In this regard, the threads need to be size 20 TPI (threads per inch) or finer.

Method of Welding

In another aspect of the present invention, a URW apparatus as described above is employed or utilized in an ultrasonic resistance welding process including the following steps:
(1) providing an ultrasonic resistance welding apparatus 10 exemplified by the following embodiment:
   (a) a resistance welding apparatus 15 having a first electrode 16 and a find and second electrode 18 where at least one of the electrodes (the vibrable second electrode 18) functions as a sonotrode such that ultrasonic vibration occurs at its tip 19, and a contact interface of a component or workpiece 24—if desired one or both of the electrodes 16, 18 may be replaceable; and (b) an ultrasonic transducer 12 operatively coupled to the vibrable second electrode 18, and optionally to the first electrode 16, to selectively impart vibratory energy to the contact interface 14 of the resistance welding machine 15, wherein the vibrable second electrode 18, operatively coupled to the ultrasonic transducer 12, may be designed to resonate within 2.5% of an operating frequency of said ultrasonic transducer 12, and wherein during operation, the tip 19 of the vibrable second electrode 18 may be positioned at an anti-nodal point 38 of the vibratory energy and a median lateral portion 21 of the second electrode 18 may be positioned at a nodal plane 36 of the vibratory energy;

(2) providing two components contacting each other;

(3) contacting opposing sides of the components with the first and second electrodes of the ultrasonic resistance welding apparatus;

(4) passing electrical current through the electrodes; and (5) synchronizing the ultrasonic transducer to vibrate during a period of wherein an electrical current is applied to the electrodes.

In yet another aspect of the method of welding, the ultrasonic transducer may be configured to ultrasonically vibrate at least one of the electrodes upon detecting at least one of electrical current, welding force, initiation of melting, or other process signals, and, wherein the ultrasonic vibration can start either before or after the electrical current.

In yet another aspect of the method of welding, the ultrasonic resistance welding process may further include the step of detecting melting while passing electrical current through the electrodes via on-line signal processing of welding force or electrode displacement to thereby begin ultrasonically vibrating at least one of the electrodes.

In yet another aspect of the method of welding, the ultrasonic resistance welding process may be either in solid-state or fusion state. The temperature range relative to either state will differ based on the different material systems being processed. For example, for aluminum alloy, the solid-state temperature is approximately below 660 degrees Celsius, and fusion temperature is above 660 degrees Celsius.

In yet another aspect of the method of welding, the ultrasonic resistance welding process may include the two components made of similar materials or dissimilar materials and wherein the components may have coatings, such as a zinc coating.

In yet another aspect of the method of welding, the ultrasonic resistance welding process includes two or more components, wherein a combined thickness of the two or more components is not limited, although the component contacted by the base or second electrode 18 has a thickness limitation because of the power output limitations of the ultrasonic transducer 12. An exemplary thickness may be about 5.0 mm.

In yet another aspect of the method of welding, the ultrasonic resistance welding process has a component such that the thickness of this component when contacted by the vibrable second electrode 18 is in the range of 3-5 mm depending on the type of material of the component.

In yet another aspect of the method of welding, the ultrasonic resistance welding process wherein one of the components is a thin foil having a thickness 10-100 um, as in battery tab welding, for example.

In yet another aspect of the method of welding, the ultrasonic resistance welding process is an additive manufacturing process, using the URW apparatus 10 and process as stated above to produce a seam weld by building structure layer by layer utilizing the combined ultrasonic and electrical energy.

In sum, the present invention contains an ultrasonic resistance welding apparatus 10 containing a resistance spot welding apparatus 15, a first electrode 16 and a second vibrable electrode 18, wherein the vibrable electrode 18 may be juxtaposed to and is in operable communication with an ultrasonic transducer 12, whereby the ultrasonic transducer 12 selectively imparts vibratory energy to the vibrable second electrode 18, based on parameters governed by the controller 32. The vibrable second electrode 18 may be tuned or designed to resonate within 2.5% of an operating frequency of said ultrasonic transducer 12, thereby stabilizing operation of URW. Stated another way, the vibrable second electrode 18 may be tuned or designed to resonate at a frequency 2.5% above or below the average operating frequency of said ultrasonic transducer 12. During operation of the welding apparatus 10, the tip 19 of the vibrable base electrode 18 may be positioned at an anti-nodal point 38 of the vibratory energy and a median portion 21 of the vibrable electrode 18 may be positioned at a nodal plane 36 of the vibratory energy. A process for employing the apparatus 10 is also presented.

The embodiments of the present invention recited herein are intended to be merely exemplary and those skilled in the art will be able to make numerous variations and modifications to it without departing from the spirit of the present invention. Notwithstanding the above, certain variations and modifications, while producing less than optimal results, may still produce satisfactory results. All such variations and modifications are intended to be within the scope of the present invention as defined by the claims appended hereto.

What is claimed is:

1. An ultrasonic resistance welding apparatus comprising:
   a resistance welding machine having a first electrode and a vibrable second electrode; and
   an ultrasonic transducer operatively coupled to said vibrable second electrode adapted to selectively impart vibratory energy to said vibrable second electrode,
   a controller for ultrasonically vibrating at least one of the electrodes upon detecting at least one of electrical current, welding force, or initiation of melting, to synchronize the ultrasonic vibrating with an electrical current at a predetermined point during an ultrasonic resistance welding process,
   wherein said vibrable second electrode is designed to resonate within 2.5% of an operating frequency of said ultrasonic transducer.

2. The ultrasonic welding apparatus of claim 1 wherein during operation a tip of said vibrable second electrode is positioned at an anti-nodal point of said vibratory energy and said vibrable second electrode is mounted to said resistance welding machine at a nodal point of said vibratory energy.

3. The ultrasonic resistance welding apparatus of claim 1 wherein said ultrasonic transducer is positioned to apply longitudinal or lateral vibratory energy to a contact interface of two components to be welded.

4. The ultrasonic resistance welding apparatus of claim 1 wherein said first and second electrodes are powered by alternating current, direct current, or by capacitive discharge.

5. The ultrasonic resistance welding apparatus of claim 1 further comprising a controller in operable communication with said ultrasonic transducer for either triggering said vibratory energy, providing an electrical current to said electrodes, or both.

6. The ultrasonic resistance welding apparatus of claim 5 wherein said controller comprises a sensor in operable communication with said controller and an apparatus actuator.

7. The ultrasonic resistance welding apparatus of claim 6 wherein said sensor is selected from at least one of an electrical current sensor, an electrical voltage sensor, a force transducer, and a displacement sensor.

8. The ultrasonic resistance welding apparatus of claim 6 wherein said apparatus actuator is selected from at least one of a digital electrical switch, a transistor and an associated circuit, and a DC motor driver carrier, said actuator configured to receive a control signal from the controller to output the triggering signal to the ultrasonic transducer.

9. The ultrasonic resistance welding apparatus of claim 1, further comprising a controller to trigger the ultrasonic vibration depending on one or more different process signals.

10. The ultrasonic resistance welding apparatus of claim 1 further comprising a controller to trigger the ultrasonic vibration, said controller comprising a programmable logic controller and a data acquisition system.

11. The ultrasonic resistance welding apparatus of claim 1 wherein said apparatus is used in a projection resistance welding machine, a mash seam resistance welding machine, or a resistance spot welding robot.

12. The ultrasonic resistance welding apparatus of claim 1, where the ultrasonic vibration is applied in a same area where the electrical current flows.

13. An ultrasonic resistance welding process comprising:
providing an ultrasonic resistance welding apparatus as claimed in claim 1;
providing two components contacting each other;
contacting opposing sides of the components with the first electrode and the vibrable second electrode of the ultrasonic resistance welding apparatus;
passing electrical current through the electrodes; and
ultrasonically vibrating at least one of the electrodes upon detecting at least one of electrical current, welding force, or initiation of melting, to synchronize the vibrating step with electrical current at a predetermined point in the process.

14. The process of claim 13 wherein said ultrasonic vibrating step is synchronized to be provided at a predetermined point in the process, either before or after the electrical current is provided, and wherein the ultrasonic transducer may be synchronized to ultrasonically vibrate at least one of the first electrode or the vibrable second electrode upon detecting at least one of electrical current, welding force, or initiation of melting, and, wherein the ultrasonic vibration can start either before or after the electrical current.

15. The process of claim 13 further comprising the step of tuning the vibrable second electrode so that the resonant frequency of the vibrable second electrode is within 2.5% of the frequency provided in the ultrasonic vibration step.

16. The process of claim 13 further including the step of detecting melting of a portion of one or both of the components, while passing electrical current through the electrodes via on-line signal processing of welding force or electrode displacement, to thereby begin ultrasonically vibrating at least the second electrode.

17. The process of claim 13 wherein the process may be either in solid-state or fusion state.

* * * * *